US009740988B1

(12) United States Patent
Levin et al.

(10) Patent No.: US 9,740,988 B1
(45) Date of Patent: Aug. 22, 2017

(54) SYSTEM AND METHOD FOR USING UNIQUE DEVICE INDENTIFIERS TO ENHANCE SECURITY

(71) Applicant: Live Nation Entertainment, Inc., Beverly Hills, CA (US)

(72) Inventors: Samuel Levin, Los Angeles, CA (US); David Scarborough, Ashburn, VA (US); Fengpei Du, Santa Monica, CA (US); Richard DiStefano, Burbank, CA (US); Dennis Denker, Scottsdale, CA (US); Sean Moriarty, Pasadena, CA (US); Charles Plamondon, Quebec (CA); Matthew Siegel, Tampa, FL (US); Benjamin Marti, Gilbert, AZ (US)

(73) Assignee: Live Nation Entertainment, Inc., Beverly Hills, CA (US)

( * ) Notice: Subject to any disclaimer, the term of this patent is extended or adjusted under 35 U.S.C. 154(b) by 0 days.

(21) Appl. No.: 15/215,385

(22) Filed: Jul. 20, 2016

Related U.S. Application Data

(60) Continuation of application No. 15/005,970, filed on Jan. 25, 2016, now Pat. No. 9,477,820, which is a
(Continued)

(51) Int. Cl.
*G06Q 10/02* (2012.01)
*G06K 7/14* (2006.01)
(Continued)

(52) U.S. Cl.
CPC ......... *G06Q 10/02* (2013.01); *G06K 7/10722* (2013.01); *G06K 7/1417* (2013.01); *H04W 4/008* (2013.01)

(58) Field of Classification Search
None
See application file for complete search history.

(56) References Cited

U.S. PATENT DOCUMENTS 3,581,072 A    5/1971  Nymeyer
3,622,995 A   11/1971  Dilks
(Continued)

FOREIGN PATENT DOCUMENTS

AU    2000229843    8/2006
AU    2006/203419   1/2008
(Continued)

OTHER PUBLICATIONS

Hes, et al. "At Face Value" On biometrical identification and privacy, Registratiekamer, Sep. 1999; 78 pages.
(Continued)

*Primary Examiner* — Kaveh Abrishamkar
(74) *Attorney, Agent, or Firm* — Kilpatrick Townsend & Stockton, LLP

(57) ABSTRACT

A method for detection and use of device identifiers to enhance the security of data transfers between electronic devices. A first electronic device can transmit access data to a second electronic device. The access data can be associated with a first access code that can be generated based at least in part on data representing a device identifier of the first electronic device. A device identifier can uniquely identify the first electronic device from a plurality of electronic devices. Transferring the access data can involve transforming the first access code into a second access code that can include data representing a device identifier associated with the second electronic device. Transforming the first access code into the second access code can facilitate access to a resource associated with the access data for a second user, but not for a first user.

20 Claims, 12 Drawing Sheets

Related U.S. Application Data continuation-in-part of application No. 14/553,902, filed on Nov. 25, 2014, now abandoned, which is a continuation of application No. 13/948,906, filed on Jul. 23, 2013, now abandoned, which is a division of application No. 12/716,616, filed on Mar. 3, 2010, now Pat. No. 8,510,138, application No. 15/215,385, which is a continuation-in-part of application No. 14/202,218, filed on Mar. 10, 2014, now Pat. No. 9,251,518, and a continuation-in-part of application No. 14/049,909, filed on Oct. 9, 2013, now abandoned, and a continuation-in-part of application No. 10/731,410, filed on Dec. 9, 2003.

(60) Provisional application No. 61/158,237, filed on Mar. 6, 2009, provisional application No. 61/791,123, filed on Mar. 15, 2013, provisional application No. 61/712,009, filed on Oct. 10, 2012, provisional application No. 60/431,865, filed on Dec. 9, 2002.

(51) Int. Cl.
  *G06K 7/10* (2006.01)
  *H04W 4/00* (2009.01)

(56) References Cited

U.S. PATENT DOCUMENTS

| | | |
|---|---|---|
| 4,412,287 A | 10/1983 | Braddock |
| 4,603,232 A | 7/1986 | Kurland |
| 4,788,643 A | 11/1988 | Trippe et al. |
| 4,789,928 A | 12/1988 | Fujisaki |
| 4,799,156 A | 1/1989 | Shavit et al. |
| 4,816,904 A | 3/1989 | McKenna et al. |
| 4,845,739 A | 7/1989 | Katz |
| 4,862,357 A | 8/1989 | Ahlstrom et al. |
| 4,889,280 A | 12/1989 | Gradi et al. |
| 4,980,826 A | 12/1990 | Wagner |
| 5,077,665 A | 12/1991 | Silverman et al. |
| 5,095,196 A | 3/1992 | Miyata |
| 5,101,353 A | 3/1992 | Lupien et al. |
| 5,112,050 A | 5/1992 | Koza et al. |
| 5,136,501 A | 8/1992 | Silverman et al. |
| 5,181,786 A | 1/1993 | Hujink |
| 5,237,499 A | 8/1993 | Garback |
| 5,239,480 A | 8/1993 | Huegel |
| 5,253,165 A | 10/1993 | Leiseca et al. |
| 5,265,916 A | 11/1993 | Coe |
| 5,283,734 A | 2/1994 | Van Kohorn |
| 5,311,425 A | 5/1994 | Inada |
| 5,329,589 A | 7/1994 | Fraser et al. |
| 5,333,257 A | 7/1994 | Merrill et al. |
| 5,347,306 A | 9/1994 | Nitta |
| 5,408,417 A | 4/1995 | Wilder |
| 5,422,809 A | 6/1995 | Griffin et al. |
| 5,426,281 A | 6/1995 | Abecassis |
| 5,428,778 A | 6/1995 | Brookes |
| 5,475,585 A | 12/1995 | Bush |
| 5,489,096 A | 2/1996 | Aron |
| 5,496,991 A | 3/1996 | Delfer et al. |
| 5,518,239 A | 5/1996 | Johnston |
| 5,553,145 A | 9/1996 | Micali |
| 5,557,518 A | 9/1996 | Rosen |
| 5,559,707 A | 9/1996 | Delorme et al. |
| 5,581,461 A | 12/1996 | Coli et al. |
| 5,592,375 A | 1/1997 | Salmon et al. |
| 5,598,477 A | 1/1997 | Berson |
| 5,664,115 A | 9/1997 | Fraser |
| 5,724,520 A | 3/1998 | Goheen |
| 5,742,763 A | 4/1998 | Jones |
| 5,754,654 A | 5/1998 | Hiroya et al. |
| 5,757,917 A | 5/1998 | Rose et al. |
| 5,774,873 A | 6/1998 | Berent et al. |
| 5,794,207 A | 8/1998 | Walker et al. |
| 5,794,210 A | 8/1998 | Goldhaber et al. |
| 5,794,219 A | 8/1998 | Brown |
| 5,797,126 A | 8/1998 | Helbinq et al. |
| 5,797,127 A | 8/1998 | Walker et al. |
| 5,812,670 A | 9/1998 | Micali |
| 5,818,914 A | 10/1998 | Fujisaki |
| 5,826,241 A | 10/1998 | Stein et al. |
| 5,835,896 A | 11/1998 | Fisher et al. |
| 5,845,265 A | 12/1998 | Woolston |
| 5,845,266 A | 12/1998 | Lupien et al. |
| 5,850,442 A | 12/1998 | Muftic |
| 5,890,138 A | 3/1999 | Godin et al. |
| 5,918,209 A | 6/1999 | Campbell et al. |
| 5,930,761 A | 7/1999 | O'Toole |
| 6,023,685 A | 2/2000 | Brett et al. |
| 6,023,686 A | 2/2000 | Brown |
| 6,026,383 A | 2/2000 | Ausubel |
| 6,044,363 A | 3/2000 | Mori et al. |
| 6,047,264 A | 4/2000 | Fisher et al. |
| 6,048,271 A | 4/2000 | Barcelou |
| 6,067,532 A | 5/2000 | Gebb |
| 6,068,183 A | 5/2000 | Freeman et al. |
| 6,070,146 A | 5/2000 | Mimata |
| 6,082,620 A | 7/2000 | Bone, Jr. |
| 6,085,164 A | 7/2000 | Smith et al. |
| 6,085,169 A | 7/2000 | Walker et al. |
| 6,085,976 A | 7/2000 | Sehr |
| 6,094,640 A | 7/2000 | Goheen |
| 6,107,932 A | 8/2000 | Walker et al. |
| 6,119,096 A | 9/2000 | Mann et al. |
| 6,119,945 A | 9/2000 | Muller et al. |
| 6,149,055 A | 11/2000 | Gatto |
| 6,175,922 B1 | 1/2001 | Wang |
| 6,192,349 B1 | 2/2001 | Husemann et al. |
| 6,216,227 B1 | 4/2001 | Goldstein et al. |
| 6,223,166 B1 | 4/2001 | Kay |
| 6,230,146 B1 | 5/2001 | Alaia et al. |
| 6,240,396 B1 | 5/2001 | Walker et al. |
| 6,243,691 B1 | 6/2001 | Fisher et al. |
| 6,246,996 B1 | 6/2001 | Stein et al. |
| 6,263,315 B1 | 7/2001 | Talluri |
| 6,308,159 B1 | 10/2001 | Strohl |
| 6,341,353 B1 | 1/2002 | Herman et al. |
| 6,418,415 B1 | 7/2002 | Walker et al. |
| 6,434,398 B1 | 8/2002 | Inselberg |
| 6,446,045 B1 | 9/2002 | Stone et al. |
| 6,446,917 B2 | 9/2002 | Dieckmann et al. |
| 6,449,346 B1 | 9/2002 | Katz |
| 6,470,394 B1 | 10/2002 | Bamforth et al. |
| 6,470,451 B1 | 10/2002 | Weinstein |
| 6,477,503 B1 | 11/2002 | Mankes |
| 6,484,153 B1 | 11/2002 | Walker et al. |
| 6,496,809 B1 | 12/2002 | Nakfoor |
| 6,523,037 B1 | 2/2003 | Monahan et al. |
| 6,556,548 B1 | 4/2003 | Kirkby et al. |
| 6,603,568 B1 | 8/2003 | Sansone |
| 6,604,107 B1 | 8/2003 | Wang |
| 6,658,390 B1 | 12/2003 | Walker et al. |
| 6,662,230 B1 | 12/2003 | Eichstaedt et al. |
| 6,679,421 B2 | 1/2004 | Shin et al. |
| 6,685,093 B2 | 2/2004 | Challa et al. |
| 6,690,794 B1 | 2/2004 | Terao et al. |
| 6,704,489 B1 | 3/2004 | Kurauchi et al. |
| 6,704,713 B1 | 3/2004 | Brett |
| 6,736,322 B2 | 5/2004 | Gobburu et al. |
| 6,738,750 B2 | 5/2004 | Stone et al. |
| 6,820,201 B1 | 11/2004 | Lincoln et al. |
| 6,829,644 B2 | 12/2004 | Aufderheide |
| 6,842,741 B1 | 1/2005 | Fujimura |
| 6,847,969 B1 | 1/2005 | Mathai et al. |
| 6,850,901 B1 | 2/2005 | Hunter et al. |
| 6,854,010 B1 | 2/2005 | Christian et al. |
| 6,854,651 B2 | 2/2005 | Smith et al. |
| 6,873,969 B2 | 3/2005 | Stone et al. |
| 6,877,661 B2 | 4/2005 | Webb et al. |
| 6,877,665 B2 | 4/2005 | Challa et al. |
| 6,901,429 B2 | 5/2005 | Dowling |
| 6,907,405 B2 | 6/2005 | Brett |
| 6,910,019 B2 | 6/2005 | Dorr |

(56) References Cited

U.S. PATENT DOCUMENTS

| | | |
|---|---|---|
| 6,910,627 B1 | 6/2005 | Simpson/Young et al. |
| 6,920,428 B2 | 7/2005 | Greene |
| 6,937,998 B1 | 8/2005 | Swartz et al. |
| 6,944,599 B1 | 9/2005 | Vogel et al. |
| 6,952,737 B1 | 10/2005 | Coates et al. |
| 6,963,854 B1 | 11/2005 | Boyd et al. |
| 6,965,914 B2 | 11/2005 | Dowling |
| 6,973,176 B1 | 12/2005 | Chism et al. |
| 6,999,936 B2 | 2/2006 | Sehr |
| 7,003,485 B1 | 2/2006 | Young |
| 7,004,388 B2 | 2/2006 | Kohta |
| 7,010,494 B2 | 3/2006 | Etzioni et al. |
| 7,031,945 B1 | 4/2006 | Donner |
| 7,044,362 B2 | 5/2006 | Yu |
| 7,058,602 B1 | 6/2006 | La Mura et al. |
| 7,069,243 B2 | 6/2006 | Dinwoodie |
| 7,076,460 B2 | 7/2006 | Dinwoodie |
| 7,076,558 B1 | 7/2006 | Dunn |
| 7,080,026 B2 | 7/2006 | Sing et al. |
| 7,080,030 B2 | 7/2006 | Eglen et al. |
| 7,080,328 B1 | 7/2006 | Sawyer |
| 7,080,882 B2 | 7/2006 | Stitt |
| 7,083,081 B2 | 8/2006 | McGee et al. |
| 7,085,818 B2 | 8/2006 | Brown et al. |
| 7,092,892 B1 | 8/2006 | Sobalvarro et al. |
| 7,093,130 B1 | 8/2006 | Kobayashi et al. |
| 7,099,841 B1 | 8/2006 | Hallet et al. |
| 7,110,960 B2 | 9/2006 | Phillips et al. |
| 7,114,179 B1 | 9/2006 | Ritter et al. |
| 7,124,062 B2 | 10/2006 | Gebhart |
| 7,127,404 B1 | 10/2006 | Poon |
| 7,127,408 B2 | 10/2006 | Rosen |
| 7,133,848 B2 | 11/2006 | Phillips et al. |
| 7,139,916 B2 | 11/2006 | Billingsley et al. |
| 7,149,549 B1 | 12/2006 | Ortiz et al. |
| 7,152,043 B2 | 12/2006 | Alaia et al. |
| 7,152,094 B1 | 12/2006 | Jannu et al. |
| 7,162,454 B1 | 1/2007 | Donner et al. |
| 7,171,472 B2 | 1/2007 | O'Brien et al. |
| 7,177,945 B2 | 2/2007 | Honq et al. |
| 7,191,147 B2 | 3/2007 | Heene et al. |
| 7,213,754 B2 | 5/2007 | Eglen et al. |
| 7,228,313 B1 | 6/2007 | Hand et al. |
| 7,228,350 B2 | 6/2007 | Honq et al. |
| 7,328,166 B1 | 2/2008 | Geoghegan et al. |
| 7,333,943 B1 | 2/2008 | Charuk et al. |
| 7,403,993 B2 | 7/2008 | John et al. |
| 7,412,042 B2 | 8/2008 | Henry |
| 7,540,415 B2 | 6/2009 | Frank et al. |
| 7,555,361 B2 | 6/2009 | Nakamura et al. |
| 7,559,466 B2 | 7/2009 | Brookner |
| 7,584,123 B1 | 9/2009 | Karonis et al. |
| 7,634,503 B2 | 12/2009 | Venugopal et al. |
| 7,720,746 B2 | 5/2010 | Brett |
| 7,849,133 B2 | 12/2010 | Denker et al. |
| 7,865,379 B2 | 1/2011 | Sussman et al. |
| RE43,157 E | 2/2012 | Bishop et al. |
| 8,126,991 B2 | 2/2012 | Smith et al. |
| 8,131,572 B2 | 3/2012 | Nakfoor |
| 8,201,735 B2 | 6/2012 | Frank et al. |
| 8,266,211 B2 | 9/2012 | Smith et al. |
| 8,294,549 B2 | 10/2012 | Samovar et al. |
| 8,346,580 B2 | 1/2013 | Nakfoor |
| 8,510,138 B2 | 8/2013 | Marti et al. |
| 8,543,813 B2 | 9/2013 | Feng et al. |
| 8,640,951 B2 | 2/2014 | Frank et al. |
| 8,645,218 B2 | 2/2014 | Fraser et al. |
| 8,775,519 B2 | 7/2014 | Smith et al. |
| 8,849,720 B2 | 9/2014 | Nestor et al. |
| 9,251,518 B2* | 2/2016 | Levin ............... G06Q 30/0185 |
| 9,477,820 B2* | 10/2016 | Levin ................. G06F 21/10 |
| 2001/0018660 A1 | 8/2001 | Sehr |
| 2001/0034687 A1 | 10/2001 | Bushonville et al. |
| 2001/0049652 A1 | 12/2001 | Nakajima |
| 2002/0004762 A1 | 1/2002 | Izumoto |
| 2002/0019785 A1 | 2/2002 | Whitman |
| 2002/0023955 A1 | 2/2002 | Frank et al. |
| 2002/0029296 A1 | 3/2002 | Anuff et al. |
| 2002/0035605 A1 | 3/2002 | McDowell et al. |
| 2002/0040308 A1 | 4/2002 | Hasegawa et al. |
| 2002/0040346 A1 | 4/2002 | Kwan |
| 2002/0042729 A1 | 4/2002 | Yajima et al. |
| 2002/0052758 A1 | 5/2002 | Arthur et al. |
| 2002/0052965 A1 | 5/2002 | Dowling |
| 2002/0062265 A1 | 5/2002 | Poon |
| 2002/0065763 A1 | 5/2002 | Taylor et al. |
| 2002/0065783 A1 | 5/2002 | Na et al. |
| 2002/0072999 A1 | 6/2002 | Andres et al. |
| 2002/0082879 A1 | 6/2002 | Miller et al. |
| 2002/0082969 A1 | 6/2002 | O'Keefe et al. |
| 2002/0087456 A1 | 7/2002 | Abeshouse et al. |
| 2002/0091555 A1 | 7/2002 | Leppink |
| 2002/0094090 A1 | 7/2002 | Lino |
| 2002/0095357 A1 | 7/2002 | Hunter et al. |
| 2002/0095383 A1 | 7/2002 | Mengin et al. |
| 2002/0099831 A1 | 7/2002 | Tsunogai |
| 2002/0103849 A1 | 8/2002 | Smith |
| 2002/0107779 A1 | 8/2002 | Maltzman |
| 2002/0116343 A1 | 8/2002 | Nakamura et al. |
| 2002/0128922 A1 | 9/2002 | Joao |
| 2002/0138325 A1 | 9/2002 | Mashimo et al. |
| 2002/0138751 A1 | 9/2002 | Dutta |
| 2002/0138770 A1 | 9/2002 | Dutta |
| 2002/0138771 A1 | 9/2002 | Dutta |
| 2002/0143860 A1 | 10/2002 | Catan |
| 2002/0156715 A1 | 10/2002 | Wall et al. |
| 2002/0169623 A1 | 11/2002 | Call et al. |
| 2002/0174026 A1 | 11/2002 | Pickover et al. |
| 2002/0178093 A1 | 11/2002 | Dean et al. |
| 2002/0178226 A1 | 11/2002 | Anderson et al. |
| 2002/0188523 A1 | 12/2002 | Hyyppa et al. |
| 2002/0188551 A1 | 12/2002 | Grove et al. |
| 2002/0194267 A1 | 12/2002 | Flesner et al. |
| 2003/0007627 A1 | 1/2003 | Elsey et al. |
| 2003/0018582 A1 | 1/2003 | Yaacovi |
| 2003/0023500 A1 | 1/2003 | Boies et al. |
| 2003/0024988 A1 | 2/2003 | Stanard |
| 2003/0036966 A1 | 2/2003 | Amra et al. |
| 2003/0040943 A1 | 2/2003 | Bates et al. |
| 2003/0061303 A1 | 3/2003 | Brown et al. |
| 2003/0067464 A1 | 4/2003 | Gathman et al. |
| 2003/0069762 A1 | 4/2003 | Gathman et al. |
| 2003/0069763 A1 | 4/2003 | Gathman et al. |
| 2003/0069764 A1 | 4/2003 | Gathman et al. |
| 2003/0069789 A1 | 4/2003 | Gathman et al. |
| 2003/0069810 A1 | 4/2003 | Gathman et al. |
| 2003/0069827 A1* | 4/2003 | Gathman ............... G06Q 10/02 705/37 |
| 2003/0069829 A1 | 4/2003 | Gathman et al. |
| 2003/0093387 A1 | 5/2003 | Nakfoor |
| 2003/0105641 A1 | 6/2003 | Lewis |
| 2003/0120502 A1 | 6/2003 | Robb et al. |
| 2003/0154142 A1 | 8/2003 | Ginsburg et al. |
| 2003/0154169 A1 | 8/2003 | Yanai |
| 2003/0163373 A1 | 8/2003 | Cornateanu |
| 2003/0164400 A1 | 9/2003 | Boyd |
| 2003/0171960 A1 | 9/2003 | Skinner |
| 2003/0177022 A1 | 9/2003 | Francis |
| 2003/0185197 A1 | 10/2003 | Banerjee et al. |
| 2003/0187802 A1 | 10/2003 | Booth |
| 2003/0229790 A1 | 12/2003 | Russell |
| 2003/0236736 A1 | 12/2003 | Harmon et al. |
| 2004/0006497 A1 | 1/2004 | Nestor et al. |
| 2004/0015404 A1 | 1/2004 | McCarthy |
| 2004/0015409 A1 | 1/2004 | Chittenden et al. |
| 2004/0019571 A1 | 1/2004 | Hurwitz et al. |
| 2004/0023955 A1 | 2/2004 | Rodgers et al. |
| 2004/0039635 A1 | 2/2004 | Linde et al. |
| 2004/0039696 A1 | 2/2004 | Harmon et al. |
| 2004/0049412 A1 | 3/2004 | Johnson |
| 2004/0073439 A1 | 4/2004 | Shuster |
| 2004/0083156 A1 | 4/2004 | Schulze |
| 2004/0086257 A1 | 5/2004 | Werberg et al. |
| 2004/0093175 A1 | 5/2004 | Tan |

(56) References Cited

U.S. PATENT DOCUMENTS

| | | |
|---|---|---|
| 2004/0111303 A1 | 6/2004 | Francis |
| 2004/0128257 A1 | 7/2004 | Okamoto |
| 2004/0128516 A1 | 7/2004 | Okamoto et al. |
| 2004/0138962 A1 | 7/2004 | Kopelman et al. |
| 2004/0153374 A1 | 8/2004 | Nelson et al. |
| 2004/0172270 A1 | 9/2004 | Sugimoto et al. |
| 2004/0204990 A1 | 10/2004 | Lee et al. |
| 2004/0204991 A1 | 10/2004 | Monahan et al. |
| 2004/0215527 A1 | 10/2004 | Grove et al. |
| 2004/0220821 A1 | 11/2004 | Ericsson et al. |
| 2005/0001711 A1 | 1/2005 | Doughty et al. |
| 2005/0004818 A1 | 1/2005 | Liman |
| 2005/0015303 A1 | 1/2005 | Dubin et al. |
| 2005/0015308 A1 | 1/2005 | Grove et al. |
| 2005/0016575 A1 | 1/2005 | Kumar et al. |
| 2005/0021364 A1 | 1/2005 | Nakfoor |
| 2005/0021365 A1 | 1/2005 | Nakfoor |
| 2005/0021450 A1 | 1/2005 | Nakfoor |
| 2005/0027608 A1 | 2/2005 | Wiesmuller et al. |
| 2005/0027641 A1 | 2/2005 | Grove et al. |
| 2005/0027863 A1 | 2/2005 | Talwar et al. |
| 2005/0043994 A1 | 2/2005 | Walker et al. |
| 2005/0060399 A1 | 3/2005 | Murakami et al. |
| 2005/0065866 A1 | 3/2005 | Grove et al. |
| 2005/0071245 A1 | 3/2005 | Norins, Jr. et al. |
| 2005/0131809 A1 | 6/2005 | Watt, II et al. |
| 2005/0138175 A1 | 6/2005 | Kumar et al. |
| 2005/0139661 A1 | 6/2005 | Eglen et al. |
| 2005/0139662 A1 | 6/2005 | Eglen et al. |
| 2005/0140675 A1 | 6/2005 | Billingsley et al. |
| 2005/0144115 A1 | 6/2005 | Brett |
| 2005/0149458 A1 | 7/2005 | Eglen et al. |
| 2005/0160020 A1 | 7/2005 | Asher et al. |
| 2005/0209914 A1 | 9/2005 | Nquyen et al. |
| 2005/0209954 A1 | 9/2005 | Asher et al. |
| 2005/0228722 A1 | 10/2005 | Embree |
| 2005/0240453 A1 | 10/2005 | Lyons |
| 2005/0273405 A1 | 12/2005 | Chen |
| 2006/0017541 A1 | 1/2006 | Nguyen |
| 2006/0046717 A1 | 3/2006 | Bovell et al. |
| 2006/0069780 A1 | 3/2006 | Batni et al. |
| 2006/0081704 A1 | 4/2006 | Boyd |
| 2006/0082439 A1 | 4/2006 | Bazakos et al. |
| 2006/0085308 A1 | 4/2006 | Metzger |
| 2006/0085396 A1 | 4/2006 | Evan et al. |
| 2006/0095344 A1 | 5/2006 | Nakfoor |
| 2006/0100985 A1 | 5/2006 | Mark et al. |
| 2006/0105783 A1 | 5/2006 | Giraldin et al. |
| 2006/0108418 A1 | 5/2006 | Rice |
| 2006/0111967 A1 | 5/2006 | Forbes |
| 2006/0116916 A1 | 6/2006 | Bowman et al. |
| 2006/0124734 A1 | 6/2006 | Walierstorfer et al. |
| 2006/0126201 A1 | 6/2006 | Jain |
| 2006/0140374 A1 | 6/2006 | Light et al. |
| 2006/0143094 A1 | 6/2006 | Kohout et al. |
| 2006/0143109 A1 | 6/2006 | Goel |
| 2006/0143698 A1 | 6/2006 | Ohara |
| 2006/0144946 A1 | 7/2006 | Kuriyama et al. |
| 2006/0148566 A1 | 7/2006 | Lakshminarasimha |
| 2006/0155659 A1 | 7/2006 | DiCesare |
| 2006/0155857 A1 | 7/2006 | Feenan et al. |
| 2006/0161474 A1 | 7/2006 | Diamond et al. |
| 2006/0167756 A1 | 7/2006 | VonBergen et al. |
| 2006/0178930 A1 | 8/2006 | Kim |
| 2006/0190387 A1 | 8/2006 | Molloy |
| 2006/0190388 A1 | 8/2006 | Molloy |
| 2006/0190389 A1 | 8/2006 | Molloy |
| 2006/0190390 A1 | 8/2006 | Molloy |
| 2006/0195356 A1 | 8/2006 | Nerenhausen et al. |
| 2006/0232110 A1 | 10/2006 | Ovadia |
| 2006/0244564 A1 | 11/2006 | Madsen |
| 2006/0249572 A1 | 11/2006 | Chen et al. |
| 2006/0271462 A1 | 11/2006 | Harmon |
| 2006/0277130 A1 | 12/2006 | Harmon |
| 2006/0293929 A1 | 12/2006 | Wu et al. |
| 2006/0293994 A1 | 12/2006 | Stuart |
| 2007/0012765 A1 | 1/2007 | Trinquet et al. |
| 2007/0017979 A1 | 1/2007 | Wu et al. |
| 2007/0022020 A1 | 1/2007 | Bernstein |
| 2007/0027794 A1 | 2/2007 | Brett |
| 2007/0027798 A1 | 2/2007 | Brett |
| 2007/0033131 A1 | 2/2007 | Brett |
| 2007/0038582 A1 | 2/2007 | Brett |
| 2007/0055554 A1 | 3/2007 | Sussman et al. |
| 2007/0087756 A1 | 4/2007 | Hoffberg |
| 2007/0124232 A1 | 5/2007 | Brett |
| 2007/0124259 A1 | 5/2007 | Sussman et al. |
| 2007/0143194 A1 | 6/2007 | Fraser et al. |
| 2007/0245351 A1 | 10/2007 | Sussman et al. |
| 2007/0256137 A1* | 11/2007 | Tame .................. G07B 1/00 726/26 |
| 2008/0021998 A1 | 1/2008 | Wentink |
| 2008/0027827 A1 | 1/2008 | Eglen et al. |
| 2008/0059384 A1 | 3/2008 | Eglen et al. |
| 2008/0065566 A1 | 3/2008 | Eglen et al. |
| 2008/0154623 A1 | 6/2008 | Derker et al. |
| 2008/0235110 A1 | 9/2008 | Carter et al. |
| 2008/0243838 A1 | 10/2008 | Scott et al. |
| 2009/0030744 A1 | 1/2009 | Yamada |
| 2010/0082491 A1 | 4/2010 | Rosenblatt et al. |
| 2010/0106653 A1 | 4/2010 | Sandholm et al. |
| 2010/0113072 A1 | 5/2010 | Gibson et al. |
| 2010/0169130 A1 | 7/2010 | Fineman et al. |
| 2011/0060834 A1 | 3/2011 | Denker et al. |
| 2011/0125538 A1 | 5/2011 | Joao |
| 2011/0238454 A1 | 9/2011 | Nestor et al. |
| 2012/0075057 A1 | 3/2012 | Fyke et al. |
| 2012/0077431 A1 | 3/2012 | Fyke et al. |
| 2013/0159026 A1* | 6/2013 | Rogel .................. G06Q 10/02 705/5 |
| 2013/0311214 A1 | 11/2013 | Marti et al. |
| 2014/0091151 A1 | 4/2014 | Frank et al. |
| 2014/0127994 A1* | 5/2014 | Nightingale .......... H04W 4/008 455/41.1 |
| 2014/0378204 A1* | 12/2014 | Michel .................. G07F 17/329 463/17 |
| 2015/0180922 A1 | 6/2015 | Draznin et al. |

FOREIGN PATENT DOCUMENTS

| | | |
|---|---|---|
| CA | 2483133 | 2/2005 |
| EP | 0370146 A | 5/1990 |
| EP | 0828223 A2 | 3/1998 |
| EP | 950968 A1 | 10/1999 |
| EP | 1054335 A2 | 11/2000 |
| EP | 1069539 A2 | 1/2001 |
| EP | 1247230 | 9/2002 |
| EP | 1521205 | 9/2008 |
| GB | 2406690 | 4/2005 |
| GB | 2430294 | 3/2007 |
| JP | 53/142300 A | 12/1978 |
| JP | 5266049 | 10/1993 |
| JP | 11031204 A | 2/1999 |
| JP | 2001/236459 A | 8/2001 |
| JP | 2005/038048 A | 2/2005 |
| TW | 2006/12284 A | 4/2006 |
| WO | 88/03295 | 5/1988 |
| WO | 98/10361 | 3/1998 |
| WO | 99/06928 A1 | 2/1999 |
| WO | 99/18533 | 4/1999 |
| WO | 99/26203 A1 | 5/1999 |
| WO | 99/38129 | 7/1999 |
| WO | 99/60489 | 11/1999 |
| WO | 00/28485 | 5/2000 |
| WO | 00/62260 | 10/2000 |
| WO | 00/74300 A1 | 12/2000 |
| WO | 00/75838 A1 | 12/2000 |
| WO | 01/03040 A1 | 1/2001 |
| WO | 01/08065 A1 | 2/2001 |
| WO | 01/39055 | 5/2001 |
| WO | 0139091 | 5/2001 |
| WO | 01/41021 A1 | 6/2001 |
| WO | 01/41085 A2 | 6/2001 |

(56) References Cited

FOREIGN PATENT DOCUMENTS

| WO | 01/44892 A2 | 6/2001 |
| --- | --- | --- |
| WO | 01/52139 A1 | 7/2001 |
| WO | 01/59649 A2 | 8/2001 |
| WO | 01/59658 A1 | 8/2001 |
| WO | 01/71669 | 9/2001 |
| WO | 01/84473 | 11/2001 |
| WO | 02/03174 | 1/2002 |
| WO | 03/027808 A2 | 4/2003 |

OTHER PUBLICATIONS

Fujimura, "XML Ticket: Generalized Digital Ticket Definition Language", The W3C Signed XML Workshop/ Copyright© 1999, 33 pages.
Matsuyama, et al. "Distributed Digital/Ticket Management for Rights Trading System", E/Commerce, 1999; pp. 110-118.
In, Shirley Siu Weng, "A Proposed Electronic Ticket Management for trading Service in Internet", Feb. 9, 2001; 7 pages.
Article from Smart Card News, "Major Players Form Proton World International", Aug. 1998, pp. 141-160.
Fujimura, et at. "General/purpose Digital Ticket Framework", NTT Information and Communication Systems Labs, USENIX Workshop on Electronic Commerce; Aug. 31-Sep. 1998.
Fujimura, et at. "Digital/Ticket/Controlled Digital Ticket Circulation", NTT Information Sharing Platform Laboratories, USENIX Security Symposium, Aug. 23-26, 1999.
Chui, et at. "Auction on the Internate/ A Preliminary Study", Department of Marketing, HK University of Science and Technology; 1999, pp. 1-7.
Asokan, et at. "SEMPER Consortium: Advanced Services, Architecture and Design", Deliverable D1 of ACTS Project AC026, Mar. 15, 1999.
U.S. Appl. No. 09/702,794, filed Nov. 1, 2000.
International Search Report and Written Opinion (dated Apr. 11, 2008); International Application No. PCT/US07/86651; Filed Dec. 6, 2007.
Article from Website; Tech Web; "Byler Up: Ballparks Go High/Tech"; Mar. 31, 1999 (4 pages).
Article from Website; Sports Venue Technology; "Pacific Bell Park, San Francisco"; (5 pages).
"Acteva and Enspot.com Sign Agreement to Provide On/Line Ticketing, Broader Distribution", Business Wire (Dec. 3, 1999).
"Auction Net Still One/Of/A/Kind", Automotive News, S 12 (Sep. 20, 1993).
"Cathay Pacific Airways Auctions a Boeing 747/400 Worth of Seats in Third Cybertraveler Auction", Business Wire (Apr. 29, 1996).
"Cathay Pacific Airways/USA Receives More than 1,300 Bids During First Five Days of CyberAuction", Business Wire (Oct. 18, 1995).
"Cathay Pacific Airways/USA to Hold First/Ever Internet CyberAuction", Business VVire (Sep. 26, 1995).
"E/Ticket Board Launches PSL X change for Eight NFL Teams", PR Newswire (Jul. 18, 2000).
"E/TicketBoard Launches Revolutionary New Site/SeatsandSuites", PR Newswire (Oct. 17, 2000).
"Keyware Unveils Multi/Application Smart Card Suite", Card News, vol. 16, No. 10 (May 30, 2001).
"Online Movie Ticket Site Launched in China", China Online (Dec. 23, 1999).
"On Sale Brings Thrill of the Auction to the Web", Link/up p. 34 (Jul.-Aug. 1995).
"Season Ticket Solutions Announces Availability of Ticket Exchange for Sporting Teams and Entertainment Venues", Business Wire (Jul. 30, 2001).
"WBGH to Hold Online Computer Auction", Link/Up, p. 10 (Sep.-Oct. 1988).
Banatre, "Distributed Auction Bidding System", International Computing Symposium, vol. 4, No. 4 (Aug. 1981).
Banks, "PSL Put Owners on the Hot Seat", St. Petersburg Times, p. 10C (Oct. 31, 1993).
Beam et al, "Electronic Negotiation through Internet/Based Auctions", CITM Working Paper 96/WP/1 019, http://haas.berkeley.edu/citm/publications/papers/wp/1 019.pdf (Dec. 1996).
Blau, "Dormitories See Departure from Previous Years' Trends", The Tech, vol. 116, No. 38 (Aug. 30, 1996).
Boyes et al, "Auctions as an Allocation Mechanism in Academia: The Case of Faculty Offices", Journal of Economic Perspectives, vol. 3, No. 3, pp. 37-40 (Summer 1989).
Collier, "Columbia, S.C./Based Internet Firm Helps Buy, Sell Sports Tickets", The State, (Oct. 23, 2000).
Dickey, "Raider PSL Without Permanent Place", San Francisco Chronicle, p. B2 (Jun. 26, 1997).
Dickey, "Raiders' PSLs May Be for Life", San Francisco Chronicle, p. D5 (Mar. 26, 1997).
Fisher, "Secondary Market in Consolidation Mode", Street & Smith's Sports Business Journal, p. 3 (Jul. 23, 2007).
Flint, "Cyber Hope or Cyber Hype?", Air Transport World (Oct. 1996).
Garza, "Space Cruise", Reason (May 2000).
Happel, et al.; "Creating a Futures Market for Major Event Tickets: Problems and Prospects"; *Cato Journal*, vol. 21, No. 3; 2002 pp. 443-461.
Harlan, "At Least it isn't the Team's Ball that's in Somebody Else's Court", Wall Street Journal (Jun. 4, 1991).
Holbrook, "Oakland, Calif., Professional Football Team Sees Gain in Seat License Sales", Contra Costa Times (Feb. 26, 2001).
Hylton, "Dorm Lottery Starts Strong", The Tech, vol. 114, No. 34 (Aug. 29, 1994).
Jackson, "Media Futures: This Bazaar Could Put Retailers Under the Hammer", Financial Times (May 25, 1995).
Jenkins, "Giants Draw Fans into Web Team Helps Season/Ticket Holders Get Mileage Out of Plans", USA Today, p. 3C (Jun. 27, 2000).
Kasper, "Purchase Griz Playoff Tickets Now", Missoulian Online (May 3, 2001).
Koenig, "Texas Firm Links Sports Teams, Fans", Amarillo Globe/News, Feb. 20, 2000).
Kravets, "Going, Going, Gone! Real Estate Auctions in the 90s", Probate & Property, p. 38 (May-Jun. 1993).
Kroll et al, "The Commodity Futures Market Guide", Harper and Row, pp. 9-10 (1973).
Kumar, "With Stars in their Eyes, Travelers Look to Space", St. Petersburg Times, p. 1A (Jun. 11, 2000).
Labuszewski et al, "Inside the Commodity Option Markets", John Wiley & Sons, pp. 19-21 (1985).
Liao, "Sloan's Class Priority System Set to Go", The Tech, vol. 116, No. 25 (May 10, 1996).
Martin, "LiquidSeats Helps Fill the House, Sans Scalping" cnn.com, (Dec. 14, 2000) C51.
Matsumoto et al, "Feasibility of Space Tourism 'Cost Study for Space Tour'", Proceedings of $40^{th}$ IAF Congress, Paper IAF/89/700 (1989).
Menezes et al, "Simultaneous Pooled Auctions", The Journal of Real Estate Finance and Economics, vol. 17(3), pp. 219-232 (Nov. 19, 1996).
Moldovanu et al, "The Optimal Allocation of Prizes in Contests", http://www.sfb504.unimannheim.de/publications/dp99/75.pdf (Jul. 14, 1999).
Muret, "More Teams Gearing up to Offer Option of Stored/Credit Tickets", Street & Smith's Sports Business Journal, p. 12 (Jul. 9, 2007).
Nestor et al, "Transforming Tickets from a Commodity into a Valuable Strategic Asset", Global eTicket Exchange whitepaper, Oct. 13, 2000.
O'Neil, "Q and A", St. Louis Post/Dispatch, p. 4D (Jan. 19, 1995).
Pelline, "Cathay Pacific to Auction Off Airline Tickets on the Internet", San Francisco Chronicle, p. C4 (Apr. 30, 1996).
Riley et al, "Optimal Auctions", The American Economic Review, vol. 71, No. 3, pp. 381-392 (Jun. 1981).
Rosen et al, "Ticket Pricing", University of Chicago Center for the Study of the Economy and the State (Sep. 1995).

(56) References Cited

OTHER PUBLICATIONS

Rubel, "ETM to Ticketmaster: Let's Rock", Marketing News (Jun. 19, 1995).
Shulman, "VICS and Quick Response: Priority Issues for Mass Merchandisers", Supermarket Business, vol. 44, No. 10, p. 13(4) (Oct. 1989).
Stevenson, "Frosh Get at Least Fifth Choice Dorm: Women Find Shortage of Single/Sex Rooms", The Tech, vol. 115, No. 37 (Aug. 31, 1995).
Thomas, "Deadline Looms for Playoff Tickets; PSL Owners Have Until Dec. 8 to Make Purchase", St. Louis Post/Dispatch, p. D8 (Dec. 3, 1999).
Vanderporten, "Strategic Behavior in Pooled Condominium Auctions", Journal of Urban Economics 31, pp. 123-137 (1992).
Waddell, "Advantix, Tickets.com Hope Merger Brings Best of Both Ticketing Worlds", Amusement Business (Feb. 8, 1999).
Wagner, "How Retailers are Using Web Auctions to Let Customers Help Them Set Prices", http://www.internetretailer.com/printArticle.asp?id=3164 (Mar. 2001).
Weiner, "Are the Days Numbered for the Paper Ticket?", Street & Smith's Sports Business Journal, p. 17 (Jun. 18, 2007).
www.TicketOptions.com Web Pages, as retrieved from archive.org (2001).
www.SeasonTicket.com Web Pages, as retrieved from archive.org (2001).
Zoltak, "Advantix Acquisitions Continue with Prolix Deal", Amusement Business (Nov. 2, 1998).
Invitation to Pay Additional Fees and Partial International Search Report; International Appln. No. PCT/US2008/075265; mailed Apr. 15, 2009.
International Search Report and Written Opinion; International Application No. PCT/US2008/075265; date of mailing: Jun. 24, 2009.
Block, Adam, "Stubhub (a): Jan. 2004," Case Study No. SM/132A prepared for Stanford Graduate School of Business, Copyright 2005, Board of Trustees of the Leland Stanford Junior University (Exhibit C to Request for Ex Parte Reexamination of U.S. Pat. No. 8,126,991 82).
Dubin Claim Chart Jun. 5, 2012 (Exhibit H to Request for Ex Parte Reexamination of U.S. Pat. No. 8,126,991 B2).
Jannu Claim Chart Jun. 5, 2012 (Exhibit L to Request for Ex Parte Reexamination of U.S. Pat. No. 8,126,991 82).
Linthicum Claim Chart Jun. 5, 2012 (Exhibit J to Request for Ex Parte Reexamination of U.S. Pat. No. 8,126,991 82).
Linthicum, DavidS., "Enterprise Application Integration,"© 2000, Addison/Wesley Longman, Inc., Fifth Printing, Dec. 2003 (Exhibit D to Request for Ex Parte Reexamination of U.S. Pat. No. 8,126,991 82) (divided into 8 parts, pp. 1-75).
Linthicum, DavidS., "Enterprise Application Integration,"© 2000, Addison/Wesley Longman, Inc., Fifth Printing, Dec. 2003 (Exhibit D to Request for Ex Parte Reexamination of U.S. Pat. No. 8,126,991 82) (divided into 8 parts, pp. 76-100).
Linthicum, DavidS., "Enterprise Application Integration,"© 2000, Addison/Wesley Longman, Inc., Fifth Printing, Dec. 2003 (Exhibit D to Request for Ex Parte Reexamination of U.S. Pat. No. 8,126,991 B2) (divided into 8 parts, pp. 101-150).
Linthicum, DavidS., "Enterprise Application Integration,"© 2000, Addison/Wesley Longman, Inc., Fifth Printing, Dec. 2003 (Exhibit D to Request for Ex Parte Reexamination of U.S. Pat. No. 8,126,991 82) (divided into 8 parts, pp. 151-200).
Linthicum, DavidS., "Enterprise Application Integration,"© 2000, Addison/Wesley Longman, Inc., Fifth Printing, Dec. 2003 (Exhibit D to Request for Ex Parte Reexamination of U.S. Pat. No. 8,126,991 82) (divided into 8 parts, pp. 201-250).
Linthicum, DavidS., "Enterprise Application Integration,"© 2000, Addison/Wesley Longman, Inc., Fifth Printing, Dec. 2003 (Exhibit D to Request for Ex Parte Reexamination of U.S. Pat. No. 8,126,991 82) (divided into 8 parts, pp. 251-300).
Linthicum, DavidS., "Enterprise Application Integration,"© 2000, Addison/Wesley Longman, Inc., Fifth Printing, Dec. 2003 (Exhibit D to Request for Ex Parte Reexamination of U.S. Pat. No. 8,126,991 82) (divided into 8 parts, pp. 301-350)
Linthicum, DavidS., "Enterprise Application Integration,"© 2000, Addison/Wesley Longman, Inc., Fifth Printing, Dec. 2003 (Exhibit D to Request for Ex Parte Reexamination of U.S. Pat. No. 8,126,991 82) (divided into 8 parts, pp. 351-405).
Request for Ex Parte Reexamination of U.S. Pat. No. 8,126,991 82 to Smith eta/. Under 35 U.S.C. § 302 and 37 C.F.R. § 1.510, Jun. 5, 2012.
Murakami Claim Chart Jun. 5, 2012 (Exhibit M to Request for Ex Parte Reexamination of U.S. Pat. No. 8,126,991 82).
Stub Hub Claim Chart Jun. 5, 2012 (Exhibit I to Request for Ex Parte Reexamination of U.S. Pat. No. 8,126,991 82).
Sullivan Claim Chart Jun. 5, 2012 (Exhibit K to Request for Ex Parte Reexamination of U.S. Pat. No. 8,126,991 82).
Sullivan et al., ".Net e/8usiness Architecture,"© 2002, Sams Publishing, First Printing, Nov. 2001 (Exhibit E to Request for Ex Parte Reexamination of U.S. Pat. No. 8,126,991 82) (divided into 12 parts) (pp. 1-50).
Sullivan et al., ".Net e/8usiness Architecture,"© 2002, Sams Publishing, First Printing, Nov. 2001 (Exhibit E to Request for Ex Parte Reexamination of U.S. Pat. No. 8,126,991 82) (divided into 12 parts) (pp. 51-100).
Sullivan et al., ".Net e/8usiness Architecture,"© 2002, Sams Publishing, First Printing, Nov. 2001 (Exhibit E to Request for Ex Parte Reexamination of U.S. Pat. No. 8,126,991 82) (divided into 12 parts) (pp. 101-150).
Sullivan et al., ".Net e/8usiness Architecture,"© 2002, Sams Publishing, First Printing, Nov. 2001 (Exhibit E to Request for Ex Parte Reexamination of U.S. Pat. No. 8,126,991 82) (divided into 12 parts) (pp. 151-200).
Sullivan et al., ".Net e/8usiness Architecture,"© 2002, Sams Publishing, First Printing, Nov. 2001 (Exhibit E to Request for Ex Parte Reexamination of U.S. Pat. No. 8,126,991 82) (divided into 12 parts) (pp. 201-250).
Sullivan et al., ".Net e/8usiness Architecture,"© 2002, Sams Publishing, First Printing, Nov. 2001 (Exhibit E to Request for Ex Parte Reexamination of U.S. Pat. No. 8,126,991 82) (divided into 12 parts) (pp. 251-300).
Sullivan et al., ".Net e/8usiness Architecture,"© 2002, Sams Publishing, First Printing, Nov. 2001 (Exhibit E to Request for Ex Parte Reexamination of U.S. Pat. No. 8,126,991 82) (divided into 12 parts) (pp. 301-350).
Sullivan et al., ".Net e/8usiness Architecture,"© 2002, Sams Publishing, First Printing, Nov. 2001 (Exhibit E to Request for Ex Parte Reexamination of U.S. Pat. No. 8,126,991 82) (divided into 12 parts) (pp. 351-400).
Sullivan et al., ".Net e/8usiness Architecture,"© 2002, Sams Publishing, First Printing, Nov. 2001 (Exhibit E to Request for Ex Parte Reexamination of U.S. Pat. No. 8,126,991 82) (divided into 12 parts) (pp. 401-450).
Sullivan et al., ".Net e/8usiness Architecture,"© 2002, Sams Publishing, First Printing, Nov. 2001 (Exhibit E to Request for Ex Parte Reexamination of U.S. Pat. No. 8,126,991 82) (divided into 12 parts) (pp. 451-500).
Sullivan et al., ".Net e/8usiness Architecture,"© 2002, Sams Publishing, First Printing, Nov. 2001 (Exhibit E to Request for Ex Parte Reexamination of U.S. Pat. No. 8,126,991 82) (divided into 12 parts) (pp. 501-550).
Sullivan et al., ".Net e/8usiness Architecture,"© 2002, Sams Publishing, First Printing, Nov. 2001 (Exhibit E to Request for Ex Parte Reexamination of U.S. Pat. No. 8,126,991 82) (divided into 12 parts) (pp. 551-606).
U.S. Appl. No. 12/204,648, Non/Final Office Action mailed on Apr. 1, 2011, 28 pages.
U.S. Appl. No. 12/204,648, Notice of Allowance mailed on Nov. 25, 2011, 9 pages.
U.S. Appl. No. 13/358,469, Notice of Allowance mailed on May 4, 2012, 15 pages.
U.S. Appl. No. 13/606,934, Non/Final Office Action mailed on Jan. 6, 2014, 5 pages.
U.S. Appl. No. 13/606,934, Notice of Allowance mailed on Apr. 4, 2014, 6 pages.

(56) References Cited

OTHER PUBLICATIONS

U.S. Appl. No. 90/012,339, Request for Ex Parte Reexamination filed on Jun. 5, 2012, 118 pages.
U.S. Appl. No. 90/012,339, Determination/Reexam Ordered filed on Sep. 10, 2012, 19 pages.
U.S. Appl. No. 90/012,339, Non/Final Office Action filed on Jan. 17, 2013, 20 pages.
U.S. Appl. No. 90/012,339, Notice of Intent to Issue a Reexam Certificate filed on Jun. 5, 2013, 13 pages.
U.S. Appl. No. 12/204,648, Notice of Allowance mailed on Nov. 25, 2014, 6 pages.
U.S. Appl. No. 12/204,648, Non/Final Office Action mailed on Apr. 1, 2011, 17 pages.
Lumpur, K. "Wanted Live in Concert postponed to after Raya", New Straits Times, Oct. 25, 2000, p. 15.
Milwaukee Journal Sentinel, "Riverside comedy show canceled", Aug. 2, 1996, Milwaukee, Wis, p. 7.
Schacher, Y, "Ticket Scalping", Gotham Gazette, Jun. 11, 2001, http://www.gothamgazette.com/article/ /2001 0611/200/165.
Stub Hub, "Buyer Handbook", Apr. 2, 2002, Nwww.stubhub.com.
U.S. Appl. No. 10/731,410, Non/Final Office Action mailed on Oct. 2, 2009, 71 pages.
U.S. Appl. No. 10/731,410, Non/Final Office Action mailed on Sep. 1, 2010, 45 pages.
U.S. Appl. No. 10/731,410, Final Office Action mailed on Apr. 8, 2011, 85 pages.
U.S. Appl. No. 10/731,410, Non/Final Office Action mailed on Dec. 17, 2013, 95 pages.
U.S. Appl. No. 12/187,272, Non/Final Office Action mailed on Apr. 7, 2010, 8 pages.
U.S. Appl. No. 10/731,410, Notice of Allowance mailed on Jul. 29, 2010, 17 pages.
U.S. Appl. No. 12/716,616, Notice of Allowance mailed on Apr. 11, 2013, 6 pages.
U.S. Appl. No. 12/716,616, Non final office action mailed on Sep. 28, 2012, 12 pages.
International Preliminary Report dated Oct. 20, 2002 for PCT/US2000/032497, 3 pages.
U.S. Appl. No. 12/187,272, Notice of Allowance issued on Jul. 29, 2010, 4 pages.
U.S. Appl. No. 10/731,410, Non/Final Office Action issued on Jul. 16, 2014, 120 pages.
U.S. Appl. No. 10/731,410, Final Office Action issued on Jan. 28, 2015, 154 pages.
Business Wire: Season Ticket Solutions Announces Availability of Ticket Exchange for Sporting Teams and Entertainment Venues; Jul. 30, 2001; 3 pages.
Article from Website; Tech Web; "Byter Up: Ballparks Go High/Tech"; Mar. 31, 1999 4 pages.
Article from Website; Sports Venue Technology; "Pacific Bell Park, San Francisco"; 5 pages.
Happel, et al.; Creating a Futures Market for Major Event Tickets: Problems and Prospects Cato Journal, vol. 21, No. 3; 2002 pp. 443-461.
U.S. Appl. No. 14/202,218, First Action Interview/ Office Action mailed on Jul. 28, 2014, 2 pages.
U.S. Appl. No. 14/202,218, Pre/interview First Office Action mailed on Jun. 5, 2014, 5 pages.
International Search Report and Written Opinion; PCT/USOB/72364 (filing date: Aug. 6, 2008); mailed Jan. 30, 2009.
Office Action dated Mar. 29, 2011, U.S. Appl. No. 12/946,739.
Office Action dated Apr. 13, 2010, U.S. Appl. No. 12/187,295.
Office Action in U.S. Appl. No. 11/475,733 mailed on Jul. 27, 2007.
Office Action in U.S. Appl. No. 11/453,286 mailed on Aug. 2, 2007.
Office Action in U.S. Appl. No. 11/453,286 mailed on Nov. 5, 2007.
International Search Report for PCT Application/ PCT /US06/10295, mailing date Sep. 14, 2007.
"E/TicketBoard Launches PSL Xchange for Eight NFL Teams", PR Newswire (Jul. 18, 2000).
U.S. Appl. No. 14/553,902, filed Nov. 25, 2015, First Interview Office Action mailed May 4, 2015, all pages.
U.S. Appl. No. 14/553,902, filed Nov. 25, 2015, Final Office Action mailed Aug. 28, 2015, all pages.
U.S. Appl. No. 14/553,902, filed Nov. 25, 2015, Non/Final Office Action mailed Apr. 15, 2016, all pages.
U.S. Appl. No. 14/202,218, filed Mar. 10, 2014, Non/Final Office Action mailed Jan. 13, 2015, all pages.
U.S. Appl. No. 14/202,218, filed Mar. 10, 2014, Final Office Action mailed, Jun. 10, 2015, all pages.
U.S. Appl. No. 14/202,218, filed Mar. 10, 2014, Notice of Allowance mailed Sep. 30, 2015, all pages.
U.S. Appl. No. 14/049,909, filed Oct. 9, 2013, First Action Interview Office Action mailed Mar. 18, 2014, all pages.
U.S. Appl. No. 14/049,909, filed Oct. 9, 2013, Final Office Action mailed Sep. 2, 2014, all pages.
U.S. Appl. No. 14/049,909, filed Oct. 9, 2013, Non/Final Office Action mailed Sep. 18, 2015, all pages.
U.S. Appl. No. 15/005,970, filed Jan. 25, 2016, Preinterview first office action mailed Apr. 22, 2016, all pages.
U.S. Appl. No. 15/005,970, filed Jan. 25, 2016, Notice of Allowance mailed Jun. 16, 2016, all pages.

* cited by examiner

SYSTEM AND METHOD FOR USING UNIQUE DEVICE INDENTIFIERS TO ENHANCE SECURITY

CROSS-REFERENCE TO RELATED APPLICATIONS

The present application is a continuation application which claims the priority benefit under 35 USC 119(e) to U.S. Ser. No. 15/005,970, filed on Jan. 25, 2016, entitled "SYSTEMS AND METHODS FOR USING UNIQUE DEVICE IDENTIFIERS TO ENHANCE SECURITY," which is a continuation-in-part application of each of (1) U.S. Ser. No. 10/731,410, filed on Dec. 9, 2003, entitled "APPARATUS FOR ACCESS CONTROL AND PROCESSING," which claims priority to U.S. Provisional Application No. 60/431,865, filed on Dec. 9, 2002; (2) U.S. Ser. No. 14/049,909, filed on Oct. 9, 2013, entitled "TICKET VALIDATION AND ELECTRONIC CONVERSION OF TICKETS," which claims priority to U.S. Provisional Application No. 61/712,009, filed on Oct. 10, 2012; (3) U.S. Ser. No. 14/202,218, filed on Mar. 10, 2014, entitled "CENTRALIZED AND DEVICE-AWARE TICKET-TRANSFER SYSTEM AND METHODS," now U.S. Pat. No. 9,251,518, issued on Feb. 2, 2016, which claims priority to U.S. Provisional Application No. 61/791,123, filed on Mar. 15, 2013; and (4) U.S. Ser. No. 14/553,902, filed on Nov. 25, 2014, entitled "NETWORKED BARCODE VERIFICATION SYSTEM," which is a continuation application of U.S. Ser. No. 13/948,906, filed on Jul. 23, 2013, which is a divisional application of U.S. Ser. No. 12/716,616, filed on Mar. 3, 2010, which claims priority to U.S. Provisional Application No. 61/158,237, filed on Mar. 6, 2009; the disclosures of each of which are incorporated by reference herein in their entirety for all purposes.

TECHNICAL FIELD

This disclosure relates to the transferring of access rights between electronic devices. More specifically, this disclosure relates to enhancing the security of access-right transfers between devices by detecting and using device identifiers.

BACKGROUND

An increasing amount of electronic devices are configured for wireless communication. For example, an electronic device can transfer data to another electronic device (e.g., via a wireless connection). However, the electronic device receiving the data may transfer that data to another electronic device in an unauthorized manner. Accordingly, data transfer between devices can be insecure.

SUMMARY

In some embodiments, a computer-implemented method is provided for detecting and using device-identifying codes to enhance security of access-right transfers. The computer-implemented method may include receiving a first communication from a first electronic device associated with a first user. The first communication may correspond to a first request to retrieve access data associated with the first user. For example, the access data may correspond to one or more access rights. The method may also include receiving a second communication from the first electronic device. For example, the second communication may include a second request for an access right. Further, the method may include identifying first metadata associated with the second communication, identifying a first composite of the one or more first composites included in the first metadata, and identifying a first value that corresponds to the first composite. The first value may be representative of a first device identifier that uniquely identifies the first electronic device from amongst a plurality of electronic devices. The first metadata may include one or more first composites.

In addition, the method may include generating a first access code corresponding to the access right, receiving a third communication from the first electronic device, and verifying that a third request to transfer the access right corresponds to the first electronic device associated with the first user. The third communication may correspond to a third request to transfer the access right to a second user. Further, at least a portion of the first access code may include a representation of the first device identifier. The method may also include receiving a fourth communication from a second electronic device associated with the second user, extracting second metadata associated with the fourth communication, identifying a second composite from the one or more second composites, and identifying a second value corresponding to the second composite. The second metadata may include one or more second composites. The fourth communication may correspond to an indication to proceed with the transfer of the access right. Further, the second value may be representative of a second device identifier that uniquely identifies the second electronic device from amongst the plurality of electronic devices. The method may also include transforming the first access code corresponding to the access right into a second access code, such that the second access code facilitates entry to the first spatial area for the second user, but not for the first user, and transmitting, to the second electronic device, a fifth communication that includes the second access code. At least a portion of the second access code may include a representation of the second device identifier.

In some embodiments, a computer-implemented method is provided. The method may be for enhancing security of access-data transfers between near-field communication (NFC) devices. The method may include receiving, at an access management system, a first communication from a first NFC device associated with a first user. The first NFC device may be configured to include a first set of sensors and a first communication interface to facilitate wireless communication. Further, the first communication may correspond to a first request to retrieve access data associated with the first user. The access data may correspond to one or more access rights. The method may also include receiving, at the access management system, a second communication from the first NFC device where the second communication can include a second request for an access right from amongst the one or more access rights. The access right may facilitate entry to a first spatial area for the first user. The method may include generating, at the access management system, a first access code corresponding to the access right where at least a portion of the first access code can include a representation of a first device identifier that uniquely identifies the first NFC device from amongst a plurality of electronic devices.

The method may include transmitting, at the access management system, the first access code to the first NFC device. The method may also include identifying, at the first NFC device, a second NFC device associated with a second user. The second NFC device being configured to include a second set of sensors, a display, and a second communication interface to facilitate wireless communication. The second NFC device may be physically located in a proximate vicinity to the first NFC device. Further, identification of the second NFC device can establish an NFC communication channel between the first NFC device and the second NFC device. In addition, the method may include detecting, at the first NFC device, a trigger event at the first set of sensors of the first NFC device. Detection of the trigger event can initiate a transformation of the first access code into a second access code. At least a portion of the second access code may include a representation of a second device identifier that uniquely identifies the second NFC device from amongst the plurality of electronic devices.

In some embodiments, a computer program product or system is provided that is tangibly embodied in a non-transitory machine-readable storage medium. The computer program product or system includes instructions configured to cause one or more data processors to perform actions including part or all of a method disclosed herein.

BRIEF DESCRIPTION OF THE DRAWINGS

The present disclosure is described in conjunction with the appended figures.

Figure 1:
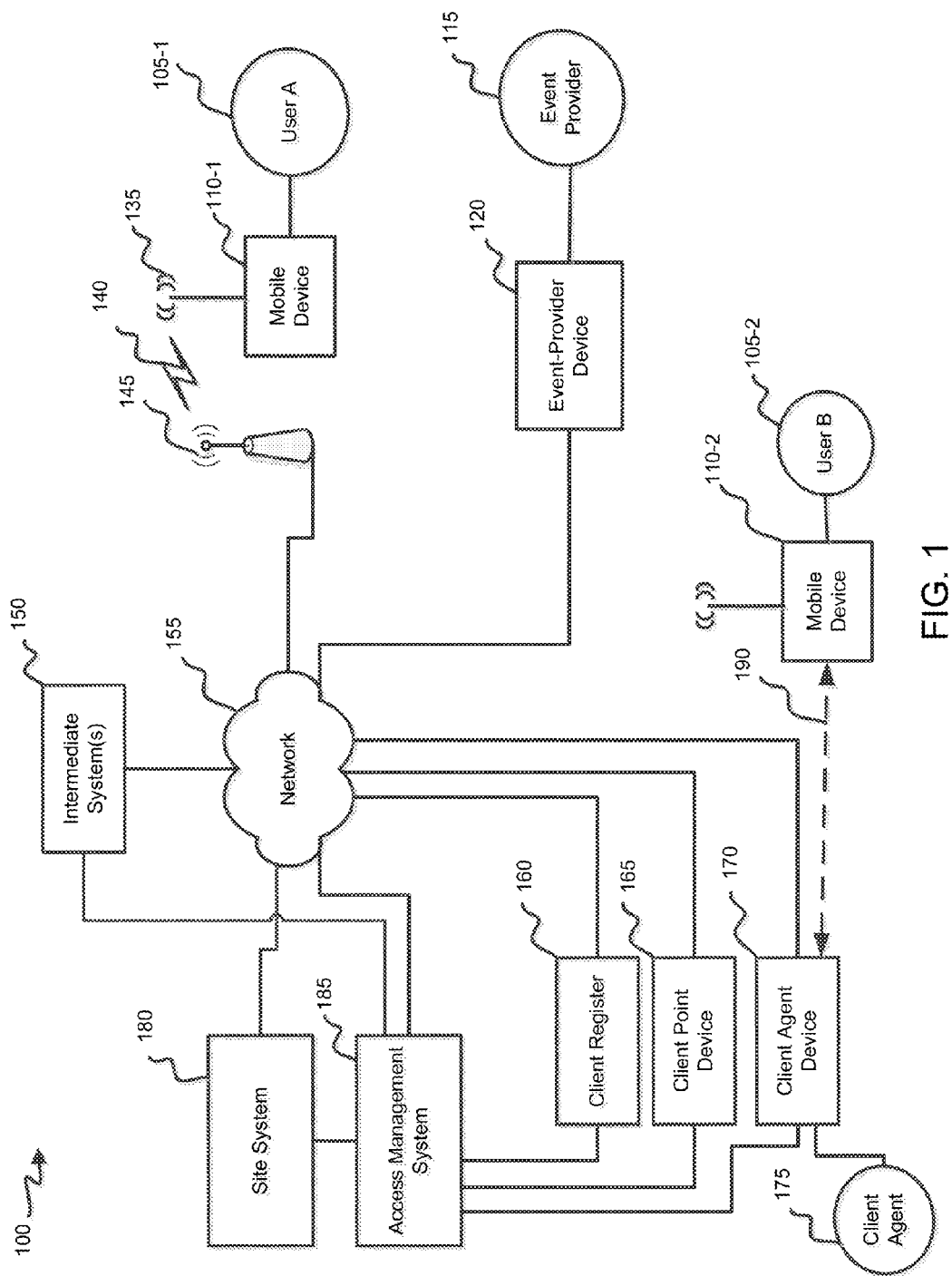
FIG. 1 depicts a block diagram of an embodiment of a resource access-facilitating interaction system.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

DETAILED DESCRIPTION

The ensuing description provides preferred exemplary embodiment(s) only and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes can be made in the function and arrangement of elements without departing from the spirit and scope as set forth in the appended claims.

Certain aspects and features of the present disclosure relate to detection and use of unique device identifiers to enhance the security of data transfers between electronic devices. A first electronic device can transfer access data (e.g., the data to be transferred) to a second electronic device. The first electronic device can be associated with a first user and the second electronic device can be associated with a second user. The access data can correspond to one or more access rights, and an access right can be associated with a first access code. The first access code may indicate that an access right is valid with respect to the first electronic device. For example, the access right may facilitate access to one or more resources associated with the access right when the resources are accessed using the first access code. In some embodiments, the first access code can be generated so as to include at least a portion of data representing a first device identifier associated with the first electronic device. The first device identifier can uniquely identify the first electronic device from a plurality of electronic devices. The first device identifier can be based on or include a characteristic of the first electronic device (e.g., a media access control (MAC) address).

The first electronic device can transfer the access right to a second electronic device so that the access right is associated with the second user, instead of the first user. Transferring the access data can involve transforming the first access code into a second access code. The second access code can include data representing a second device identifier associated with the second electronic device. The second device identifier can uniquely identify the second electronic device from amongst a plurality of electronic devices. Further, the second device identifier can be based on or include a characteristic of the second electronic device. Transforming the first access code into the second access code serves to invalidate the first access code and facilitate access to a resource associated with the access right for the second user. The second access code facilitates access to the resource using the second electronic device, but the first electronic device can no longer be used to access the resource.

In some embodiments, an access right can be associated with the first access code. Further, a physical manifestation of the access right can be converted into an electronic representation of the access right. Converting the physical manifestation of the access right can include transforming the first access code (e.g., associated with the physical manifestation of the access right) into a second access code (e.g., associated with the electronic manifestation of the access right). At least a portion of the second access code can include data representing the device identifier of a second electronic device used to display the electronic representation. The access management system can receive a request to convert the physical manifestation of the access right into an electronic representation of the access right. The access management system can transform the first access code into a second access code. The second access code can include data representing a unique device identifier for an electronic device associated with the electronic representation of the access right (e.g., an electronic device that displays the electronic representation of the access right). Transforming the first access code into the second access code can invalidate the first access code.

In some embodiments, an access right can be associated with a first access code. A first user may update one or more parameters attributed to the access right. An update to a parameter attributed to the access right can initiate a transformation of the first access code into a second access code. The second access code can be associated with an electronic device. For example, a visual representation of the second access code can be displayed on the electronic device. Further, the second access code can include at least a section representing an identifier that uniquely identifies the electronic device from a plurality of electronic devices. For example, the identifier can correspond to one or more components of the electronic device. An example of a component can include a network interface card. The identifier can include an identifying code (e.g., a serial number) associated with the component. For example, the second access code can include data representing the identifier of the component.

Certain aspects of the present disclosure relate to secure transfer of data between devices using near-field communication (NFC) technology. For example, a first electronic device can transfer an access right to a second electronic device over an NFC channel established between the devices. Further, a trigger event may be detected at one or both of the electronic devices (e.g., a bumping motion, tapping motion, or other suitable motion) and may automatically initiate transformation of the first access code into a second access code. The second access code can include at least a portion of data representing a device identifier of the second electronic device (e.g., a MAC address, an address associated with the NFC interface card of the second electronic access, and the like). After transformation of the first access code into the second access code, the first electronic device can transmit the first or second access code to the second electronic device over an NFC communication channel.

Accordingly, unauthorized transfer of the second access code (e.g., to an unauthorized third electronic device) can be prevented and security of data transfers can be enhanced by comparing the device identifier included in the second access code with a device identifier of the device being used to display the second access code to determine whether a match exists. If a match does exist, the access management system can facilitate access to resources associated with one or more access rights.

FIG. 1 depicts a block diagram of an embodiment of a resource management system 100, according to an embodiment of the present disclosure. Mobile device 110 (which can be operated by a user 105) and an event-provider device 120 (which can be operated, controlled, or used by an event provider 115) can communicate with an access management system 185 directly or via another system (e.g., via an intermediate system 150). Mobile device 110 may transmit data to access point 145, which is connected to network 155, over communication channel 140 using antennae 135. While FIG. 1 illustrates mobile device 110 communicating with access point 145 using a wireless connection (e.g., communication channel 140), in some embodiments, mobile device 110 may also communicate with access point 145 using a wired connection (e.g., an Ethernet connection). Mobile device 110 can also communicate with one or more client devices, such as a client agent device 170 operated by a client agent 175, a client register 160 or a client point device 165 using a wired or wireless connection. In addition, using the access management system 185, an event provider 115 can identify an event, a parameter of attending the event, a date or dates of the event, a location or locations of the event, etc. Each inter-system communication can occur over one or more networks 155 and can facilitate transmission of a variety of types of data. It will be understood that, although only one of various systems, devices, entities and network are shown, the resource management system 100 can be extended to include multiple of any given system(s), device(s), entity(ies), and/or networks.

Access management system 185 can be configured to manage a dynamic set of access rights to one or more resources. More specifically, access management system 185 can track which resources are to be made available to users, specifications of the resources and times at which they will be available. Access management system 185 can also allocate access rights for resources and facilitate transmissions of notifications of the available rights to a set of user devices. For example, access management system 185 can alert users of the availability via a website, app page or email. As another example, access management system can transmit data about access rights and resources to one or more intermediate systems 150, which can facilitate distribution of access-right availability and processing of requests for such rights.

Notifications of available access rights can be accompanied by options to request that one or more access rights be assigned to a user. Therefore, user 105 can provide input to mobile device 110 via an interface to request such assignment and provide other pertinent information. Intermediate system 150 and/or access management system 185 can process the request to ensure that the requested access right(s) remain available and that all required information has been received and, in some instances, verified. Thereafter, access management system 185 can assign one or more access rights to the user, e.g., matching the access rights requested by the user.

Assigning an access right can include, for example, associating an identifier of the right with an identifier of a user, changing a status of the right from available to assigned, facilitating a cease in notifications that the access right is available, generating an access-enabling code to use such that the corresponding access will be permitted and/or generating a notification to be received at mobile device 110 confirming the assignment and/or including data required for corresponding access to be permitted.

In some instances, a resource is at least partly controlled, by a client. The resource may be accessed at a particular location or structure, and a variety of client devices may be present at the location so as to facilitate usage of an access right. Exemplary client devices can include client agent device 170, which can be one operated by a client agent 175 (e.g., a human client agent), a client register 160 (e.g., which can operate independently of an agent and/or can be connected to or include a device that, while in a locked mode, can impede resource access, such as a turnstile) and client point device 165 (e.g., which can operate independently of an agent and/or can be positioned at or around the resource-associated location. For example, in some instances client agent device 170 can be operated by an agent at a location for a resource that is an event ("event resource") taking place at the location. In this example, client agent device 170 is used by an agent that is manning an entrance to the location (e.g., which can include, for example, a location of a structure or a geographic region) or a part thereof; client register 160 can be or can be connected to a turnstile, gate or lockable door that is positioned along a perimeter or entrance to a resource-associated location or part thereof; and client point device 165 can be an electronic device positioned at or within a resource-associated location.

In some instances, mobile device 110 performs particular functions upon detecting a client device and/or the contrary. For example, mobile device 110 may locally retrieve or request (e.g., from an external source) an access-enabling code. The access-enabling code can be transmitted to the client device or a remote server (e.g., a server hosting access management system 185) for evaluation and/or can be locally evaluated. The evaluation can include, for example, confirming that the access-enabling code has a particular characteristic or format (e.g., generally or one characteristic corresponding to a particular resource or type of access), matches one in an access-enabling code data store and/or has not been previously redeemed. A result of the evaluation can be locally displayed at an evaluating device, can control a device component (e.g., a physical access control module), and/or can be transmitted to another device, such as mobile device 110.

In some instances, user 105 can use multiple mobile devices 110 to perform various operations (e.g., using one device to request an access right and another to interact with client devices). Some instances of mobile device 110, access management system 185, intermediate system 150, client agent device 170, client register 160 and/or client point device 165 can include a portable electronic device (e.g., a smart phone, tablet, laptop computer or smart wearable device) or a non-portable electronic device (e.g., one or more desktop computers, servers and/or processors).

In exemplary embodiments, access rights can be represented in data maintained at a client device or at access management system 185. For example, a database or data store include a list of identifiers for each user or user device having an assigned access right for a resource or associating an identifier for each user or user device with an identifier of a particular access right. In some instances, indicia can be transmitted to a user device that indicates that an access right is availed. In various instances, it may be permitted or prohibited for the indicia to be transferred. The indicia may be provided as part of an electronic or physical object (e.g., a right to access an event) or independently. The indicia may include an access-enabling code.

In some instances, access management system 185 communicates with one or more intermediate systems 150, each of which may be controlled by a different entity as compared to an entity controlling access management system 185. For example, access management system 185 may assign access rights to intermediate systems 150 (e.g., upon acceptance of terms). Intermediate system 150 can then collect data pertaining to the assigned access rights and/or a corresponding event, can format and/or edit the data, generate a notification of availability of the access rights that includes the formatted and/or edited data and facilitate presentation of the notification at a mobile device 110. When intermediate system 150 receives a communication from the mobile device 110 indicative of an access-right request, intermediate system 150 can facilitate assignment (or reassignment) of an access right to the user (e.g., by transmitting relevant information to access management system 185 identifying the user and/or user device and/or by transmitting relevant information to mobile device 110 pertaining to the access right).

A resource can include one managed or provided by a client, such as a performing entity or an entity operating a venue. A mobile device 110 can transmit data corresponding to the access right (e.g., an access-enabling code) to a client device upon, for example, detecting the client device, detecting that a location of the mobile device 110 is within a prescribed geographical region, or detecting particular input. The receiving client device may include, for example, a client agent device 170 operated at an entrance of a defined geographical location or a client register 160 that includes or is attached to a locking turnstile. The client device can then analyze the code to confirm its validity and applicability for a particular resource and/or access type, and admittance to the event can be accordingly permitted. For example, a turnstile may change from a locked to an unlocked mode upon confirmation of the code's validity and applicability.

Each of the depicted devices and/or systems may include a software agent or application ("app") that, when executed, performs one or more actions as described herein. In some instances, a software agent or app on one device is, at least in part, complementary to a software agent or app on another device (e.g., such that a software agent or app on mobile device 110 is, at least in part, complementary to at least part of one on access management system 185 and/or a client device; and/or such that a software agent or app on intermediate system 150 is, at least in part, complementary to at least part of one on access management system 185).

In some instances, a network in the one or more networks 155 can include an open network, such as the Internet, personal area network, local area network (LAN), campus area network (CAN), metropolitan area network (MAN), wide area network (WAN), wireless local area network (WLAN), a private network, such as an intranet, extranet, or other backbone. In some instances, a network in the one or more networks 155 includes a short-range communication channel, such as Bluetooth or Bluetooth Low Energy channel. Communicating using a short-range communication such as BLE channel can provide advantages such as consuming less power, being able to communicate across moderate distances, being able to detect levels of proximity, achieving high-level security based on encryption and short ranges, and not requiring pairing for inter-device communications.

In one embodiment, communications between two or more systems and/or devices can be achieved by a secure communications protocol, such as secure sockets layer (SSL), transport layer security (TLS). In addition, data and/or transactional details may be encrypted based on any convenient, known, or to be developed manner, such as, but not limited to, DES, Triple DES, RSA, Blowfish, Advanced Encryption Standard (AES), CAST-128, CAST-256, Decorrelated Fast Cipher (DFC), Tiny Encryption Algorithm (TEA), eXtended TEA (XTEA), Corrected Block TEA (XX-TEA), and/or RC5, etc.

It will be appreciated that, while a variety of devices and systems are shown in FIG. 1, in some instances, resource management system 100 can include fewer devices and/or systems. Further, some systems and/or devices can be combined. For example, a client agent device 170 may also serve as an access management system 185 or intermediate system 150 so as to as to facilitate assignment of access rights.

As described in further detail herein, an interaction between mobile device 110 and a client device (e.g., client agent device 170, client register 160 or client point device 165) can facilitate, for example, verification that user 105 has a valid and applicable access right, obtaining an assignment of an access right, and/or obtaining an assignment of an upgraded access right.

In addition, mobile device 110-2, which is operated by user 125-2, may include a user device that is located at a stadium or concert hall during an event. Mobile device 110-2 may directly interact with a client device (e.g., client agent device 170, client register 160 or client point device 165), which is also located at the stadium or concert hall during the event. As such, the access management system 185 may be updated or accessed by mobile device 110-2 via the client agent device 170. For example, mobile device 110-2 may communicate with the client agent device 170 over a short-range communication channel 190, such as Bluetooth or Bluetooth Low Energy channel, Near Field Communication (NFC), Wi-Fi, RFID, Zigbee, ANT, etc. Communicating using a short-range communication such as BLE channel can provide advantages such as consuming less power, being able to communicate across moderate distances, being able to detect levels of proximity, achieving high-level security based on encryption and short ranges, and not requiring pairing for inter-device communications. After the short-range communication link 190 is established, mobile device 110-2 may communicate with the access management system 185 and access the item or items of resources. That is, while mobile device B is configured to communicate over network 155, mobile device 110-2 may communicate with the access management system 185 via the client agent device 170, instead of the network 155.

It will be appreciated that various parts of system 100 can be geographically separated. It will further be appreciated that system 100 can include a different number of various components rather than a number depicted in FIG. 1. For example, two or more of access assignment systems 185; one or more site systems 180; and intermediate system 150 may be located in different geographic locations (e.g., different cities, states or countries).

Figure 2:
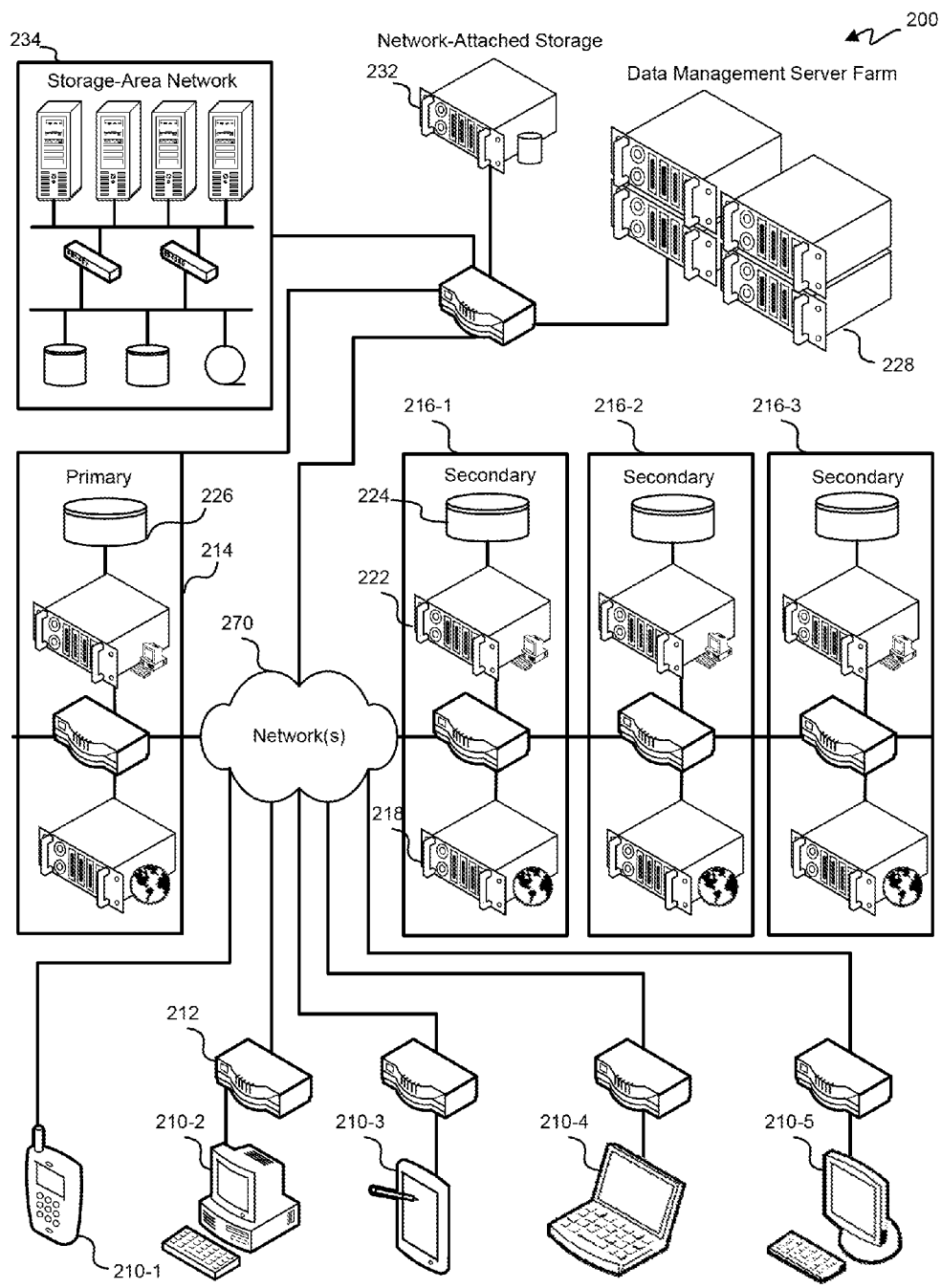
FIG. 2 shows an illustration of hardware and network connections of a resource access-facilitating interaction system according to an embodiment of the invention.

FIG. 2 shows an illustration of hardware and network connections of a resource access-facilitating interaction system 200 according to an embodiment of the invention. Each of various user devices 210-1, 210-2, 210-3, 210-4 and 210-5 can connect, via one or more inter-network connection components (e.g., a router 212) and one or more networks 270 to a primary assignment management system 214 or a secondary assignment management system 216-1, 216-2 or 216-3.

Primary assignment management system 214 can be configured to coordinate and/or control initial assignment of access rights. Secondary assignment management system 216 can be configured to coordinate and/or control reassignment and/or transfer of access rights (e.g., from one user or user device to another or from an intermediate agent to a user or user device). Such transfer may occur as a result of a sale or fee payment. Secondary assignment management system 216 may also manage transfer offers (e.g., to allow a first user to identify a price at which a transfer request would be granted and to detect if a valid request is received). It will be appreciated that, although primary assignment management system 214 is shown to be separate from each secondary assignment management system 216, in some instances, an assignment management system may relate to both a primary and secondary channel, and a single data store or a localized cluster of data stores may include data from both channels.

Each of primary access assignment system 214 and secondary access assignment system 216 can include a web server 218 that processes and responds to HTTP requests. Web server 218 can retrieve and deliver web-page data to a user device 210 that, for example, identify a resource, identify a characteristic of each of one or more access rights for the resource, include an invitation to request assignment of an access right, facilitate establishment or updating of an account, and/or identify characteristics of one or more assigned access rights. Web server 218 can be configured to support server-side scripting and/or receive data from user devices 210, such as data from forms or file uploads.

In some instances, a web server 218 can be configured to communicate data about a resource and an indication that access rights for the resource are available. Web server 218 can receive a request communication from a user device 210 that corresponds to a request for information about access rights. The request can include one or more constraints, which can correspond to (for example) values (e.g., to be matched or to define a range) of particular fields.

A management server 222 can interact with web server 218 to provide indications as to which access rights' are available for assignment, characteristics of access rights and/or what data is needed to assign an access right. When requisite information is received (e.g., about a user and/or user device, identifying a final request for one or more access rights, including payment information, and so on), management server 222 can coordinate an assignment of the one or more access rights. The coordination can include updating an access-right data store to change a status of the one or more access rights (e.g., to assigned); to associate each of the one or more access rights with a user and/or user device; to generate or identify one or more access-enabling codes for the one or more access rights; and/or to facilitate transmission reflecting the assignment (e.g., and including the one or more access-enabling codes) to a user device.

Management server 222 can query, update and manage an access-right data store to identify access rights' availability and/or characteristic and/or to reflect a new assignment. The data store can include one associated with the particular assignment system. In some instances, the data store includes incomplete data about access rights for a resource. For example, a data store 224 at and/or used by a secondary access assignment system 216 may include data about an incomplete subset of access rights that have been allocated for a particular resource. To illustrate, a client agent may have indicated that an independent intermediary system can (exclusively or non-exclusively) coordinate assignment of a portion of access rights for a resource but not the remainder. A data store 224 may then, for example, selectively include information (e.g., characteristics, statuses and/or assignment associations) for access rights in the portion.

Data store 224 or 226 associated with a particular primary or secondary access assignment system can include assignment data for a set of access rights that are configured to be set by the particular primary or secondary access assignment system or by another system. For example, a rule can indicate that a given access right is to have an available status until a first of a plurality of access assignment systems assigns the access right. Accordingly, access assignment systems would then need to communicate to alert each other of assignments.

In one instance, management server 222 (or another server in an access assignment system) sends a communication to a central data management server farm 228 reflecting one or more recent assignments. The communication may include an identification of one or more access rights, an indication that the access right(s) have been assigned, an identification of a user and/or user device associated with the assignment and/or one or more access-enabling codes generated or identified to be associated with the assignment. The communication can be sent, for example, upon assigning the access right(s), as a precursor to assigning the access right(s) (e.g., to confirm availability and/or request assignment authorization), at defined times or time intervals and/or in response to an assignment-update request received from data management server farm 228.

Data management server farm 228 can then update a central data store to reflect the data from the communication. The central data store can be part of, for example, a network-attached storage 232 and/or a storage-area network 234.

In some instances, a data store 224 or 226 can include a cache, that includes data stored based on previous communications with data management server farm 228. For example, data management server farm 228 may periodically transmit statuses of a set of access rights (e.g., those initially configured to be assignable by an access assignment system) or an updated status (e.g., indicating an assignment) of one or more access rights. As another example, data management server farm 228 may transmit statuses upon receiving a request from an access assignment system for statuses and/or authorization to assign one or more access rights.

An access assignment system may receive statuses less frequently or at times unaligned with requests received from user devices requesting information about access rights and/or assignments. Rather than initiate a central data store query responsive to each user-device request, a management server 222 can rely on cached data (e.g., locally cached data) to identify availability of one or more access rights, as reflect in webpage data and/or communications responsive to request communications for access-right information. After requisite information has been obtained, management server 222 can then communicate with data management server farm 228 to ensure that one or more particular access rights have remained available for assignment.

In some instances, one or more of primary access assignment system 214 and/or a secondary access assignment system 214 need not include a local or system-inclusive data store for tracking access-right statuses, assignments and/or characteristics. Instead, the access assignment system may communicate with a remote and/or central data store (e.g., network-attached storage 232 or storage-area network 234).

Access management system 120 can include a primary access assignment system 214 and/or a secondary access assignment system 214; data management server farm 228; and/or a central data store (e.g., network-attached storage 232 or storage-area network 234). Each of one or more intermediate systems 130 can include a primary access assignment system 214 and/or a secondary access assignment system 214.

Data management server farm 228 may periodically and/or routinely assess a connection with an access assignment system 214. For example, a test communication can be sent that is indicative of a request to respond (e.g., with particular data or generally). If a response communication is not received, if a response communication is not received within a defined time period and/or if a response communication includes particular data (e.g., reflecting poor data integrity, network speed, processing speed, etc.), data management server farm 228 may reconfigure access rights and/or permissions and/or may transmit another communication indicating that assignment rights of the access assignment system are limited (e.g., to prevent the system from assigning access rights).

It will be appreciated that various parts of system 200 can be geographically separated. For example, two or more of primary access assignment system 214; one or more of secondary access assignment systems 214; and data management server farm 228 may be located in different geographic locations (e.g., different cities, states or countries).

It will further be appreciated that system 200 can include a different number of various components rather than a number depicted in FIG. 2. For example, system 200 can include multiple data management server farms 228, central data stores and/or primary access assignment systems 214 (e.g., which can be geographically separated, such as being located in different cities, states or countries). In some instances, processing may be split (e.g., according to a load-balancing technique) across multiple data management server farms 228 and/or across multiple access assignment systems 214. Meanwhile, the farms and/or systems can be configured to accept an increased or full load should another farm and/or system be unavailable (e.g., due to maintenance). Data stored in a central data store may also be replicated in geographically separated data stores.

Figure 3:
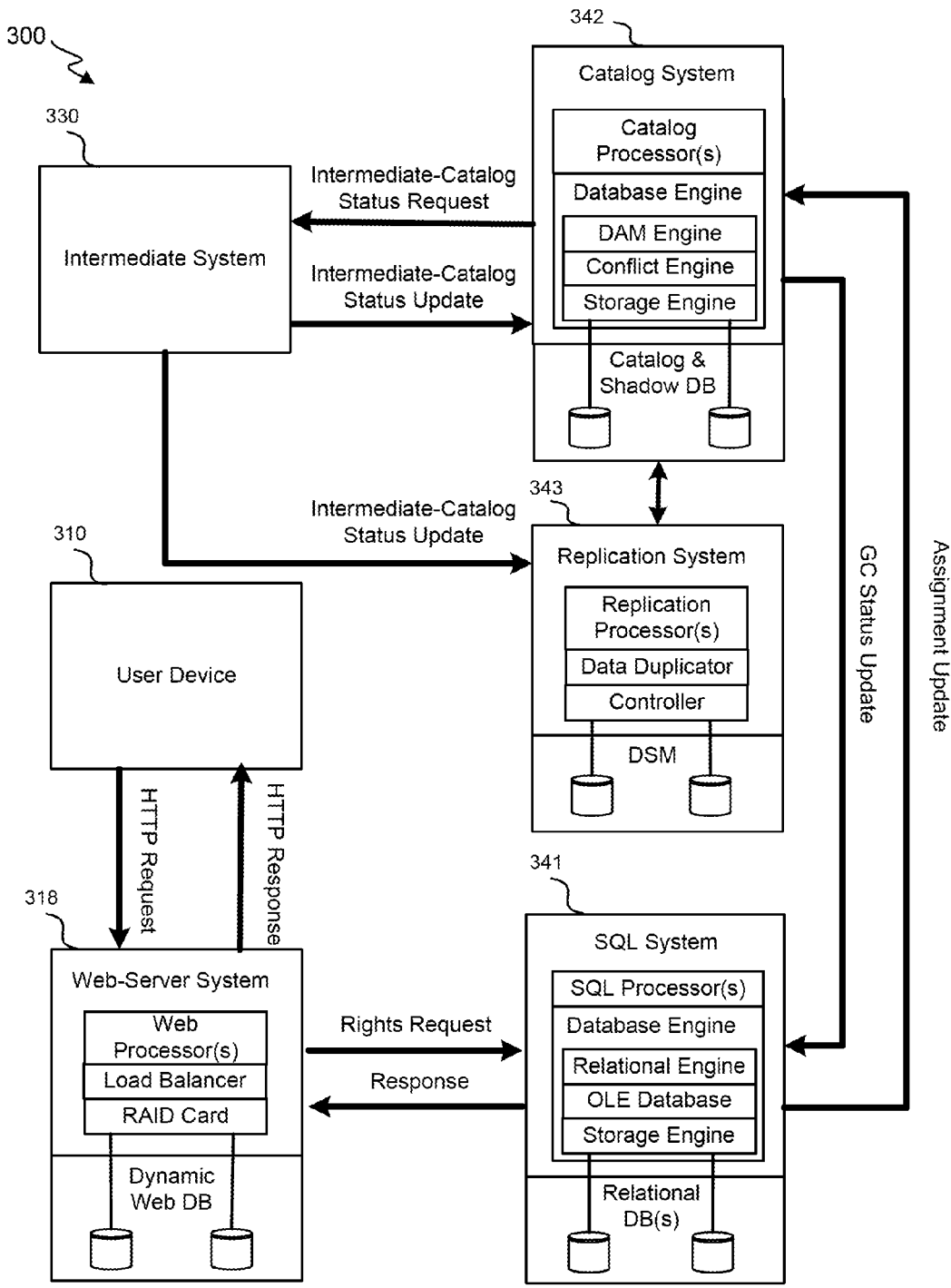
FIG. 3 shows an illustration of a communication exchange between components involved in a resource access-facilitating interaction system according to an embodiment of the invention.

FIG. 3 shows an illustration of a communication exchange between components involved in a resource access-facilitating interaction system 300 according to an embodiment of the invention. A user device 310 can send one or more HTTP requests to a web-server system 318, and web-server system 318 can respond with one or more HTTP responses that include webpage data. The webpage data can include, for example, information about one or more resources, characteristics of a set of access rights for each of the one or more resources, availability of one or more access rights, an invitation to request an assignment of one or more access rights and/or indications as to what information is required for an access-right assignment. HTTP requests can include assignment-request data (e.g., a resource identification, requisite information, and/or an identification of an access-right constraint or access right).

Web-server system 318 can include one or more web processors (e.g., included in one or more server farms, which may be geographically separated) to, for example, map a path component of a URL to web data (e.g., stored in a local file system or generated by a program); retrieve the web data; and/or generate a response communication including the web data. Web processor can further parse communication to identify input-corresponding data in HTTP requests, such as field values required for an access-right assignment.

Web-server system 318 can also include a load balancer to distribute processing tasks across multiple web processors. For example, HTTP requests can be distributed to different web processors. Load-balancing techniques can be configured so as, for example, to distribute processing across servers or server farms, decrease a number of hops between a web server and user device, decrease a geographical location between a user device and web server, etc.

Web-server system 318 can further include a RAID component, such as a RAID controller or card. A RAID component can be configured, for example, to stripe data across multiple drives, distribute parity across drives and/or mirror data across multiple drives. The RAID component can be configured to improve reliability and increase request-processing speeds.

Web-server system 318 can include one or more distributed, non-distributed, virtual, non-virtual, local and/or remote data stores. The data stores can include web data, scripts and/or content object (e.g., to be presented as part or web data).

Some HTTP requests include requests for identifications of access-right characteristics and/or availability. To provide web data reflecting such information, web-server system 318 can request the information from another server, such as an SQL system 341 (e.g., which may include one or more servers or one or more server farms).

SQL system 341 can include one or more SQL processors (e.g., included in one or more server farms, which may be geographically separated). SQL processors can be configured to query, update and otherwise use one or more relational data stores. SQL processors can be configured to execute (and, in some instances, generate) code (e.g., SQL code) to query a relational data store.

SQL system 341 can include a database engine, that includes a relational engine, OLE database and storage engine. A relational engine can process, parse, compile, and/or optimize a query and/or make query-associated calls. The relational engine can identify an OLE DB row set that identifies the row with columns matching search criteria and/or a ranking value. A storage engine can manage data access and use the rowset (e.g., to access tables and indices) to retrieve query-responsive data from one or more relational databases.

SQL system 341 can include one or more distributed, non-distributed, virtual, non-virtual, local and/or remote relational data stores. The relational databases can include linked data structures identifying, for example, resource information, access-right identifications and characteristics, access-right statuses and/or assignments, and/or user and/or user account data. Thus, for example, use of the relational structures may facilitate identifying, for a particular user, a characteristic of an assigned access right and information about a resource associated with the access right.

One or more data structures in a relational data structure may reflect whether particular access rights have been assigned or remain available. This data may be based on data received from a catalog system 342 that monitors and tracks statuses of resource access rights. Catalog system 342 can include one or more catalog processors (e.g., included in one or more server farms, which may be geographically separated). Catalog processors can be configured to generate status-update request communications to be sent to one or more access assignment systems and/or intermediate systems and/or to receive status-update communications from one or more access assignment systems and/or intermediate systems. A status-update communication can, for example, identify an access right and/or resource and indicate an assignment of the access right. For example, a status-update communication can indicate that a particular access right has been assigned and is thus no longer available. In some instances, a status-update communication identifies assignment details, such as a user, account and/or user device associated with an access-right assignment; a time that the assignment was made; and/or a price associated with the assignment.

In some instances, a status update is less explicit. For example, a communication may identify an access right and/or resource and request a final authorization of an assignment of the access right. Catalog system 342 can then verify that the access right is available for assignment (e.g., and that a request-associated system or entity is authorized to coordinate the assignment) and can transmit an affirmative response. Such a communication exchange can indicate (in some instances) that the access right is assigned and unavailable for other assignment.

In some instances, catalog system 342 can also be integrated with a non-intermediate access assignment system, such that it can directly detect assignments. For example, an integrated access assignment system can coordinate a message exchange with a user device, can query a catalog data store to identify available access rights and can facilitate or trigger a status-change of an access right to reflect an assignment (e.g., upon having received all required information).

Whether a result of a direct assignment detection or a status update from an intermediate system, a database engine of catalog system 342 can manage one or more data stores so as to indicate a current status of each of a set of access rights for a resource. The one or more data stores may further identify any assignment constraints. For example, particular access rights may be earmarked so as to only allow one or more particular intermediate systems to trigger a change to the access rights' status and/or to assign the access rights.

The database engine can include a digital asset management (DAM) engine to receive, transform (e.g., annotate, reformat, introduce a schema, etc.) status-update communications, and identify other data (e.g., an identifier of an assigning system and/or a time at which a communication was received) to associate with a status update (e.g., an assignment). Therefore, the DAM engine can be configured to prepare storage-update tasks so as to cause a maintained data store to reflect a recent data change.

Further, the DAM engine can facilitate handling of data-store queries. For example, a status-request communication or authorization-request communication can be processed to identify variables and/or indices to use to query a data store. A query can then be generated and/or directed to a data store based on the processing. The DAM engine can relay (e.g., and, potentially, perform intermediate processing to) a query result to a request-associate system.

The database engine can also include a conflict engine, which can be configured to access and implement rules indicating how conflicts are to be handled. For example, catalog system 342 may receive multiple requests within a time period requesting an assignment authorization (or a hold) for a particular access right. A rule may indicate that a first request is to receive priority, that a request associated with a more highly prioritized requesting system (e.g., intermediate system) is to be prioritized, that a request associated with a relatively high (or low) quantity of access rights identified in the request for potential assignment are to be prioritized, etc.

The database engine can further include a storage engine configured to manage data access and/or data updates (e.g., modifying existing data or adding new data). The data managed by and/or accessible to the storage engine can be included in one or more data stores. The data stores can include, for example, distributed, non-distributed, virtual, non-virtual, local and/or remote data stores. The data stores can include, for example, a relational, non-relational, object, non-object, document and/or non-document data store. Part or all of a data store can include a shadow data store, that shadows data from another data store. Part or all of a data store can include an authoritative data store that is (e.g., directly and/or immediately) updated with access-right assignment changes (e.g., such that a primary or secondary access assignment system updates the data store as part of an access-right assignment process, rather than sending a post-hoc status-update communication reflecting the assignment). In some instances, a data store an authoritative data store identifies a status for each of a set (e.g., or all) of access rights for a given resource. Should there be any inconsistency between an authoritative data store and another data store (e.g., at an intermediate system), system 300 can be configured such that the authoritative data store is controlling.

System 300 can further include a replication system 343. Replication system 343 can include one or more replication processors configured to identify new or modified data, to identify one or more data stores and/or location at which to store the new or modified data and/or to coordinate replication of the data. In some instances, one or more of these identifications and/or coordination can be performed using a replication rule. For example, a replication rule may indicate that replication is to be performed in a manner biased towards storing replicated data at a data store geographically separated from another data store storing the data.

A data duplicator can be configured to read stored data and generate one or more write commands so as to store the data at a different data store. A controller can manage transmitting write commands appropriately so as to facilitate storing replicated data at identified data stores. Further, a controller can manage data stores, such as a distributed memory or distributed shared memory, to ensure that a currently active set of data stores includes a target number of replications of data.

Accordingly, web-server system 318 can interact with user device 310 to identify available access rights and to collect information needed to assign an access right. Web-server system 318 can interact with SQL system 341 so as to retrieve data about particular resources and/or access rights so as to configure web data (e.g., via dynamic web-pages or scripts) to reflect accurate or semi-accurate information and/or statuses. SQL system 341 can use relational data stores to quickly provide such data. Meanwhile, catalog system 342 may manage one or more non-relational and/or more comprehensive data stores may be tasked with more reliably and quickly tracking access-right statuses and assignments. The tracking may include receiving status updates (e.g., via a push or pull protocol) from one or more intermediate systems and/or by detecting assignment updates from non-intermediate systems, such as an integrated access assignment system and/or SQL system 341. Catalog system 342 may provide condensed status updates (e.g., reflecting a binary indication as to whether an access right is available) to SQL system 341 periodically, at triggered times and/or in response to a request from the SQL system. A replication system 343 can further ensure that data is replicated at multiple data stores, so as to improve a reliability and speed of system 300.

It will be appreciated that various parts of system 300 can be geographically separated. For example, each of user device 310, intermediate system 330, web-server system 318, SQL system 341, catalog system 342 and replication 343 may be located in different geographic locations (e.g., different cities, states or countries).

Figure 4:
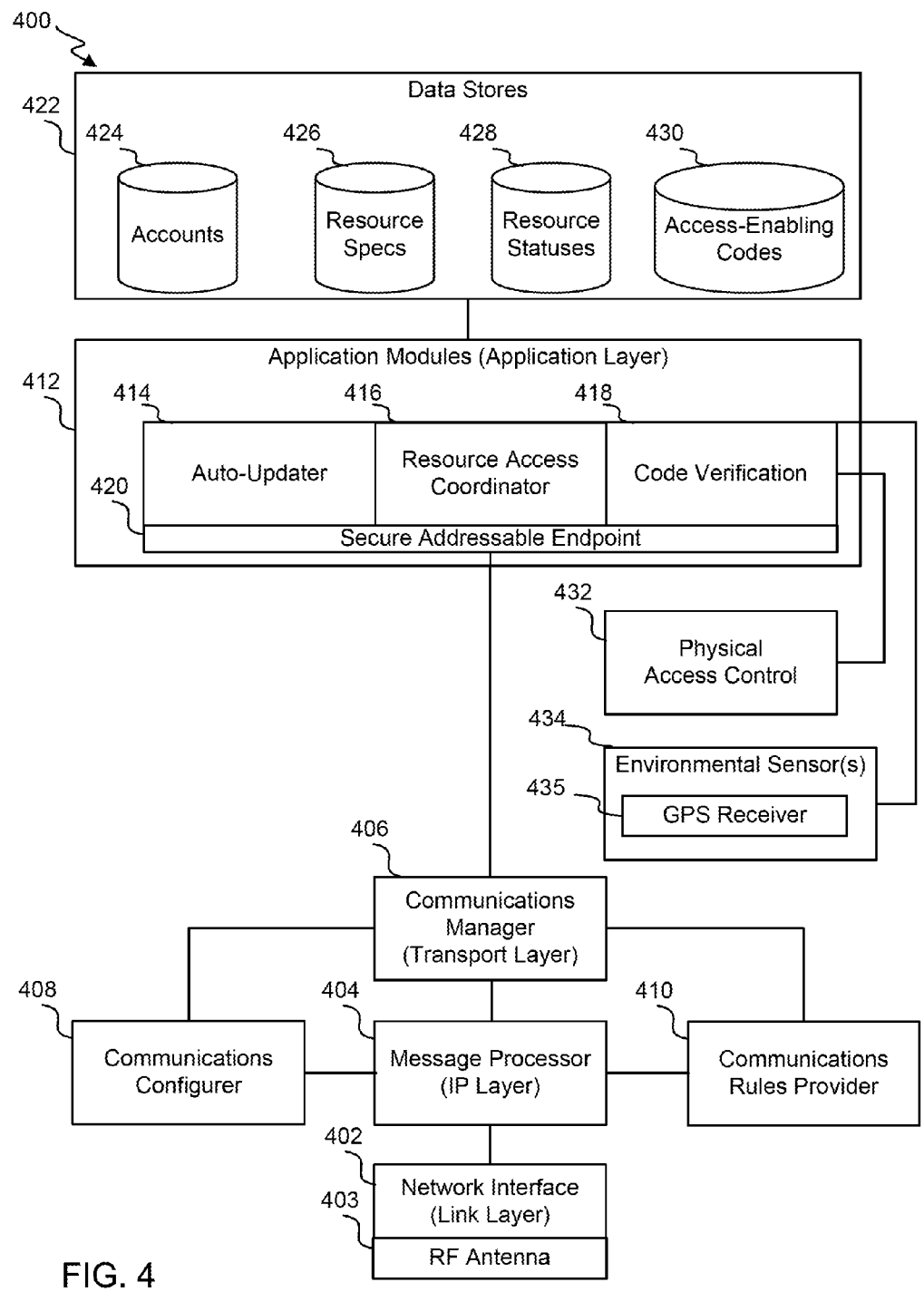
FIG. 4 illustrates example components of a device.

FIG. 4 illustrates example components of a device 400, such as a client device (e.g., client agent device 140, client register 150 and/or client point device 160), an intermediate system (e.g., intermediate system 130) and/or an access management system (e.g., access management system 120) according to an embodiment of the invention.

The components can include one or more modules that can be installed on device 400. Modules can include some or all of the following: a network interface module 402 (which can operate in a link layer of a protocol stack), a message processor module 404 (which can operate in an IP layer of a protocol stack), a communications manager module 406 (which can operate in a transport layer of a protocol stack), a communications configure module 408 (which can operate in a transport and/or IP layer in a protocol stack), a communications rules provider module 410 (which can operate in a transport and/or IP layer in a protocol stack), application modules 412 (which can operate in an application layer of a protocol stack), a physical access control module 432 and one or more environmental sensors 434.

Network interface module 402 receives and transmits messages via one or more hardware components that provide a link-layer interconnect. The hardware component(s) can include, for example, RF antenna 403 or a port (e.g., Ethernet port) and supporting circuitry. In some embodiments, network interface module 402 can be configured to support wireless communication, e.g., using Wi Fi (IEEE 802.11 family standards), Bluetooth® (a family of standards promulgated by Bluetooth SIG, Inc.), BLE, or near-field communication (implementing the ISO/IEC 18092 standards or the like).

RF antenna 403 can be configured to convert electric signals into radio and/or magnetic signals (e.g., to radio waves) to transmit to another device and/or to receive radio and/or magnetic signals and convert them to electric signals. RF antenna 403 can be tuned to operate within a particular frequency band. In some instances, a device includes multiple antennas, and the antennas can be, for example, physically separated. In some instances, antennas differ with respect to radiation patterns, polarizations, take-off angle gain and/or tuning bands. RF interface module 402 can include one or more phase shifters, filters, attenuators, amplifiers, switches and/or other components to demodulate received signals, coordinate signal transmission and/or facilitate high-quality signal transmission and receipt.

In some instances, network interface module 402 includes a virtual network interface, so as to enable the device to utilize an intermediate device for signal transmission or reception. For example, network interface module 402 can include VPN software.

Network interface module 402 and one or more antennas 403 can be configured to transmit and receive signals over one or more connection types. For example, network interface module 402 and one or more antennas 403 can be configured to transmit and receive WiFi signals, cellular signals, Bluetooth signals, Bluetooth Low Energy (BLE) signals, Zigbee signals, or Near-Field Communication (NFC) signals.

Message processor module 404 can coordinate communication with other electronic devices or systems, such as one or more servers or a user device. In one instance, message processor module 404 is able to communicate using a plurality of protocols (e.g., any known, future and/or convenient protocol such as, but not limited to, XML, SMS, MMS, and/or email, etc.). Message processor module 404 may further optionally serialize incoming and/or outgoing messages and facilitate queuing of incoming and outgoing message traffic.

Message processor module 404 can perform functions of an IP layer in a network protocol stack. For example, in some instances, message processor module 404 can format data packets or segments, combine data packet fragments, fragment data packets and/or identify destination applications and/or device addresses. For example, message processor module 404 can defragment and analyze an incoming message to determine whether it is to be forwarded to another device and, if so, can address and fragment the message before sending it to the network interface module 402 to be transmitted. As another example, message processor module 404 can defragment and analyze an incoming message to identify a destination application that is to receive the message and can then direct the message (e.g., via a transport layer) to the application.

Communications manager module 406 can implement transport-layer functions. For example, communications manager module 406 can identify a transport protocol for an outgoing message (e.g., transmission control protocol (TCP)

or user diagram protocol (UDP)) and appropriately encapsulate the message into transport protocol data units. Message processor module 404 can initiate establishment of connections between devices, monitor transmissions failures, control data transmission rates and monitoring transmission quality. As another example, communications manager module 406 can read a header of an incoming message to identify an application layer protocol to receive the message's data. The data can be separated from the header and sent to the appropriate application. Message processor module 404 can also monitor the quality of incoming messages and/or detect out of order incoming packets.

In some instances, characteristics of message-receipt or message-transmission quality can be used to identify a health status of an established communications link. In some instances, communications manager module 406 can be configured to detect signals indicating the health status of an established communications link (e.g., a periodic signal from the other device system, which if received without dropouts, indicates a healthy link).

In some instances, a communication configurer module 408 is provided to track attributes of another system so as to facilitate establishment of a communication session. In one embodiment, communication configurer module 408 further ensures that inter-device communications are conducted in accordance with the identified communication attributes and/or rules. Communication configurer module 408 can maintain an updated record of the communication attributes of one or more devices or systems. In one embodiment, communications configurer module 408 ensures that communications manager module 406 can deliver the payload provided by message processor module 404 to the destination (e.g., by ensuring that the correct protocol corresponding to the client system is used).

A communications rules provider module 410 can implement one or more communication rules that relate to details of signal transmissions or receipt. For example, a rule may specify or constrain a protocol to be used, a transmission time, a type of link or connection to be used, a destination device, and/or a number of destination devices. A rule may be generally applicable or conditionally applicable (e.g., only applying for messages corresponding to a particular app, during a particular time of day, while a device is in a particular geographical region, when a usage of a local device resource exceeds a threshold, etc.). For example, a rule can identify a technique for selecting between a set of potential destination devices based on attributes of the set of potential destination devices as tracked by communication configure module 408. To illustrate, a device having a short response latency may be selected as a destination device. As another example, communications rules provider 410 can maintain associations between various devices or systems and resources. Thus, messages corresponding to particular resources can be selectively transmitted to destinations having access to such resources.

A variety of application modules 412 can be configured to initiate message transmission, process incoming transmissions, facilitate selective granting of resource access, facilitate processing of requests for resource access, and/or performing other functions. In the instance depicted in FIG. 4, application modules 412 include an auto-updater module 414, a resource access coordinator module 416, and/or a code verification module 418.

Auto-updater module 414 automatically updates stored data and/or agent software based on recent changes to resource utilization, availability or schedules and/or updates to software or protocols. Such updates can be pushed from another device (e.g., upon detecting a change in a resource availability or access permit) or can be received in response to a request sent by device 400. For example, device 400 can transmit a signal to another device that identifies a particular resource, and a responsive signal can identify availabilities of access to the resource (e.g., available seat reservations for a sporting event or concert). As another example, device 400 can transmit a signal that includes an access access-enabling code, and a responsive signal can indicate whether the code is applicable for access of a particular resource and/or is valid.

In some instances, auto-updater module 414 is configured to enable the agent software to understand new, messages, commands, and/or protocols, based on a system configuration/change initiated on another device. Auto-updater module 414 may also install new or updated software to provide support and/or enhancements, based on a system configuration change detected on device 400. System configuration changes that would necessitate changes to the agent software can include, but are not limited to, a software/hardware upgrade, a security upgrade, a router configuration change, a change in security settings, etc. For example, if auto-updater module 414 determines that a communication link with another device has been lost for a pre-determined amount of time, auto-updater module 414 can obtain system configuration information to help re-establish the communication link. Such information may include new settings/configurations on one or more hardware devices or new or upgraded software on or connected to device 400. Thus, auto-updater module 414 can detect or be informed by other software when there is a new version of agent software with additional functionality and/or deficiency/bug corrections or when there is a change with respect to the software, hardware, communications channel, etc.), and perform updates accordingly.

Based on the newly obtained system configuration for device 400, auto-updater module 414 can cause a new communication link to be re-established with another device. In one embodiment, upon establishment of the communication link, system configuration information about device 400 can also be provided to another device to facilitate the connection to or downloading of software to device 400.

In one embodiment, when a poor health signal is detected by another device (e.g., when the health signal is only sporadically received but the communication link is not necessarily lost), the other device can send a command to auto-updater module 414 to instruct auto-updater module 414 to obtain system configuration information about device 400. The updated system configuration information may be used in an attempt to revive the unhealthy communications link (e.g., by resending a resource request). For example, code can utilize appropriate system calls for the operating system to fix or reestablish communications. By way of example and not limitation, model and driver information is optionally obtained for routers in the system in order querying them. By way of further example, if the code determines that a new brand of router has been installed, it can adapt to that change, or to the change in network configuration, or other changes.

Instead or in addition, the host server (e.g., via communications manager 406) can send specific instructions to auto-updater module 414 to specify tests or checks to be performed on device 400 to determine the changes to the system configurations (e.g., by automatically performing or requesting an inventory check of system hardware and/or software). For example, the components involved in the chain of hops through a network can be queried and analyzed. Thus, for example, if a new ISP (Internet service provider) is being used and the management system traffic is being filtered, or a new router was installed and the software needs to change its configuration, or if someone made a change to the operating system that affects port the management system is using to communicate, the management system (or operator) can communicate with the ISP, change it back, or choose from a new available port, respectively.

The specific tests may be necessary to help establish the communication link, if, for example, the automatic tests fail to provide sufficient information for the communication link to be re-established, if additional information is needed about a particular configuration change, and/or if the client system is not initially supported by the auto-updater module 414, etc.

Auto-updater module 414 can also receive signals identifying updates pertaining to current or future availability of resources and/or access permits. Based on the signals, auto-updater module 414 can modify, add to or delete stored data pertaining to resource availabilities, resource schedules and/or valid access permits. For example, upon receiving an update signal, auto-updater 414 can modify data stored in one or more data stores 422, such as an account data store 424, resource specification data store 426, resource status data store 428 and/or access-enabling code data store 430.

Account data store 424 can store data for entities, such as administrators, intermediate-system agents and/or users. The account data can include login information (e.g., username and password), identifying information (e.g., name, residential address, phone number, email address, age and/or gender), professional information (e.g., occupation, affiliation and/or professional position), preferences (e.g., regarding event types, performers, seating areas, and/or resource types), purchase data (e.g., reflecting dates, prices and/or items of past purchases) and/or payment data (e.g., credit card number and expiration date or payment account information). The account data can also or alternatively include technical data, such a particular entity can be associated with one or more device types, IP addresses, browser identifier and/or operating system identifier).

Resource specification data store 426 can store specification data characterizing each of one or more resources. For example, specification data for a resource can include a processing power, available memory, operating system, compatibility, device type, processor usage, power status, device model, number of processor cores, types of memories, date and time of availability, a performing entity, a venue of the event and/or a set of seats (e.g., a chart or list). Specification data can further identify, for example, a cost for each of one or more access rights.

Resource status data store 428 can store status data reflecting which resources are available (or unavailable), thereby indicating which resources have one or more open assignments. In some instances, the status data can include schedule information about when a resource is available. Status data can include information identifying an entity who requested, reserved or was assigned a resource. In some instances, status information can indicate that a resource is being held or reserved and may identify an entity associated with the hold or reserve and/or a time at which the hold or reservation will be released.

Access-enabling code data store 430 can store access-enabling code data that includes one or more codes and/or other information that can be used to indicate that an entity is authorized to use, have or receive a resource. An access-enabling code can include, for example, a numeric string, an alphanumeric string, a text string, a 1-dimensional code, a 2-dimensional code, a barcode, a quick response (QR) code, an image, a static code and/or a temporally dynamic code. An access-enabling code can be, for example, unique across all instances, resource types and/or entities. For example, access-enabling codes provided in association for tickets to a particular event can be unique relative to each other. In some instances, at least part of a code identifies a resource or specification of a resource. For example, for a ticket to a concert, various portions of a code may reflect: a performing entity, resource location, date, section and access-permitted location identifier.

One or more of data stores 424, 426, 428, and 430 can be a relational data store, such that elements in one data store can be referenced within another data store. For example, resource status data store 428 can associate an identifier of a particular ticket with an identifier of a particular entity. Additional information about the entity can then be retrieved by looking up the entity identifier in account data store 424.

Updates to data stores 424, 426, 428, and 430 facilitated and/or initiated by auto-updater module 414 can improve cross-device data consistency. Resource access coordinator module 416 can coordinate resource access by, for example, generating and distributing identifications of resource availabilities; processing requests for resource access; handling competing requests for resource access; and/or receiving and responding to resource-offering objectives.

Figure 5:
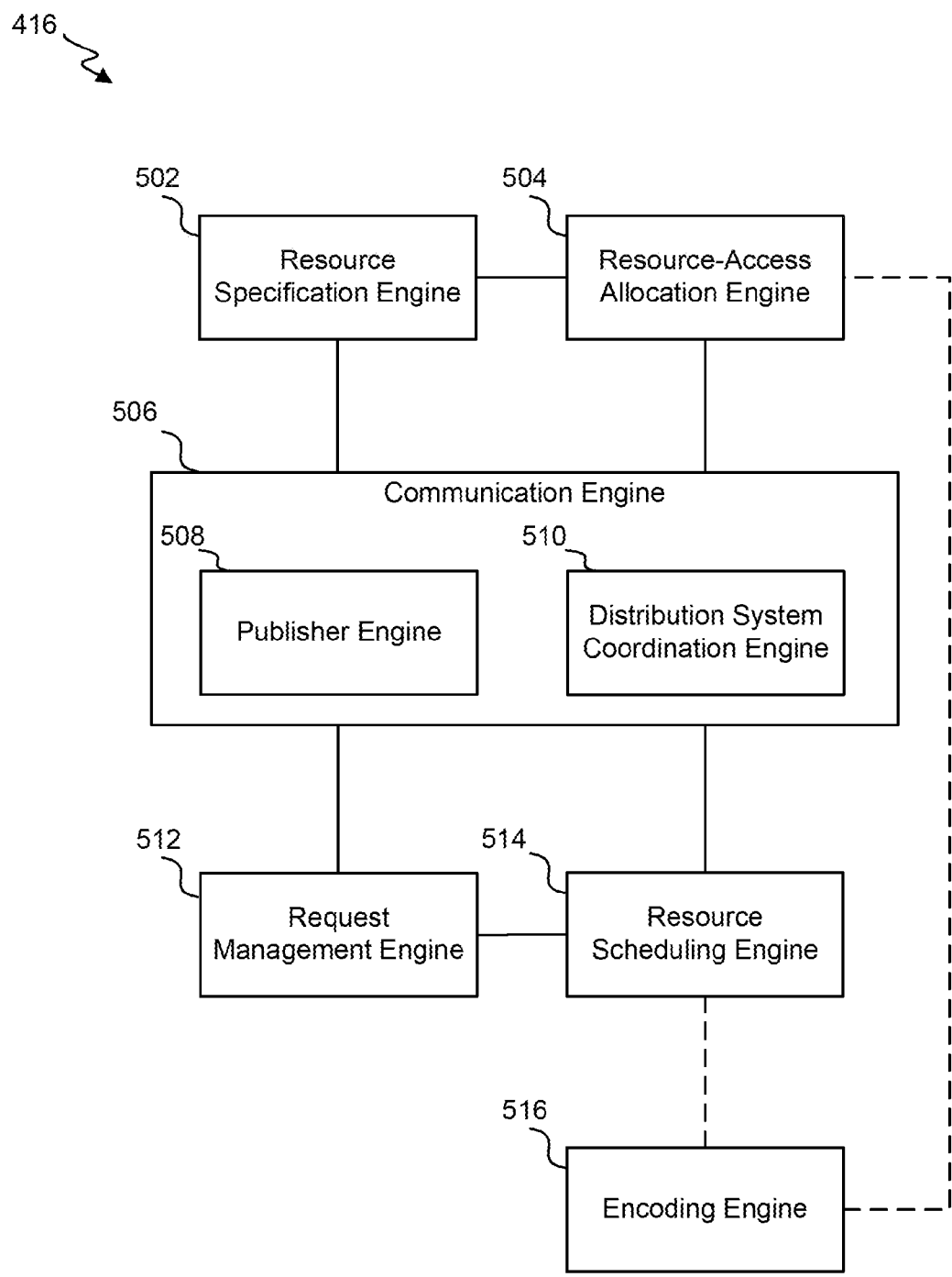
FIG. 5 illustrates example components of resource access coordinator module.

FIG. 5 illustrates example components of resource access coordinator module 416 that may operate, at least in part, at an access management system (e.g., access management system) according to an embodiment of the invention. A resource specification engine 502 can identify one or more available resources. For example, resource specification engine 502 can detect input that identifies a current or future availability of a new resource.

Resource specification engine 502 can identify one or more specifications of each of one or more resources. A specification can include an availability time period. For example, resource specification engine 502 can determine that a resource is available, for example, at a particular date and time (e.g., as identified based on input), for a time period (e.g., a start to end time), as identified in the input, and/or from a time of initial identification until another input indicating that the resource is unavailable is detected. A specification can also or alternatively include a location (e.g., a geographic location and/or venue) of the resource. A specification can also or alternatively include one or more parties associated with the resource (e.g., performing acts or teams). Resource specification engine 502 can store the specifications in association with an identifier of the resource in resource specifications data store 426.

A resource-access allocation engine 504 can allocate access rights for individual resources. An access right can serve to provide an associated entity with the right or a priority to access a resource. Because (for example) association of an access right with an entity can, in some instances, be conditioned on fee payment or authorization thereof, an allocated access right can be initially unassociated with particular entities (e.g., users). For example, an allocated right can correspond to one or more access characteristics, such as an processor identifier, a usage time, a memory allocation, a geographic location (e.g., section or seat identifier), and/or a fee. For an allocated access right, resource-access allocation engine 504 can store an identifier of the right in resource statuses data store 428 in association with an identifier for the resource and an indication that it has not yet been assigned to a particular entity.

A communication engine 506 can facilitate communicating the availability of the resource access rights to users. In some instances, a publisher engine 508 generates a presentation that identifies a resource and indicates that access rights are available. Initially or in response to user interaction with the presentation, the presentation can identify access characteristics about available access rights. The presentation can include, for example, a chart that identifies available access rights for an event and corresponding fees. Publisher engine 508 can distribute the presentation via, for example, a website, app page, email and/or message. The presentation can be further configured to enable a user to request assignments of one or more access rights.

In some instances, an intermediate system coordination engine 510 can facilitate transmission of information about resource availability (e.g., resource specifications and characteristics of resource-access rights) to one or more intermediate systems (e.g., by generating one or more messages that include such information and/or facilitating publishing such information via a website or app page). Each of the one or more intermediate systems can publish information about the resource and accept requests for resource access. In some instances, intermediate system coordination engine 510 identifies different access rights as being available to individual intermediate systems to coordinate assignment. For example, access rights for seats in Section 1 may be provided for a first intermediate system to assign, and access rights for seats in Section 2 may be provided to a second intermediate system to assign.

In some instances, overlapping access rights are made available to multiple intermediate systems to coordinate assignments. For example, some or all of a first set of resource rights (e.g., corresponding to a section) may be provided to first and second intermediate systems. In such instances, intermediate system coordination engine 510 can respond to a communication from a first intermediate system indicating that a request has been received (e.g., and processed) for an access right in the set) by sending a notification to one or more other intermediate systems that indicates that the access right is to be at least temporarily (or entirely) made unavailable.

Intermediate system coordination engine 510 can monitor communication channels with intermediate systems to track the health and security of the channel. For example, a healthy connection can be inferred when scheduled signals are consistently received. Further, intermediate system coordination engine 510 can track configurations of intermediate systems (e.g., via communications generated at the intermediate systems via a software agent that identifies such configurations) so as to influence code generation, communication format, and/or provisions or access rights.

Thus, either via a presentation facilitated by publisher engine 508 (e.g., via a web site or app page) or via communication with an intermediate system, a request for assignment of an access right can be received. A request management engine 512 can process the request. Processing the request can include determining whether all other required information has been received, such as user-identifying information (e.g., name), access-right identifying information (e.g., identifying a resource and/or access-right characteristic) user contact information (e.g., address, phone number, and/or email address), and/or user device information (e.g., type of device, device identifier, and/or IP address).

When all required information has not been received, request management engine 512 can facilitate collection of the information (e.g., via a webpage, app page or communication to an intermediate system). Request management engine 512 can also or alternatively collect payment information, determine that payment information has been received, obtain authorization of payment, determine that payment has been authorized (e.g., via an intermediate system), collect payment, and/or determine that payment has been collected. For example, publisher engine 508 may receive a credit card number and expiration date via a webpage, and request management engine 512 can request authorization for an amount of the requested access rights. In some instances, payment assessments are performed subsequent to at least temporary assignments of access rights. In some instances, request management engine 512 retrieves data from a user account. For example, publisher engine 508 may indicate that a request for an access right has been received while a user was logged into a particular account. Request management engine 512 may then retrieve, for example, contact information, device information, and/or preferences and/or payment information associated with the account from account data store 424.

In some instances, request management engine 512 prioritizes requests, such as requests for overlapping, similar or same access rights (e.g., requests for access rights associated with a same section) received within a defined time period. The prioritization can be based on, for example, times at which requests were received (e.g., prioritizing earlier requests), a request parameter (e.g., prioritizing requests for a higher or lower number of access rights above others), whether requests were received via an intermediate system (e.g., prioritizing such requests lower than others), intermediate systems associated with requests (e.g., based on rankings of the systems), whether requests were associated with users having established accounts, and/or whether requests were associated with inputs indicative of a bot initiating the request (e.g., shorter inter-click intervals, failed CAPTCHA tests, purchase history departing from a human profile).

Upon determining that required information has been received and request-processing conditions have been met, request management engine 512 can forward appropriate request information to a resource scheduling engine 514. For a request, resource scheduling engine 514 can query resource status data store 428 to identify access rights matching parameters of the request.

In some instances, the request has an access-right specificity matching a specificity at which access rights are assigned. In some instances, the request is less specific, and resource scheduling engine 514 can then facilitate an identification of particular rights to assign. For example, request management engine 512 can facilitate a communication exchange by which access right characteristics matching the request are identified, and a user is allowed to select particular rights. As another example, request management engine 512 can itself select from amongst matching access rights based on a defined criterion (e.g., best summed or averaged access-right ranking, pseudo-random selection, or a selection technique identified based on user input).

Upon identifying appropriately specific access rights, resource scheduling engine 514 can update resource status data store 428 so as to place the access right(s) on hold (e.g., while obtaining payment authorization and/or user confirmation) and/or to change a status of the access right(s) to indicate that they have been assigned (e.g., immediately, upon receiving payment authorization or upon receiving user confirmation). Such assignment indication may associate information about the user (e.g., user name, device information, phone number and/or email address) and/or assignment process (e.g., identifier of any intermediate system and/or assignment date and time) with an identifier of the access right(s).

For individual assigned access rights, an encoding engine 516 can generate an access-enabling code. The access-enabling code can include, for example, an alphanumeric string, a text string, a number, a graphic, a barcode (e.g., a 1-dimensional or 2-dimensional barcode), a static code, a dynamic code (e.g., with a feature depending on a current time, current location or communication) and/or a technique for generating the code (e.g., whereby part of the code may be static and part of the code may be determined using the technique). The code may be unique across all access rights, all access rights for a given resource, all access rights associated with a given location, all access rights associated with a given time period, all resources and/or all users. In some instances, at least part of the code is determined based on or is thereafter associated with an identifier of a user, user device information, a resource specification and/or an access right characteristic.

In various embodiments, the code may be generated prior to allocating access rights (e.g., such that each of some or all allocated access rights are associated with an access-enabling code), prior to or while assigning one or more access right(s) responsive to a request (e.g., such that each of some or all assigned access rights are associated with an access-enabling code), at a prescribed time, and/or when the device is at a defined location and/or in response to user input. The code may be stored at or availed to a user device. In various instances, at the user device, an access-enabling code may be provided in a manner such that it is visibly available for user inspection or concealed from a user. For example, a ticket document with a barcode may be transmitted to a user device, or an app on the user device can transmit a request with a device identifier for a dynamic code.

Encoding engine 516 can store the access-enabling codes in access-enabling code data store 430. Encoding engine 516 can also or alternatively store an indication in account data store 424 that the access right(s) have been assigned to the user. It will again be appreciated that data stores 424, 426, 428, and 430 can be relational and/or linked, such that, for example, an identification of an assignment can be used to identify one or more access rights, associated access-enabling code(s) and/or resource specifications.

Resource scheduling engine 514 can facilitate one or more transmissions of data pertaining to one or more assigned access rights to a device of a user associated with the assignment. The data can include an indication that access rights have been assigned and/or details as to which rights have been assigned. The data can also or alternatively include access-enabling codes associated with assigned access rights.

While FIG. 5 depicts components of resource access coordinator module 516 that may be present on an access management system 120, it will be appreciated that similar or complementary engines may be present on other systems. For example, a communication engine on a user device can be configured to display presentations identifying access right availability, and a request management engine on a user device can be configured to translate inputs into access-right requests to send to an intermediate system or access management system.

Returning to FIG. 4, code verification module 418 (e.g., at a user device or client device) can analyze data to determine whether an access-enabling code is generally valid and/or valid for a particular circumstance. The access-enabling code can include one that is received at or detected by device 400. The analysis can include, for example, determining whether all or part of the access-enabling code matches one stored in access-enabling code data store 430 or part thereof, whether the access-enabling code has previously been applied, whether all or part of the access-enabling code is consistent with itself or other information (e.g., one or more particular resource specifications, a current time and/or a detected location) as determined based on a consistency analysis and/or whether all or part of the access-enabling code has an acceptable format.

For example, access-enabling code data store 430 can be organized in a manner such that access-enabling codes for a particular resource, date, resource group, client, etc. can be queried to determine whether any such access-enabling codes correspond to (e.g. match) one being evaluated, which may indicate that the code is verified. Additional information associated with the code may also or alternatively be evaluated. For example, the additional information can indicate whether the code is currently valid or expired (e.g., due to a previous use of the code).

As another example, a portion of an access-enabling code can include an identifier of a user device or user account, and code verification module 418 can determine whether the code-identified device or account matches that detected as part of the evaluation. To illustrate, device 400 can be a client device that electronically receives a communication with an access-enabling code from a user device. The communication can further include a device identifier that identifies, for example, that the user device is a particular type of smartphone. Code verification module 418 can then determine whether device-identifying information in the code is consistent with the identified type of smartphone.

As yet another example, code verification module 418 can identify a code format rule that specifies a format that valid codes are to have. To illustrate, the code format rule may identify a number of elements that are to be included in the code or a pattern that is to be present in the code. Code verification module 418 can then determine that a code is not valid if it does not conform to the format.

Verification of an access-enabling code can indicate that access to a resource is to be granted. Conversely, determining that a code is not verified can indicate that access to a resource is to be limited or prevented. In some instances, a presentation is generated (e.g., and presented) that indicates whether access is to be granted and/or a result of a verification analysis. In some instances, access granting and/or limiting is automatically affected. For example, upon a code verification, a user device and/or user may be automatically permitted to access a particular resource. Accessing a resource may include, for example, using a computational resource, possessing an item, receiving a service, entering a geographical area, and/or attending an event (e.g., generally or at a particular location).

Verification of an access-enabling code can further trigger a modification to access-enabling code data store 430. For example, a code that has been verified can be removed from the data store or associated with a new status. This modification may limit attempts to use a same code multiple times for resource access.

A combination of modules 414, 416, 418 comprise a secure addressable endpoint agent 420 that acts as an adapter and enables cross-device interfacing in a secure and reliable fashion so as to facilitate allocation of access-enabling codes and coordinate resource access. Secure addressable endpoint agent 420 can further generate a health signal that is transmitted to another device for monitoring of a status of a communication channel. The health signal is optionally a short message of a few bytes or many bytes in length that may be transmitted on a frequent basis (e.g., every few milliseconds or seconds). A communications manager 406 on the receiving device can then monitors the health signal provided by the agent to ensure that the communication link between the host server and device 400 is still operational.

In some instances, device 400 can include (or can be in communication with) a physical access control 432. Physical access control 432 can include a gating component that can be configured to provide a physical barrier towards accessing a resource. For example, physical access control 432 can include a turnstile or a packaging lock.

Physical access control 432 can be configured such that it can switch between two modes, which differ in terms of a degree to which user access to a resource is permitted. For example, a turnstile may have a locked mode that prevents movement of an arm of the turnstile and an unlocked mode that allows the arm to be rotated. In some instances, a default mode is the mode that is more limiting in terms of access.

Physical access control 432 can switch its mode in response to receiving particular results from code verification module 418. For example, upon receiving an indication that a code has been verified, physical access control 432 can switch from a locked mode to an unlocked mode. It may remain in the changed state for a defined period of time or until an action or event is detected (e.g., rotation of an arm).

Device 400 can also include one or more environmental sensors 434. Measurements from the sensor can processed by one or more application modules. Environmental sensor(s) 434 can include a global positioning system (GPS) receiver 435 that can receive signals from one or more GPS satellites. A GPS chipset can use the signals to estimate a location of device 400 (e.g., a longitude and latitude of device 400). The estimated location can be used to identify a particular resource (e.g., one being offered at or near the location at a current or near-term time). The identification of the particular resource can be used, for example, to identify a corresponding (e.g., user-associated) access-enabling code or to evaluate an access-enabling code (e.g., to determine whether it corresponds to a resource associated with the location).

The estimated location can further or alternatively be used to determine when to perform a particular function. For example, at a user device, detecting that the device is in or has entered a particular geographical region (e.g., is within a threshold distance from a geofence perimeter or entrance gate) can cause the device to retrieve or request an access-enabling code, conduct a verification analysis of the code and/or transmit the code to a client device.

It will be appreciated that environmental sensor(s) 434 can include one or more additional or alternative sensors aside from GPS receiver 435. For example, a location of device 400 can be estimated based on signals received by another receive from different sources (e.g., base stations, client point devices or Wi Fi access points). As another example, an accelerometer and/or gyroscope can be provided. Data from these sensors can be used to infer when a user is attempting to present an access-enabling code for evaluation.

It will also be appreciated that the components and/or engines depicted in figures herein are illustrative, and a device need not include each depicted component and/or engine and/or can include one or more additional components and/or engines. For example, a device can also include a user interface, which may include a touch sensor, keyboard, display, camera and/or speakers. As another example, a device can include a power component, which can distribute power to components of the device. The power component can include a battery and/or a connection component for connecting to a power source. As yet another example, a module in the application layer can include an operating system. As still another example, an application-layer control processor module can provide message processing for messages received from another device. The message processing can include classifying the message and routing it to the appropriate module. To illustrate, the message can be classified as a request for resource access or for an access-enabling code, an update message or an indication that a code has been redeemed or verified. The message processing module can further convert a message or command into a format that can interoperate with a target module.

It will further be appreciated that the components, modules and/or agents could be implemented in one or more instances of software. The functionalities described herein need not be implemented in separate modules, for example, one or more functions can be implemented in one software instance and/or one software/hardware combination. Other combinations are similarly be contemplated.

Further yet, it will be appreciated that a storage medium (e.g., using magnetic storage media, flash memory, other semiconductor memory (e.g., DRAM, SRAM), or any other non-transitory storage medium, or a combination of media, and can include volatile and/or non-volatile media) can be used to store program code for each of one or more of the components, modules and/or engines depicted in FIGS. 4 and 5 and/or to store any or all data stores depicted in FIG. 4 or described with reference to FIGS. 4 and/or 5. Any device or system disclosed herein can include a processing subsystem for executing the code. The processing system can be implemented as one or more integrated circuits, e.g., one or more single-core or multi-core microprocessors or microcontrollers, examples of which are known in the art.

Figure 6:
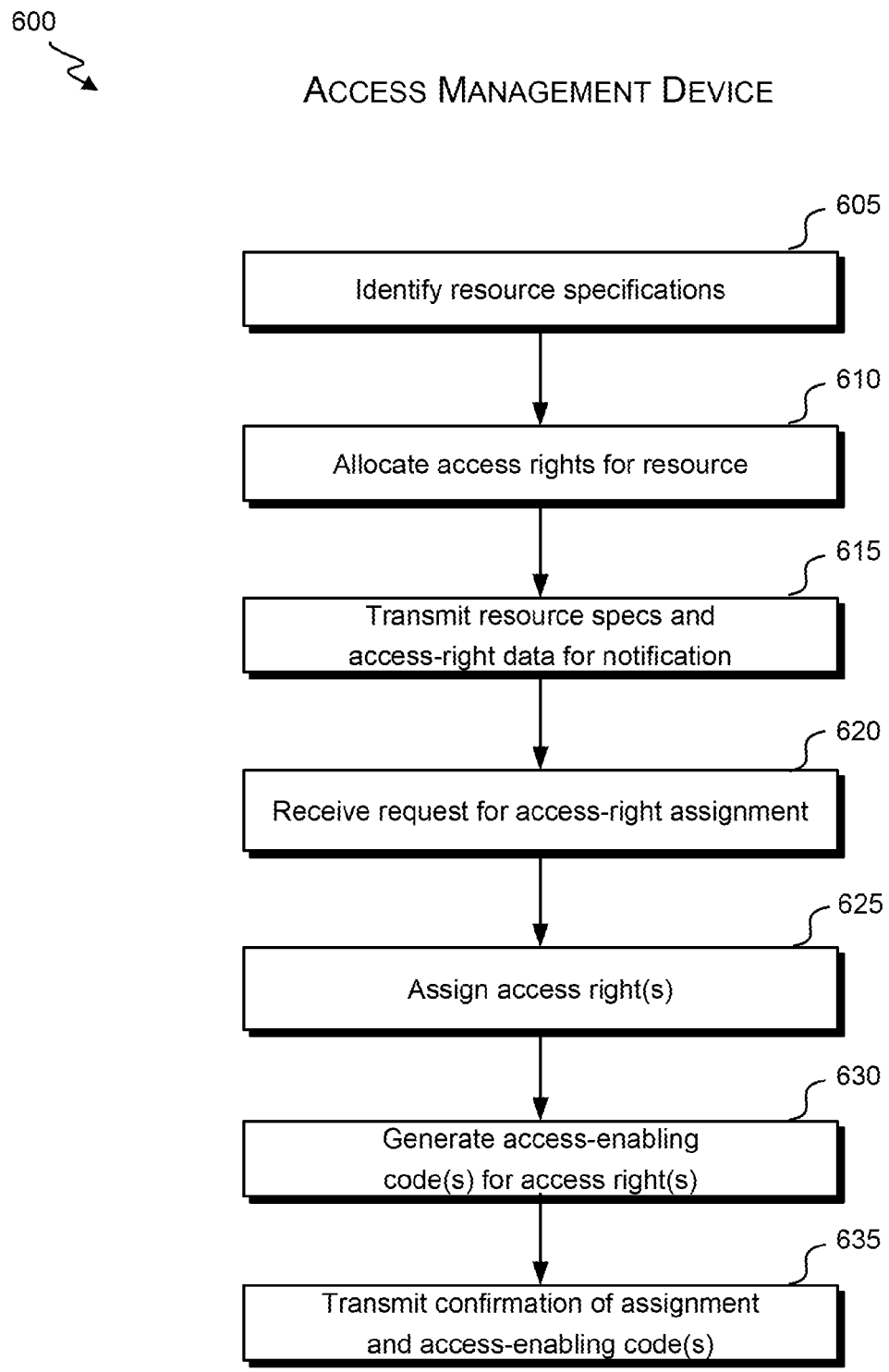
FIG. 6 illustrates a flowchart of an embodiment of a process for assigning access rights for resources.

FIG. 6 illustrates a flowchart of an embodiment of a process 600 for assigning access rights for resources. Process 600 can be performed by an access management system, such as access management system 120. Process 600 begins at block 605 where resource specification engine 502 identifies one or more specifications for a resource. The specifications can include, for example, a time at which the resource is to be available, a location of the resource, a capacity of the resources and/or one or more entities (e.g., performing entities) associated with the resource.

At block 610, resource-access allocation engine 504 allocates a set of access rights for the resource. In some instances, each of at least some of the access rights corresponds to a different access parameter, such as a different location (e.g., seat) assignment. Upon allocation, each of some or all of the access rights may have a status as available. A subset of the set of access rights can be immediately (or at a defined time) assigned or reserved according to a base assignment or reservation rule (e.g., assigning particular access rights to particular entities, who may be involved in or related to provision of the resource and/or who have requested or been assigned a set of related access rights.

At block 615, communication engine 506 transmits the resource specifications and data about the access rights. The transmission can occur in one or more transmissions. The transmission can be to, for example, one or more user devices and/or intermediate systems. In some instances, a notification including the specifications and access-right data is transmitted, and in some instances, a notification can be generated at a receiving device based on the specifications and access-right data. The notification can include, for example, a website that identifies a resource (via, at least in part, its specifications) and indicates that access rights for the resource are available for assignment. The notification can include an option to request assignment of one or more access rights.

At block 620, request management engine 512 receives a request for one or more access rights to be assigned to a user. The request can, for example, identify particular access rights and/or access parameters. The request can include or be accompanied by other information, such as identifying information. In some instances, the access management system can use at least some of such information to determine whether a fee for the access rights has been authorized. In some instances, the request is received via an intermediate system that has already handled such authorization.

At block 625, resource scheduling engine 514 assigns the requested one or more access rights to the user. The assignment can be conditioned on receipt of all required information, confirmation that the access right(s) have remained available for assignment, determining using data corresponding to the request that a bot-detection condition is not satisfied, fee provision and/or other defined conditions. Assignment of the access right(s) can include associating an identifier of each of the one or more rights with an identifier of a user and/or assignment and/or changing a status of the access right(s) to assigned. Assignment of the access right(s) can result in impeding or preventing other users from requesting the access right(s), being assigned the access right(s) and/or being notified that the access right(s) are available for assignment. Assignment of the access right(s) can, in some instances, trigger transmission of one or more communications to, for example, one or more intermediate systems identifying the access right(s) and indicating that they have been assigned and/or with an instruction to cease offering the access rights.

At block 630, encoding engine 516 generates an access-enabling code for each of the one or more access rights. The code can be generated, for example, as part of the assignment, as part of the allocation or subsequent to the assignment (e.g., upon detecting that a user is requesting access to the resource). Generating an access-enabling code can include applying a code-generation technique, such on one that generates a code based on a characteristic of a user, user device, current time, access right, resource, intermediate system or other variable. The access-enabling code can include a static code that will not change after it has been initially generated or a dynamic code that changes in time (e.g., such that block 630 can be repeated at various time points).

At block 635, communication engine 506 transmits a confirmation of the assignment and the access-enabling code(s) in one or more transmissions. The transmission(s) may be sent to one or more devices, such as a user device having initiated the request from block 620, a remote server or an intermediate system having relayed the request from block 620.

Figure 7A:
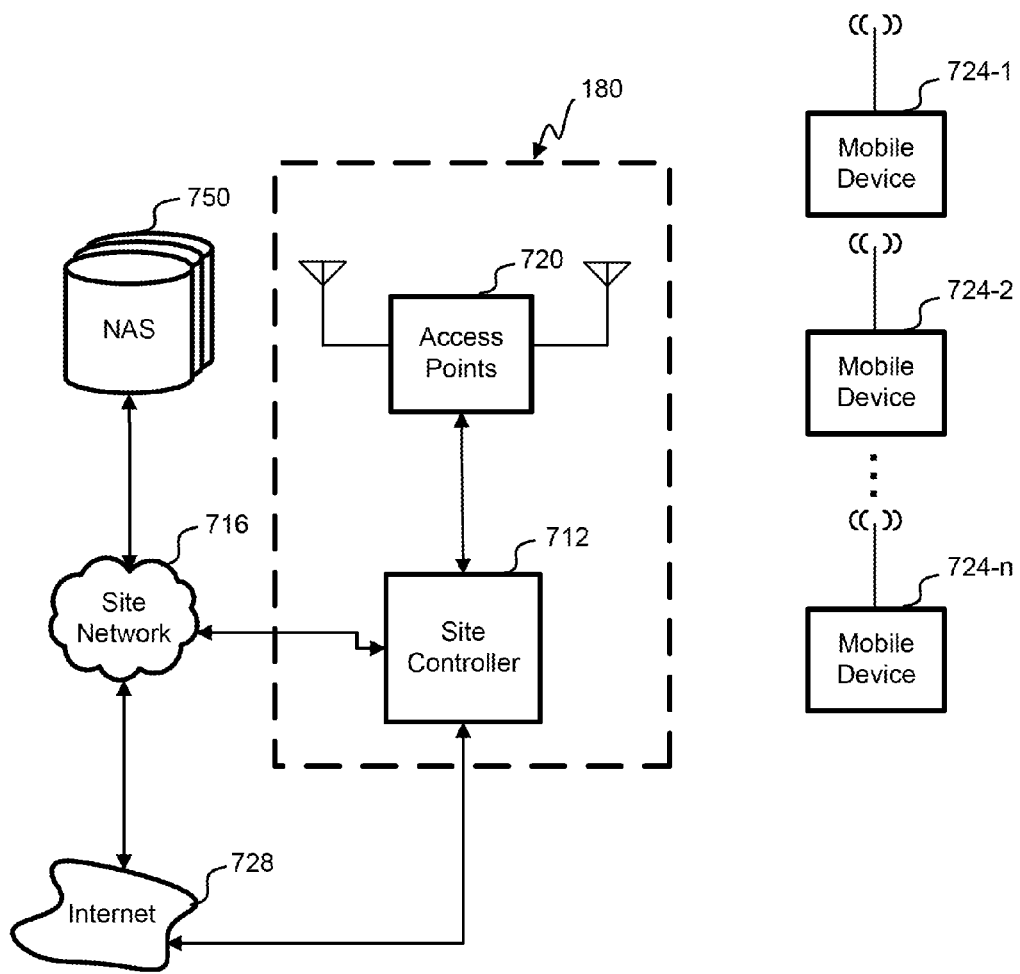
FIGS. 7A and 7B show embodiments of site systems in relations to mobile devices.

Referring to FIG. 7A, an embodiment of a site system 180 is shown in relation to mobile devices 724-n, Network Attached Storage (NAS) 750, site network 716 and the Internet 728. In some embodiments, for attendees of a live event or concert, site network 716 and site system 180 provide content, services and/or interactive engagement using mobile devices 724. Connections to site system 180 and site network 716 can be established by mobile devices 724 connecting to access points 720. Mobile devices 724 can be a type of end user device 110 that is portable, e.g., smartphones, mobile phones, tablets, and/or other similar devices.

Site network 716 can have access to content (information about attendees, videos, pictures, music, trivia information, etc.) held by NAS 750. Additionally, as described herein, content can be gathered from attendees both before and during the event. By connecting to site network 716, mobile device 724 can send content for use by site system 180 or display content received from NAS 750.

Figure 7B:
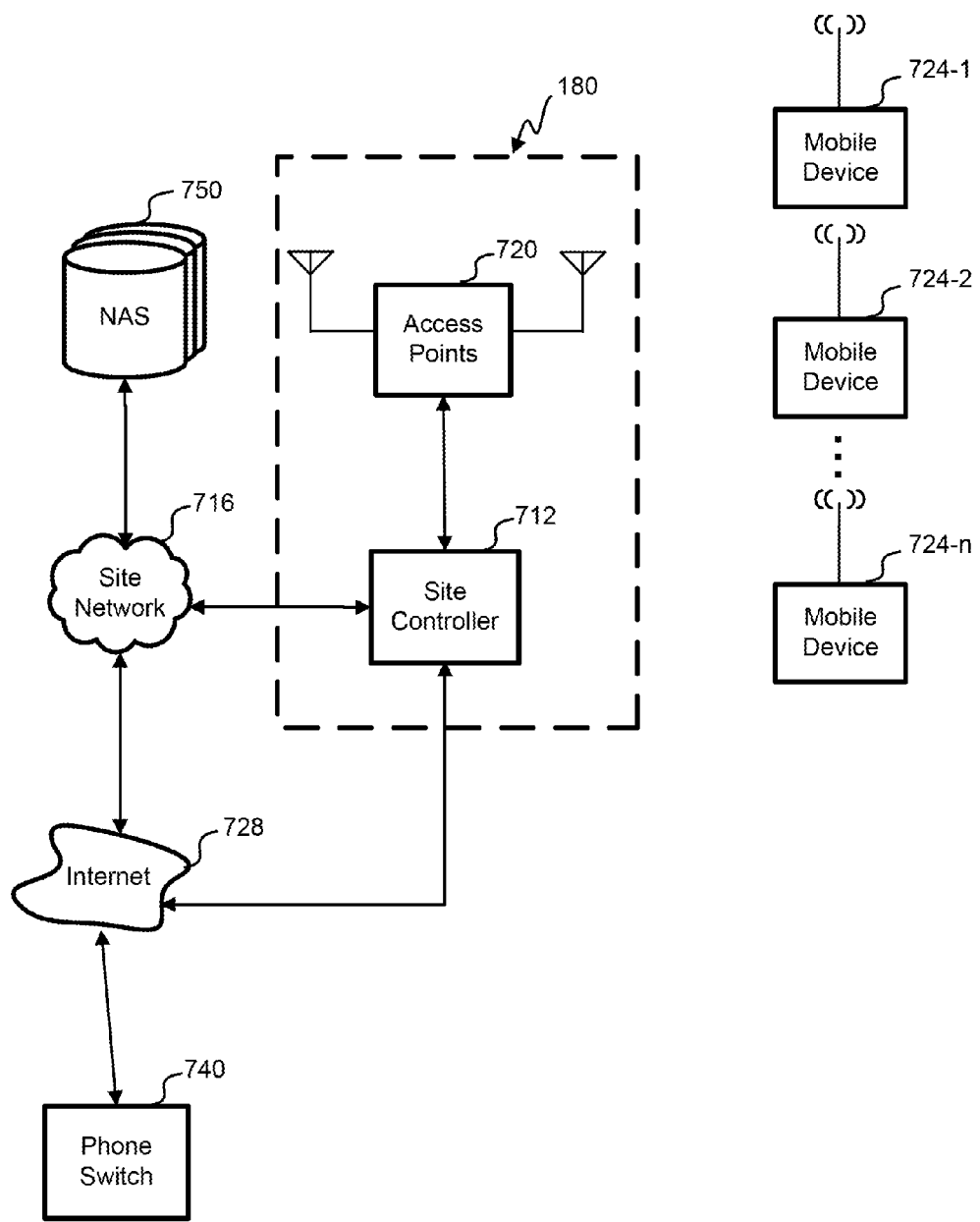

Referring to FIG. 7B, another embodiment of a site system 180 is shown in relation to mobile devices 724-n, Network Attached Storage (NAS) 750, site network 716 and the Internet 728, in an embodiment. FIG. 7B additionally includes phone switch 740. In some embodiments, phone switch 740 can be a private cellular base station configured to spoof the operation of conventionally operated base stations. Using phone switch 740 at an event site allows site system 180 to provide additional types of interactions with mobile devices 724. For example, without any setup or configuration to accept communications from site controller 712, phone switch 740 can cause connected mobile devices 724 to ring and, when answered, have an audio or video call be established. When used with other embodiments described herein, phone switch 740 can provide additional interactions. For example, some embodiments described herein use different capabilities of mobile devices 724 to cause mass sounds and/or establish communications with two or more people. By causing phones to ring and by establishing cellular calls, phone switch can provide additional capabilities to these approaches.

Figure 8:
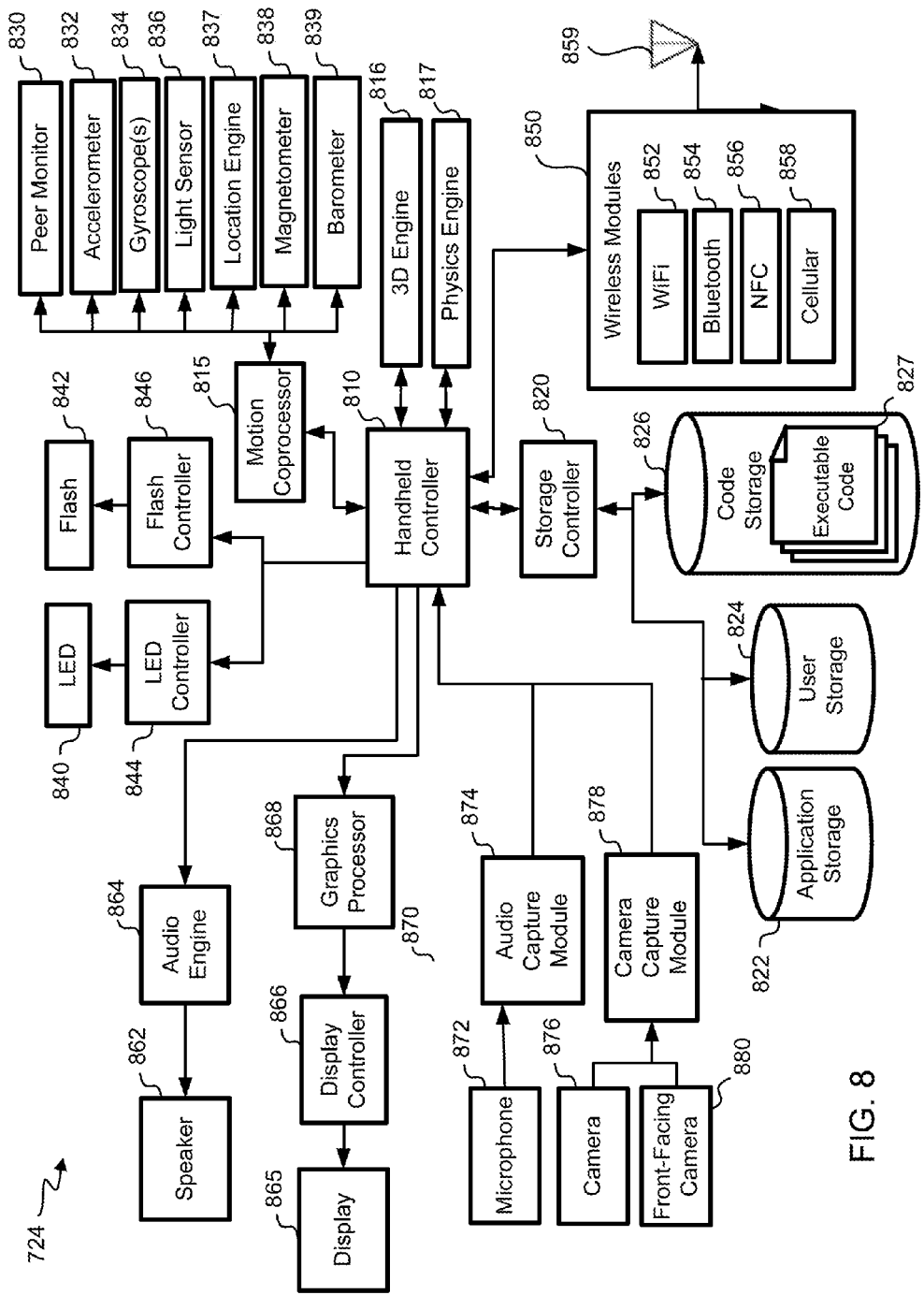
FIG. 8 shows a block diagram of user device according to an embodiment.

FIG. 8 shows a block diagram of user device 110 according to an embodiment. User device 110 includes a handheld controller 810 that can be sized and shaped so as enable the controller and user device 110 in a hand. Handheld controller 810 can include one or more user-device processors that can be configured to perform actions as described herein. In some instances, such actions can include retrieving and implementing a rule, retrieving an access-enabling code, generating a communication (e.g., including an access-enabling code) to be transmitted to another device (e.g., a nearby client-associated device, a remote device, a central server, a web server, etc.), processing a received communication (e.g., to perform an action in accordance with an instruction in the communication, to generate a presentation based on data in the communication, or to generate a response communication that includes data requested in the received communication) and so on.

Handheld controller 810 can communicate with a storage controller 820 so as to facilitate local storage and/or retrieval of data. It will be appreciated that handheld controller 810 can further facilitate storage and/or retrieval of data at a remote source via generation of communications including the data (e.g., with a storage instruction) and/or requesting particular data.

Storage controller 820 can be configured to write and/or read data from one or more data stores, such as an application storage 822 and/or a user storage 824. The one or more data stores can include, for example, a random access memory (RAM), dynamic random access memory (DRAM), read-only memory (ROM), flash-ROM, cache, storage chip, and/or removable memory. Application storage 822 can include various types of application data for each of one or more applications loaded (e.g., downloaded or pre-installed) onto user device 110. For example, application data can include application code, settings, profile data, databases, session data, history, cookies and/or cache data.

User storage 824 can include, for example, files, documents, images, videos, voice recordings and/or audio. It will be appreciated that user device 110 can also include other types of storage and/or stored data, such as code, files and data for an operating system configured for execution on user device 110.

Handheld controller 810 can also receive and process (e.g., in accordance with code or instructions generated in correspondence to a particular application) data from one or more sensors and/or detection engines. The one or more sensors and/or detection engines can be configured to, for example, detect a presence, intensity and/or identify of (for example) another device (e.g., a nearby device or device detectable over a particular type of network, such as a Bluetooth, Bluetooth Low-Energy or Near-Field Communication network); an environmental, external stimulus (e.g., temperature, water, light, motion or humidity); an internal stimulus (e.g., temperature); a device performance (e.g., processor or memory usage); and/or a network connection (e.g., to indicate whether a particular type of connection is available, a network strength and/or a network reliability).

FIG. 8 shows several exemplary sensors and detection engines, including a peer monitor 830, accelerometer 832, gyroscope 834, light sensor 836 and location engine 838. Each sensor and/or detection engine can be configured to collect a measurement or make a determination, for example, at routine intervals or times and/or upon receiving a corresponding request (e.g., from a processor executing an application code).

Peer monitor 830 can monitor communications, networks, radio signals, short-range signals, etc., which can be received by a receiver of user device 110) Peer monitor 830 can, for example, detect a short-range communication from another device and/or use a network multicast or broadcast to request identification of nearby devices. Upon or while detecting another device, peer monitor 830 can determine an identifier, device type, associated user, network capabilities, operating system and/or authorization associated with the device. Peer monitor 530 can maintain and update a data structure to store a location, identifier and/or characteristic of each of one or more nearby user devices.

Accelerometer 832 can be configured to detect a proper acceleration of user device 110. The acceleration may include multiple components associated with various axes and/or a total acceleration. Gyroscope 834 can be configured to detect one or more orientations (e.g., via detection of angular velocity) of user device 110. Gyroscope 834 can include, for example, one or more spinning wheels or discs, single- or multi-axis (e.g., three-axis) MEMS-based gyroscopes.

Light sensor 836 can include, for example, a photosensor, such as photodiode, active-pixel sensor, LED, photoresistor, or other component configured to detect a presence, intensity and/or type of light. In some instances, the one or more sensors and detection engines can include a motion detector, which can be configured to detect motion. Such motion detection can include processing data from one or more light sensors (e.g., and performing a temporal and/or differential analysis).

Location engine 838 can be configured to detect (e.g., estimate) a location of user device 110. For example, location engine 838 can be configured to process signals (e.g., a wireless signal, GPS satellite signal, cell-tower signal, iBeacon, or base-station signal) received at one or more receivers (e.g., a wireless-signal receiver and/or GPS receiver) from a source (e.g., a GPS satellite, cellular tower or base station, or WiFi access point) at a defined or identifiable location. In some instances, location engine 838 can process signals from multiple sources and can estimate a location of user device 110 using a triangulation technique. In some instances, location engine 838 can process a single signal and estimate its location as being the same as a location of a source of the signal.

User device 110 can include a flash 842 and flash controller 846. Flash 842 can include a light source, such as (for example), an LED, electronic flash or high-speed flash. Flash controller 846 can be configured to control when flash 842 emits light. In some instances, the determination includes identifying an ambient light level (e.g., via data received from light sensor 836) and determining that flash 842 is to emit light in response to a picture- or movie-initiating input when the light level is below a defined threshold (e.g., when a setting is in an auto-flash mode). In some additional or alternative instances, the determination includes determining that flash 846 is, or is not, to emit light in accordance with a flash on/off setting. When it is determined that flash 846 is to emit light, flash controller 846 can be configured to control a timing of the light so as to coincide, for example, with a time (or right before) at which a picture or video is taken.

User device 110 can also include an LED 840 and LED controller 844. LED controller 844 can be configured to control when LED 840 emits light. The light emission may be indicative of an event, such as whether a message has been received, a request has been processed, an initial access time has passed, etc.

Flash controller 846 can control whether flash 846 emits light via controlling a circuit so as to complete a circuit between a power source and flash 846 when flash 842 is to emit light. In some instances, flash controller 846 is wired to a shutter mechanism so as to synchronize light emission and collection of image or video data.

User device 110 can be configured to transmit and/or receive signals from other devices or systems (e.g., over one or more networks, such as network(s) 170). These signals can include wireless signals, and accordingly user device 110 can include one or more wireless modules 850 configured to appropriately facilitate transmission or receipt of wireless signals of a particular type. Wireless modules 850 can include a Wi-Fi module 852, Bluetooth module 854, near-field communication (NFC) module 856 and/or cellular module 856. Each module can, for example, generate a signal (e.g., which may include transforming a signal generated by another component of user device 110 to conform to a particular protocol and/or to process a signal (e.g., which may include transforming a signal received from another device to conform with a protocol used by another component of user device 110).

Wi-Fi module 854 can be configured to generate and/or process radio signals with a frequency between 2.4 gigahertz and 5 gigahertz. Wi-Fi module 854 can include a wireless network interface card that includes circuitry to facilitate communicating using a particular standard (e.g., physical and/or link layer standard).

Bluetooth module 854 can be configured to generate and/or process radio signals with a frequency between 2.4 gigahertz and 2.485 gigahertz. In some instances, bluetooth module 854 can be configured to generate and/or process Bluetooth low-energy (BLE or BTLE) signals with a frequency between 2.4 gigahertz and 2.485 gigahertz.

NFC module 856 can be configured to generate and/or process radio signals with a frequency of 13.56 megahertz. NFC module 856 can include an inductor and/or can interact with one or more loop antenna.

Cellular module 858 can be configured to generate and/or process cellular signals at ultra-high frequencies (e.g., between 698 and 2690 megahertz). For example, cellular module 858 can be configured to generate uplink signals and/or to process received downlink signals.

The signals generated by wireless modules 850 can be transmitted to one or more other devices (or broadcast) by one or more antennas 859. The signals processed by wireless modules 850 can include those received by one or more antennas 859. One or more antennas 859 can include, for example, a monopole antenna, helical antenna, intenna, Planar Inverted-F Antenna (PIFA), modified PIFA, and/or one or more loop antennae.

User device 110 can include various input and output components. An output component can be configured to present output. For example, a speaker 862 can be configured to present an audio output by converting an electrical signal into an audio signal. An audio engine 864 can effect particular audio characteristics, such as a volume, event-to-audio-signal mapping and/or whether an audio signal is to be avoided due to a silencing mode (e.g., a vibrate or do-not-disturb mode set at the device).

Further, a display 866 can be configured to present a visual output by converting an electrical signal into a light signal. Display 866 may include multiple pixels, each of which may be individually controllable, such that an intensity and/or color of each pixel can be independently controlled. Display 866 can include, for example, an LED- or LCD-based display.

A graphics engine 868 can determine a mapping of electronic image data to pixel variables on a screen of user device 110. It can further adjust lighting, texture and color characteristics in accordance with, for example, user settings.

In some instances, display 866 is a touchscreen display (e.g., a resistive or capacitive touchscreen) and is thus both an input and an output component. A screen controller 870 can be configured to detect whether, where and/or how (e.g., a force of) a user touched display 866. The determination may be made based on an analysis of capacitive or resistive data.

An input component can be configured to receive input from a user that can be translated into data. For example, as illustrated in FIG. 8, user device 110 can include a microphone 872 that can capture audio data and transform the audio signals into electrical signals. An audio capture module 874 can determine, for example, when an audio signal is to be collected and/or any filter, equalization, noise gate, compression and/or clipper that is to be applied to the signal.

User device 110 can further include one or more cameras 876, 880, each of which can be configured to capture visual data (e.g., at a given time or across an extended time period) and convert the visual data into electrical data (e.g., electronic image or video data). In some instances, user device 110 includes multiple cameras, at least two of which are directed in different and/or substantially opposite directions. For example, user device 110 can include a rear-facing camera 876 and a front-facing camera 880.

A camera capture module 878 can control, for example, when a visual stimulus is to be collected (e.g., by controlling a shutter), a duration for which a visual stimulus is to be collected (e.g., a time that a shutter is to remain open for a picture taking, which may depend on a setting or ambient light levels; and/or a time that a shutter is to remain open for a video taking, which may depend on inputs), a zoom, a focus setting, and so on. When user device 110 includes multiple cameras, camera capture module 878 may further determine which camera(s) is to collect image data (e.g., based on a setting).

Figure 9:
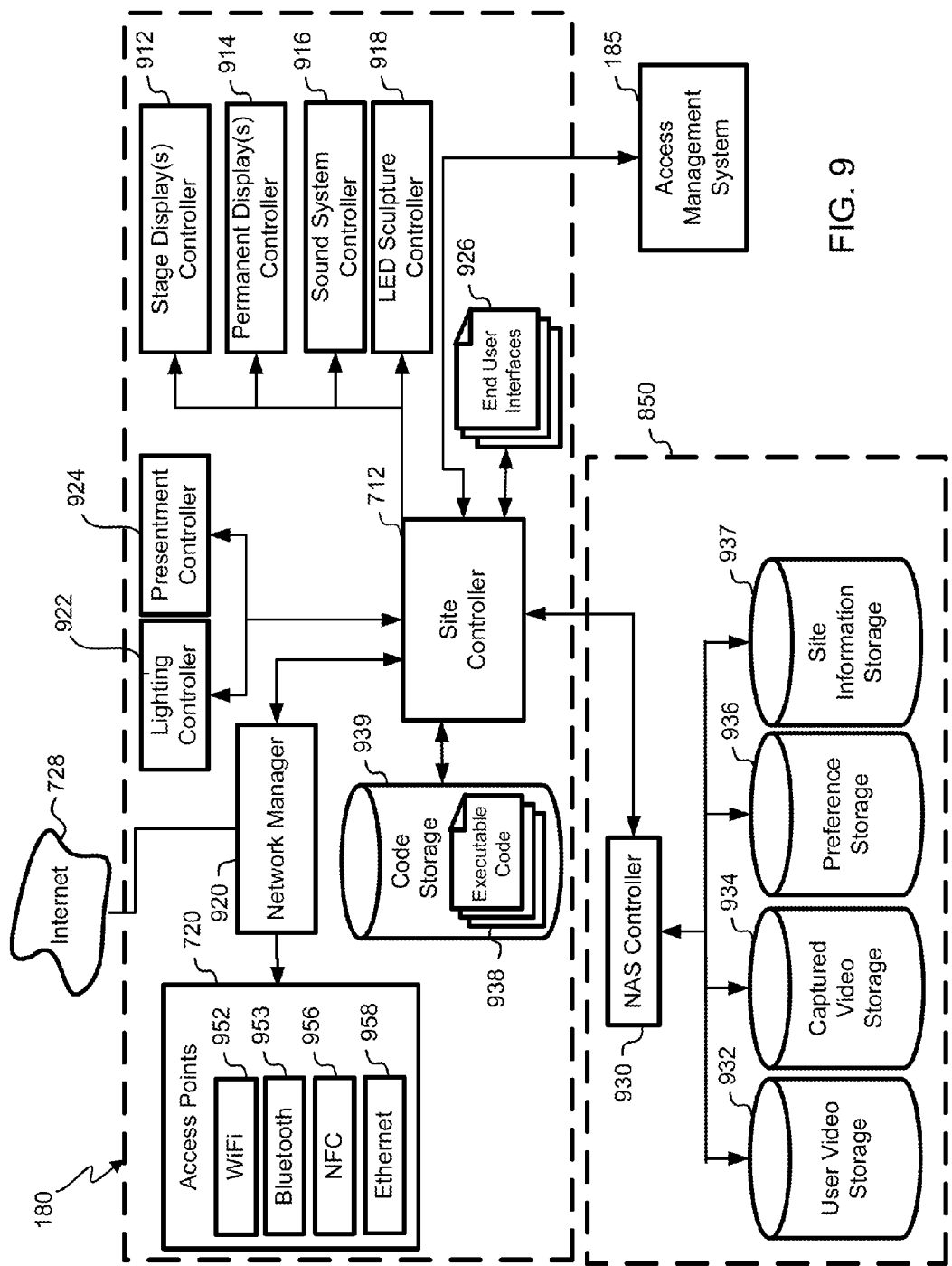
FIG. 9 illustrates sample components of an embodiment of site system 180, including connections to a NAS and access management system.

FIG. 9 illustrates sample components of an embodiment of site system 180, including connections to NAS 750 and access management system 185. Embodiments of site controller 712 use network manager 920 to connect via access points 720 (using e.g., WiFi 952, Bluetooth 953, NFC 956, Ethernet 958, and/or other network connections) to other network components, such as site network 716 and mobile devices 724. In some embodiments, site system 280 uses site controller 712 to control aspects of an event venue. A broad variety of venue features can be controlled by different embodiments, including: permanent lights (e.g., with lighting controller 922), stage lights (e.g., with presentment controller 924), stage display screens (e.g., with stage display(s) controller 912), permanent display screens (e.g., with permanent display(s) controller 914), and the venue sound system (e.g., with the sound system controller 916).

A more detailed view of NAS 750 is shown, including NAS controller 930 coupled to user video storage 932, captured video storage 934, preference storage 936, and 3D model 938. Captured video storage 934 can receive, store and provide user videos received from mobile devices 724. In some embodiments, site controller 712 triggers the automatic capture of images, audio and video from mobile devices 724, such triggering being synchronized to activities in an event. Images captured by this and similar embodiments can be stored on both the capturing mobile device 724 and user video storage 932. In an embodiment, site controller 712 can coordinate the transfer of information from mobile devices to NAS 750 (e.g., captured media) with activities taking place during the event. When interacting with mobile devices 724, some embodiments of site controller 712 can provide end user interfaces 926 to enable different types of interaction. For example, as a part of engagement activities, site controller may offer quizzes and other content to the devices. Additionally, with respect to location determinations discussed herein, site controller can supplement determined estimates with voluntarily provided information using end user interfaces 926, stored in a storage that is not shown.

In some embodiments, to guide the performance of different activities, site controller 712 and/or other components may use executable code 938 tangibly stored in code storage 939. In some embodiments, site information storage 937 can provide information about the site, e.g., events, seat maps, attendee information, geographic location of destinations (e.g., concessions, bathrooms, exits, etc.), as well as 3D models of site features and structure.

Figure 10:
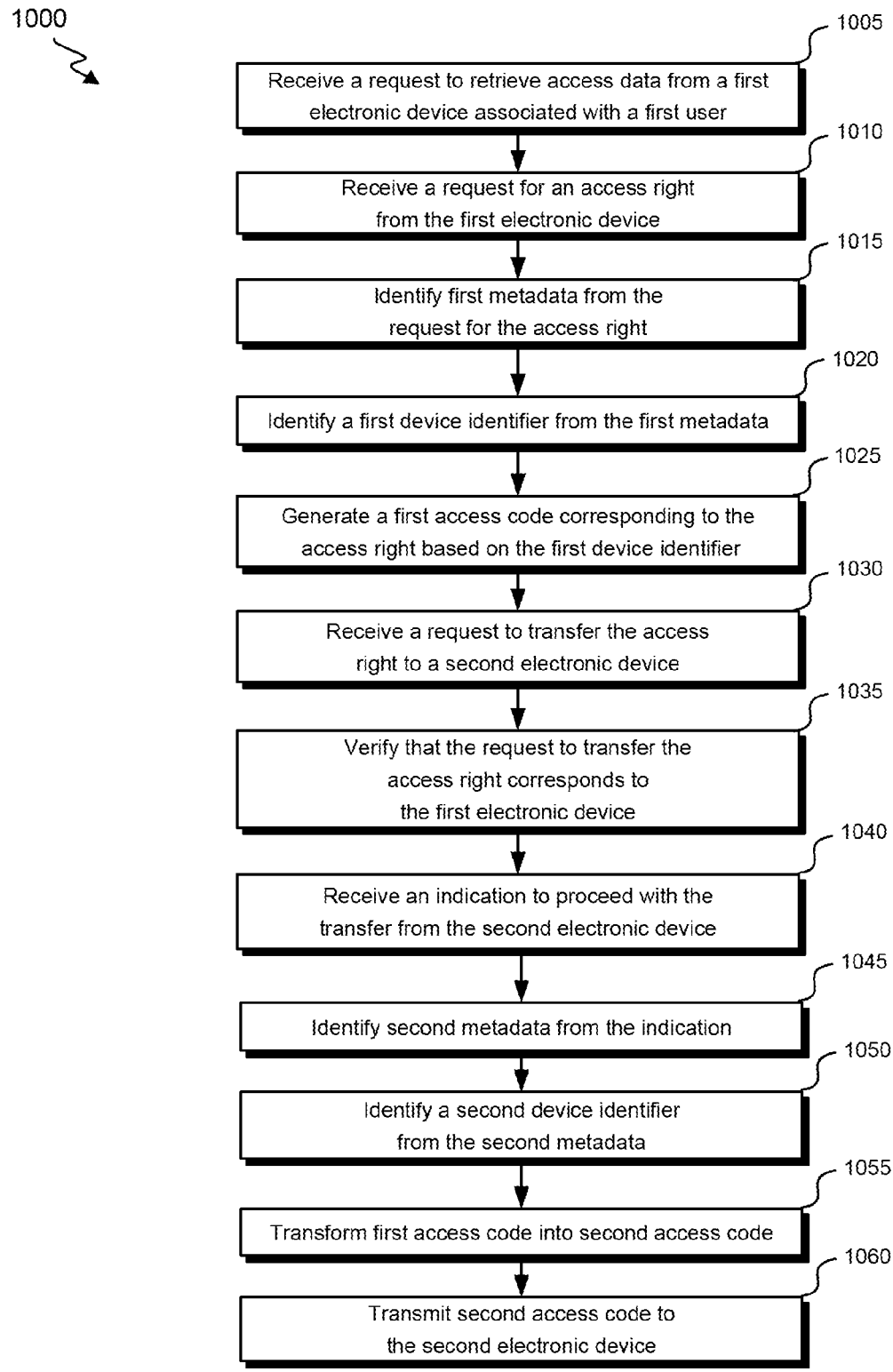
FIG. 10 is a flowchart illustrating a process for securely transferring access rights.

FIG. 10 is a flowchart illustrating process 1000 for detecting and using device-identifying codes to enhance security of access-right transfers. Part or all of process 1000 may be performed, for example, at access management system, various electronic devices (e.g., first through third user devices), and/or one or more data stores associated with the access management system. It will be appreciated that performance of process 1000 may be distributed. For example, various servers (e.g., co-located servers or geographically dispersed servers) may perform different actions in process 1000.

Examples of one or more user devices include, for example, a computer, a mobile device, a smart phone, a laptop, a thin client device, a tablet, and other similar electronic devices). Further, the access management system can include one or more servers and/or one or more data stores. The one or more servers and the one or more data stores may or may not be co-located.

At block 1005, the access management system may receive a first communication from a first user device associated with a first user. In some embodiments, the first communication can be a message transmitted from the first user device to the access management system. For example, the message may include data representing a request to retrieve access data associated with the first user. The access data may correspond to one or more access rights. An access right may facilitate entry to a spatial area (e.g., a ticket for a venue, concert hall, stadium, and the like) for a user (e.g., the first user, second user, or any other suitable user). The request to retrieve access data may correspond to a request to retrieve one or more access rights associated with the first user. In some examples, the request to retrieve access data can be initiated by the first user. For example, the first user can click on a link presented on the first user device (or in other cases, the first user can press a button displayed on the screen of the first user device). Clicking the link can initiate a transmission of a request to retrieve one or more access rights associated with the first user. In some embodiments, the first user device can receive data representing the login credentials from the first user. The data representing the login credentials can be transmitted to one or more servers for verification of the first user or first user device.

In some embodiments, the access data, for which the first user device transmitted the request for retrieval, may be previously associated with the first user. For example, the access data may include one or more valid access rights already associated with the first user (e.g., access rights that facilitate entry to one or more first spatial areas). In some embodiments, the one or more valid access rights may be presented on the first user device in the form of a list. In other embodiments, the access data may be determined in response to the first communication received from the first user device. For example, the request for retrieval of one or more access rights may also include data representing parameters for querying one or more data stores for access rights that correspond to the parameters included in the request. A list of access rights corresponding to the parameters may be generated at the access management system and presented on the first user device.

At block 1010, the access management system may receive a second communication from the first user device. In some embodiments, the second communication may correspond to a request for an access right. For example, the second communication may request an access right from amongst the one or more access rights retrieved after the first communication. It will be appreciated that more than one access right may be requested. Requesting an access right may correspond to selection of an access right for association with the first user or first user device. For example, requesting an access right may correspond to a request to associate the access right with the first user or first user device. Associating an access right with the first user may refer to facilitating entry to a spatial area corresponding to the access right for the first user.

In some examples, an access right may facilitate entry to a spatial area for the first user or first user device. For example, an access right may correspond to a spatial area. When the access right is associated with the first user device, the access right can facilitate entry to the spatial area for the first user using the first user device. In some examples, the spatial area may be an area at a geographical location (e.g., building, stadium, and the like). Transferring the access right to the second user device facilitates entry to the spatial area for the second user using the second user device, but no longer allows entry to the spatial area for the first user using the first user device.

At block 1015, the access management system may identify metadata associated with the second communication. In some examples, the second communication may include one or more data packets that include data headers and data payloads. Information in the data headers and data payloads may be scanned or read and various pertinent information may be extracted from the data packets. Further, the data headers or the data payloads may include metadata. For example, the metadata may describe aspects of the data included in the data packets. In some examples, all or part of the metadata may be obtained from one or more data stores storing information related to various users. In some embodiments, the metadata include one or more composites (e.g., a data field in the data packet). For example, a composite of the data packets corresponding to the second communication may include data (e.g., a value) representing a device identifier of the first user device.

In some embodiments, a device identifier may include data representing a unique identifier of an electronic device. For example, the device identifier may uniquely identify a particular electronic device from amongst a plurality of electronic devices. In some examples, the device identifier may include a code that is uniquely associated with a particular device. In other examples, the device identifier may include data representative of a code associated with one or more characteristics of the device that is uniquely identified by the device identifier. For example, the first user device may be configured to include several network interfaces (e.g., a network interface card for wireless communication via Wi-Fi, Ethernet, Bluetooth, and the like). In this example, a device identifier may include data representing a media access control (MAC) address for a network interface card of the first user device. For example, a MAC address may include six groups of two hexadecimal digits. A MAC address corresponding to the first user device may uniquely identify the first user device from a plurality of electronic devices. For example, the first user device may correspond to a MAC address and another electronic device may correspond to a different MAC address than the MAC address associated with the first user device. For an example, see U.S. Ser. No. 14/202,218, filed in the United States Patent & Trademark Office on Mar. 10, 2014, which is hereby expressly incorporated by reference in its entirety for all purposes. It will be appreciated that the device identifier may include data representing other suitable unique identifiers for devices. Examples of other unique identifiers for the first user device may include data representing an organizationally unique identifier (OUI), a globally unique identifier, a universally unique identifier, identity correlation, World Wide Port Name, and other suitable unique identifiers. It will be appreciated that the unique device identifier for the first user device may be an alphanumeric value generated at random and associated with the first user device. A data store can store the association between devices and randomly generated alphanumeric values.

At block 1020, the access management system can identify the unique device identifier for the first user device from the second communication. It will be appreciated that the access management system may identify the unique device identifier for the first user device from the first communication or from any other suitable communication. It will be appreciated that the device identifier of the first user device can be manually determined by receiving an input corresponding to the device identifier at an interface presented on the first user device or other device. It will also be appreciated that all or part of the unique device identifier for the first user device may be queried from a data store.

At block 1025, the access management system may generate a first access code corresponding to the access right requested at block 1010. The first access code may be a unique identification of the access right requested at block 1010. In some embodiments, the first access code may be generated at least in part based on the device identifier of the first user device. For example, the access management system may perform (e.g., at one or more processors or central processing units (CPUs)) the generation of the first access code by including data representing the unique device identifier for the first user device in the first access code. At least a portion or segment of the first access code may include the device identifier (e.g., the code representing the device identifier) or a representation of the device identifier (e.g., a transformed code representing the device identifier). In some embodiments, the first access code may include data representing machine-readable code that is readable at a scanning device (e.g., an RFID scanner). It will be appreciated that the first access code may uniquely correspond to one or more characteristics (e.g., a physical characteristic, such as the address of a network interface card) of the first user device.

At block 1030, the access management system can receive a third communication from the first user device. In some examples, the third communication may correspond to a request to transfer the requested access right. For example, the third communication may correspond to a request to transfer the access right (e.g., the access right obtained at block 1010) to a second user device associated with a second user. For example, the first user device can provide an interface to the first user for receiving an input that identifies a second user or second user device. For example, the first user device can receive an input of a phone number associated with the second user device in order to identify the second user device. The first user device can then receive another input corresponding to the request to transfer the access right (e.g., the access right requested at block 1020) to the second user device. It will be appreciated that, upon identifying the second user device (e.g., a potential recipient device for the access right), the access management system may transmit a communication to the second user device notifying the second user of the first user's request to transfer the access right.

At block 1035, the access management system may verify that the request to transfer the access right (received from the first user device at block 1030) corresponds to the first user device. For example, the access management system can verify or authenticate that the first user device transmitted the request to transfer the access right (e.g., by transmitting the third communication). The access management system may perform the verification of block 1035 by extracting metadata associated with the third communication and identifying the device identifier included in the extracted metadata. Verification is successfully completed when the device identifier (determined from the extracted metadata) matches the device identifier of the first user device (e.g., previously determined from the second communication prior to or in conjunction with the generating of the first access code). It will be appreciated that this verification can be automatic and can be performed so as to not be detectable by the first user. It will also be appreciated that verification can be performed using biometric information associated with the first user, in addition to or in lieu of using the device identifier for the authentication or verification. For example, the access management system can transmit visual data to the first user device. The visual data can represent an interface that can prompt the first user to input biometric information into the interface. It will be appreciated that the first access code can also be verified as being valid, in addition to or in lieu of verifying the first electronic device. For example, see U.S. Ser. No. 14/553,902, filed in the United States Patent & Trademark Office on Nov. 25, 2014, which is hereby expressly incorporated by reference in its entirety for all purposes.

At block 1040, the access management system may receive a fourth communication from the second user device associated with the second user. The fourth communication may correspond to an indication to proceed with the transfer of the access right. In some examples, the access management system transmits a request for transfer of the access right to the second user device. The fourth communication may be a response (from the second user device) to the request transmitted by the access management system. The response from the second user device may be an acceptance (e.g., an indication to proceed with the transfer) or a denial of the request to accept the transfer. If the fourth communication corresponds to an indication to proceed with the transfer, then process 1000 continues. If the fourth communication corresponds to a denial, then process 1000 ends.

At block 1045, the access management system may identify metadata associated with the fourth communication. In some examples, the fourth communication may include one or more data packets that include data headers and data payloads. Information in the data headers and data payloads may be scanned or read and various pertinent information may be extracted from the data packets. Further, the data headers or the data payloads may include metadata. For example, the metadata may describe aspects of the data included in the data packets. In some examples, all or part of the metadata may be obtained from one or more data stores storing information related to various users. In some embodiments, the metadata include one or more composites (e.g., a data field in the data packet). For example, a composite of the data packets corresponding to the fourth communication may include data (e.g., a value) representing the device identifier of the second user device.

The device identifier of the second user device may be determined in a similar manner as with the determination of the device identifier of the first user device. For example, the device identifier may include data representing a unique identifier of an electronic device. For example, the device identifier may uniquely identify a particular electronic device from amongst a plurality of electronic devices. In some examples, the device identifier may include a code that is uniquely associated with a particular device. In other examples, the device identifier may include data representative of a code associated with one or more characteristics of the device that is uniquely identified by the device identifier. For example, the second user device may include several network interfaces (e.g., a network interface card for wireless communication via Wi-Fi, Ethernet, Bluetooth, etc.). In this example, a device identifier may include data representing a media access control (MAC) address for a network interface card of the second user device. For example, a MAC address may include six groups of two hexadecimal digits. A MAC address corresponding to the second user device may uniquely identify the second user device from a plurality of electronic devices. For example, the second user device may correspond to a MAC address and another electronic device may corresponding to a different MAC address than the MAC address associated with the second user device. It will be appreciated that the device identifier may include data representing other suitable unique identifiers for devices. Examples of other unique identifiers for the second user device may include data representing an organizationally unique identifier (OUI), a globally unique identifier, a universally unique identifier, identity correlation, World Wide Port Name, and other suitable unique identifiers. It will be appreciated that the unique device identifier for the first user device may be an alphanumeric value generated at random and associated with the first user device. A data store can store the association between devices and randomly generated alphanumeric values.

At block 1050, the access management system can identify the unique device identifier for the second user device from the fourth communication. It will be appreciated that the access management system may identify the unique device identifier for the second user device in other ways. For example, the unique device identifier for the second user device can be manually inputted into an interface presented on the second user device or automatically detected. It will also be appreciated that all or part of the unique device identifier for the first user device may be queried from a data store.

At block 1055, the access management system can transform the first access code corresponding to the access right into a second access code. In some embodiments, transforming the first access code into the second access code facilitates completion of the transfer of the access right from the first user device to the second user device. Further, transforming the first access code into the second access code may involve generating a new code or modifying the first access code. After transformation of the first access code into the second access code, the access right may correspond to the second access code and not the first access code. For example, after transformation of the first access code into the second access code, the access right can facilitate entry to the spatial area for the second user, and not for the first user. In some examples, after transformation of the first access code into the second access code, the first access code may be invalid and no longer facilitate entry to the spatial area for the first user.

At least a part of the second access code can include data representing the device identifier of the second user device. For example, a section of the second access code may include the unique device identifier of the second user device or may include a representation of the unique device identifier of the second user device. Further, the section of the second access code that corresponds to the unique device identifier of the second user device can include machine-readable code that is detectable by another electronic device (e.g., a scanner, an RFID scanner, and other suitable electronic devices). For example, the second user device can display a representation of the second access code (e.g., a QR code, or other suitable machine-readable code).

In some embodiments, transformation of the first access code into the second access code can include replacing a section of the first access code (e.g., the section of the first access code corresponding to the device identifier of the first user device) with data representing the device identifier of the second user device. In other embodiments, transformation of the first access code into the second access code can include generating an entirely new code that includes at least a section including data representing the device identifier of the second user device. It will be appreciated that transforming the first access code into the second access code may involve other suitable transformational techniques. At block 1060, the access management system can transmit data representing the second access code to the second user device. It will be appreciated that transforming the first access code into the second access code can also include, for example, transforming a physical manifestation of an access right into an electronic representation of the access right. For example, see U.S. Ser. No. 14/049,909, filed in the United States Patent & Trademark Office on Oct. 9, 2013, which is hereby expressly incorporated by reference in its entirety for all purposes. As another example, see U.S. Ser. No. 10/731,410, filed in the United States Patent & Trademark Office on Dec. 9, 2003, which is hereby expressly incorporated by reference in its entirety for all purposes.

Unauthorized transfer of the second access code from the second user device to another user device (e.g., to a third user device) can be prevented. For example, at least a portion of the second access code can include data representing the device identifier of the second user device. If the second user device transmits data representing the second access code to a third user device (e.g., by taking a screenshot of the second access code and sending the screenshot to the third user device), a device capable of scanning can scan the second access code from the third user device. In addition, the device capable of scanning may request a device identifier from the third user device. The access management system may be associated with the device capable of scanning. The access management system can compare the device identifier of the third user device with the portion of the second access code that represents the device identifier of the second user device to determine whether a match exists. If no match exits, entry to the spatial area for a third user operating the third user device can be prevented.

Figure 11:
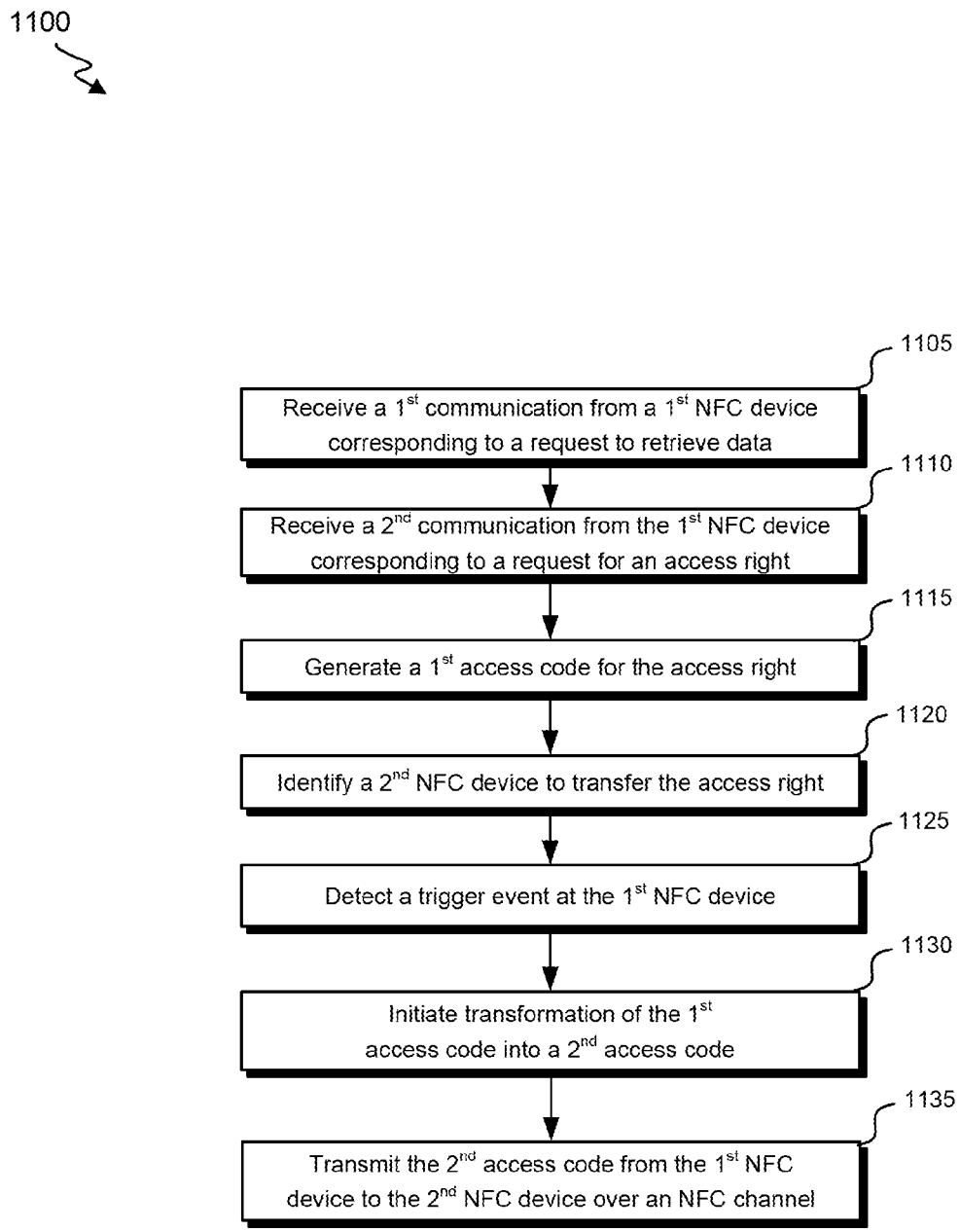
FIG. 11 is a flowchart illustrating a process for transferring access rights over near field communication channels.

FIG. 11 is a flowchart illustrating process 1100 for transferring access rights over near field communication (NFC) channels. Part or all of process 1100 may be performed, for example, at access management system, various electronic devices (e.g., first through third NFC devices), and/or one or more data stores associated with the access management system. It will be appreciated that performance of process 1100 may be distributed. For example, various servers (e.g., co-located servers or geographically dispersed servers) may perform different actions in process 1100. It will be appreciated that process 1100 may be performed using other short-range communication technologies in addition to or in lieu of NFC.

An electronic device may be configured for wireless communication with other electronic devices over a short-range communication channel. For example, an electronic device configured for NFC may communicate with other devices over an NFC channel. In some examples, communication over the NFC channel can be achieved when two or more NFC devices are approximately 4 cm or less apart from each other. In other examples, communication can be achieved with a greater distance between devices. In addition, NFC devices can be configured to include a set of one or more sensors. For example, the sensors can include motion sensors (e.g., gyroscopes) to detect occurrence of a "bump" motion or tap motion on an NFC device. Detecting the "bump" motion or tap motion can trigger transmissions of various messages between the NFC devices.

At block 1105, the access management system may receive a first communication from a first NFC device associated with a first user. The first communication may correspond to a request to retrieve access data associated with a first user. For example, the first communication may include a message containing data that represents a request to retrieve access data. In this example, the request may be associated with login credentials for the first user. The login credentials can be used to retrieve the access data associated with the first user. The access data may include one or more access rights. An access right can be associated with entry to a spatial area of a resource corresponding to the access right.

At block 1110, the access management system can receive a second communication from the first NFC device. The second communication may correspond to a request for an access right. For example, the first NFC device may request for an access right from amongst the one or more access rights included in the access data. In some examples, the request for an access right may correspond to a request to associate the access right with the first user. For example, a request to associate the first user with an access right associates the first user with the access right, such that other users are not associated with the access right.

At block 1115, the access management system may generate a first access code corresponding to the access right requested at block 1110. The first access code may be a unique identification of the access right requested at block 1110. In some embodiments, the first access code may be generated at least in part based on the device identifier of the first NFC device. For example, the access management system may perform (e.g., at one or more processors or central processing units (CPUs)) the generation of the first access code by including data representing the unique device identifier for the first NFC device in the first access code. At least a portion or segment of the first access code may include the device identifier (e.g., the code representing the device identifier) or a representation of the device identifier (e.g., a transformed code representing the device identifier) of the first NFC device. For example, as with the description of FIG. 10, a device identifier may be an identifier that uniquely identifies the first NFC device from amongst a plurality of electronic devices (e.g., a MAC address, a serial number for the NFC interface card, and the like). In some embodiments, the first access code may include data representing machine-readable code that is readable at a scanning device (e.g., an RFID scanner). It will be appreciated that the first access code may uniquely correspond to one or more characteristics (e.g., a physical characteristic, such as the address of a network interface card) of the first NFC device.

At block 1120, a second NFC device may be identified at the first NFC device. For example, the first NFC device may broadcast beacon messages for identifying other nearby NFC devices. For example, the second NFC device, which may be physically located in a proximate vicinity to the first NFC (e.g., within the same room or building, within approximately 10 feet, and the like), may receive the beacon message and respond to the beacon message with information identifying the second NFC device to the first NFC device. After an initialization period, for example, the first NFC device may generate a list of nearby NFC devices. The first NFC device may display an interface with the user in which the list of nearby NFC devices is displayed. The interface may receive an input corresponding to a selection of the second NFC device from the list of nearby NFC devices. The second NFC device may be identified based on the input received at the first NFC device. In some embodiments, identification of the second NFC device may correspond to a request to transfer the access right (requested at block 1110) from the first NFC device to the second NFC device. It will be appreciated that the second NFC device may be identified by inputting identification of the second NFC device into an interface displayed on the first NFC device.

At block 1125, the first NFC device may detect a trigger event at the set of sensors of the first NFC device. In some examples, the set of sensors of the first NFC device may constantly or periodically generate sensor data. The first NFC device may analyze the sensor data for one or more motion features. A motion feature is a particular type of motion identified from the sensor signal. For example, a motion feature can include sensor data corresponding to a "bump" motion where the first NFC device is "bumped" against the second NFC device. Other examples of motion features include a tapping motion where the first NFC device is tapped, a swiping motion where the display of the first NFC device is swiped, a shaking motion where the first NFC device is shaken, and other suitable motion features.

Detecting a motion feature in the sensor data may correspond to a detection of the trigger event. For example, when the first NFC device is "bumped" against the second NFC device, the first NFC device may detect a motion feature in the sensor data corresponding to a "bumping" motion. Upon detection of the motion feature, the first NFC device (and optionally the second NFC device) may determine that a trigger event has occurred. In some examples, the first NFC device may detect the trigger event and notify the second NFC device (e.g., via a control signal). In other examples, each of the first NFC device and the second NFC device may independently detect the trigger event.

At block 1130, detecting the trigger event may initiate transformation of the first access code into a second access code. Transforming the first access code corresponding to the access right into a second access code may be performed at any, part, or all of the first NFC device, the second NFC device, and/or the access management system. For example, upon detection of the trigger event, the first NFC may initiate a control signal indicating to one or more processors of the first NFC device to perform the transformation of the first access code to the second access code. In this example, the first NFC device may perform the computations involved in transforming the first access code into the second access code. In another example, the detection of the trigger event at the second NFC device may correspond to an acceptance of the request to transfer the access right. In this example, the second NFC device may receive the first access code from the first NFC device and transform the first access code into the second access code at the second NFC device. It will be appreciated that transforming the first access code into the second access code may be performed at the access management system. For example, detection of the trigger event at the first NFC device may initiate a transmission of the first access code to the access management system for transformation. The access management system may transmit the second access code to the second NFC device.

In some embodiments, transforming the first access code into the second access code facilitates the transfer of the access right from the first NFC device to the second NFC device. Further, transforming the first access code into the second access code may involve generating a new code or modifying the first access code. After transformation of the first access code into the second access code, the access right may correspond to the second access code and not the first access code. For example, after transformation of the first access code into the second access code, the access right can facilitate entry to the spatial area for the second user using the second access code, but not for the first user using the first access code. In some examples, after transformation of the first access code into the second access code, the first access code may be invalidated and no longer facilitate entry to the spatial area for the first user.

At least a part of the second access code can include data representing the device identifier of the second NFC device. For example, a section of the second access code may include the unique device identifier of the second NFC device or may include a representation of the unique device identifier of the second NFC device. For example, the device identifier of the second NFC device may correspond to a MAC address of the NFC network interface card of the second NFC device. Further, the section of the second access code that corresponds to the unique device identifier of the second NFC device can include machine-readable code that is detectable by another electronic device (e.g., a scanner, an RFID scanner, and other suitable electronic devices). For example, the second NFC device can display a representation of the second access code (e.g., a QR code, or other suitable machine-readable code).

In some embodiments, transforming the first access code into the second access code can include replacing a section of the first access code (e.g., the section of the first access code corresponding to the device identifier of the first NFC device) with data representing the device identifier of the second NFC device. In other embodiments, transforming the first access code into the second access code can include generating an entirely new code that includes at least a section including data representing the device identifier of the second NFC device. It will be appreciated that transforming the first access code into the second access code may involve other suitable transformational techniques.

At block 1135, the first NFC device can transmit data representing the second access code to the second NFC device over the NFC channel. In other examples, the second access code may be transmitted from the access management system to the second NFC device. Data representing the second access code may be stored at the second NFC device.

Unauthorized transfer of the second access code from the second NFC device to another user device (e.g., to a third NFC device) can be prevented. For example, at least a portion of the second access code can include data representing the device identifier of the second NFC device. If the second NFC device transmits data representing the second access code to a third NFC device (e.g., by taking a screenshot of the second access code and sending the screenshot to the third NFC device), a device capable of scanning can scan the second access code from the third NFC device. In addition, the device capable of scanning may request a device identifier from the third NFC device. The access management system may be associated with the device capable of scanning. The access management system can compare the device identifier of the third NFC device with the portion of the second access code that represents the device identifier of the second NFC device to determine whether a match exists. If no match exits between the device identifier of the third NFC device and the portion of the second access code representing a device identifier, entry to the spatial area for a third user operating the third NFC device can be prevented.

Specific details are given in the above description to provide a thorough understanding of the embodiments. However, it is understood that the embodiments can be practiced without these specific details. For example, circuits can be shown in block diagrams in order not to obscure the embodiments in unnecessary detail. In other instances, well-known circuits, processes, algorithms, structures, and techniques can be shown without unnecessary detail in order to avoid obscuring the embodiments.

Implementation of the techniques, blocks, steps and means described above can be done in various ways. For example, these techniques, blocks, steps and means can be implemented in hardware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments can be described as a process which is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process is terminated when its operations are completed, but could have additional steps not included in the figure. A process can correspond to a method, a function, a procedure, a subroutine, a subprogram, etc. When a process corresponds to a function, its termination corresponds to a return of the function to the calling function or the main function.

Furthermore, embodiments can be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks can be stored in a machine readable medium such as a storage medium. A code segment or machine-executable instruction can represent a procedure, a function, a subprogram, a program, a routine, a subroutine, a module, a software package, a script, a class, or any combination of instructions, data structures, and/or program statements. A code segment can be coupled to another code segment or a hardware circuit by passing and/or receiving information, data, arguments, parameters, and/or memory contents. Information, arguments, parameters, data, etc. can be passed, forwarded, or transmitted via any suitable means including memory sharing, message passing, ticket passing, network transmission, etc.

For a firmware and/or software implementation, the methodologies can be implemented with modules (e.g., procedures, functions, and so on) that perform the functions described herein. Any machine-readable medium tangibly embodying instructions can be used in implementing the methodologies described herein. For example, software codes can be stored in a memory. Memory can be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium", "storage" or "memory" can represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A computer-implemented method for enhancing transfer of electronic tickets to events, the method comprising:
   providing a user interface at a first user device that is associated with a first user;
   receiving, from the first user device, image data corresponding to an image captured by a camera of the first user device;
   detecting, using one or more processors, a first feature from the image data, the first feature including a machine-readable code provided in a first format on a physical ticket, the first feature representing an electronic ticket to an event, the electronic ticket having been assigned to the first user;
   in response to detecting the first feature, accessing additional information associated with the electronic ticket;
   transforming, using the one or more processors, the first feature into a second feature, the second feature including the machine-readable code in a second format, and the second format including a digital representation of the machine-readable code;
   identifying a reassignment system for facilitating reassignment of the electronic ticket;
   generating ticket data that includes the additional information and the second feature; and
   transmitting a second communication to the reassignment system, the second communication including the ticket data.

2. The computer-implemented method for enhancing transfer of electronic tickets to events, as recited in claim 1, further comprising:
   receiving a third communication that corresponds to a second request for the electronic ticket to be assigned to a second user;
   reassigning the electronic ticket from the first user to the second user, reassignment of the electronic ticket corresponding to associating the second feature with an identifier of the second user; and
   transmitting a fourth communication to the first user device, the fourth communication corresponding to a notification that the electronic ticket has been reassigned.

3. The computer-implemented method for enhancing transfer of electronic tickets to events, as recited in claim 2, wherein reassigning the electronic ticket from the first user to the second user comprises:
   generating an invalidation code for the first feature, such that the first feature is invalid for granting access to the event;
   generating a new identifier for the electronic ticket to the event; and
   assigning the new identifier to the second user.

4. The computer-implemented method for enhancing transfer of electronic tickets to events, as recited in 2, further comprising:
   transmitting the second feature to the second user device, the second feature enabling the second user to gain access to the event.

5. The computer-implemented method for enhancing transfer of electronic tickets to events, as recited in claim 1, further comprising:
   receiving, from the reassignment system, a third communication indicating that the electronic ticket has been reassigned to a second user; and
   transmitting a fourth communication to the first user device, the fourth communication corresponding to a notification that the electronic ticket has been reassigned.

6. The computer-implemented method for enhancing transfer of electronic tickets to events, as recited in claim 1, further comprising:
   estimating a value associated with the electronic ticket at least in partly based on the additional information, the ticket data including the estimated value.

7. The computer-implemented method for enhancing transfer of electronic tickets to events, as recited in claim 1, further comprising:
   receiving, from the first user device, a third communication that includes a selection of the reassignment system from amongst a plurality of reassignment systems.

8. The computer-implemented method for enhancing transfer of electronic tickets to events, as recited in 1, wherein the first feature is a barcode representing the identifier of the electronic ticket, and wherein the second feature is a quick response (QR) representation of the barcode.

9. The computer-implemented method for enhancing transfer of electronic tickets to events, as recited in 1, wherein the additional information indicates a location associated with the electronic ticket.

10. A system for enhancing transfer of electronic tickets to events, comprising:
    one or more data processors; and
    a non-transitory computer-readable storage medium containing instructions which, when executed on the one or more data processors, cause the one or more data processors to perform operations including:
      providing a user interface at a first user device that is associated with a first user;
      receiving, from the first user device, image data corresponding to an image captured by a camera of the first user device;
      detecting, using one or more processors, a first feature from the image data, the first feature including a machine-readable code provided in a first format on a physical ticket, the first feature representing an electronic ticket to an event, the electronic ticket having been assigned to the first user;
      in response to detecting the first feature, accessing additional information associated with the electronic ticket;
      transforming, using the one or more processors, the first feature into a second feature, the second feature including the machine-readable code in a second format, and the second format including a digital representation of the machine-readable code;
      identifying a reassignment system for facilitating reassignment of the electronic ticket;
      generating ticket data that includes the additional information and the second feature; and
      transmitting a second communication to the reassignment system, the second communication including the ticket data.

11. The system for enhancing transfer of electronic tickets to events, as recited in claim 10, wherein the operations further comprise:

receiving a third communication that corresponds to a second request for the electronic ticket to be assigned to a second user;

reassigning the electronic ticket from the first user to the second user, reassignment of the electronic ticket corresponding to associating the second feature with an identifier of the second user; and transmitting a fourth communication to the first user device, the fourth communication corresponding to a notification that the electronic ticket has been reassigned.

12. The system for enhancing transfer of electronic tickets to events, as recited in claim 11, wherein reassigning the electronic ticket from the first user to the second user comprises:

generating an invalidation code for the first feature, such that the first feature is invalid for granting access to the event;

generating a new identifier for the electronic ticket to the event; and assigning the new identifier to the second user.

13. The system for enhancing transfer of electronic tickets to events, as recited in claim 11, wherein the operations further comprise:

transmitting the second feature to the second user device, the second feature enabling the second user to gain access to the event.

14. The system for enhancing transfer of electronic tickets to events, as recited in claim 10, wherein the operations further comprise:

receiving, from the reassignment system, a third communication indicating that the electronic ticket has been reassigned to a second user; and transmitting a fourth communication to the first user device, the fourth communication corresponding to a notification that the electronic ticket has been reassigned.

15. The system for enhancing transfer of electronic tickets to events, as recited in claim 10, wherein the operations further comprise:

estimating a value associated with the electronic ticket at least in partly based on the additional information, the ticket data including the estimated value.

16. The system for enhancing transfer of electronic tickets to events, as recited in claim 10, wherein the operations further comprise:

receiving, from the first user device, a third communication that includes a selection of the reassignment system from amongst a plurality of reassignment systems.

17. The system for enhancing transfer of electronic tickets to events, as recited in claim 10, wherein the first feature is a barcode representing the identifier of the electronic ticket, and wherein the second feature is a quick response (QR) representation of the barcode.

18. A computer-program product tangibly embodied in a non-transitory machine-readable storage medium, including instructions configured to cause a data processing apparatus to perform operations including:

providing a user interface at a first user device that is associated with a first user;

receiving, from the first user device, image data corresponding to an image captured by a camera of the first user device;

detecting, using one or more processors, a first feature from the image data, the first feature including a machine-readable code provided in a first format on a physical ticket, the first feature representing an electronic ticket to an event, the electronic ticket having been assigned to the first user;

in response to detecting the first feature, accessing additional information associated with the electronic ticket;

transforming, using the one or more processors, the first feature into a second feature, the second feature including the machine-readable code in a second format, and the second format including a digital representation of the machine-readable code;

identifying a reassignment system for facilitating reassignment of the electronic ticket;

generating ticket data that includes the additional information and the second feature; and transmitting a second communication to the reassignment system, the second communication including the ticket data.

19. The computer-program product, as recited in claim 18, wherein the operations further comprise:

receiving a third communication that corresponds to a second request for the electronic ticket to be assigned to a second user;

reassigning the electronic ticket from the first user to the second user, reassignment of the electronic ticket corresponding to associating the second feature with an identifier of the second user; and transmitting a fourth communication to the first user device, the fourth communication corresponding to a notification that the electronic ticket has been reassigned.

20. The computer-program product, as recited in claim 19, wherein the operations further comprise:

wherein reassigning the electronic ticket from the first user to the second user comprises:

generating an invalidation code for the first feature, such that the first feature is invalid for granting access to the event;

generating a new identifier for the electronic ticket to the event; and assigning the new identifier to the second user.

* * * * *

UNITED STATES PATENT AND TRADEMARK OFFICE
CERTIFICATE OF CORRECTION

PATENT NO. : 9,740,988 B1  
APPLICATION NO. : 15/215385  
DATED : August 22, 2017  
INVENTOR(S) : Samuel Levin et al.

Page 1 of 1

It is certified that error appears in the above-identified patent and that said Letters Patent is hereby corrected as shown below:

On the Title Page

Item (72) Please remove "Siegal" and insert --Siegel--

Signed and Sealed this
Twenty-first Day of November, 2017

Joseph Matal
*Performing the Functions and Duties of the*
*Under Secretary of Commerce for Intellectual Property and*
*Director of the United States Patent and Trademark Office*